(12) United States Patent
Wippermann et al.

(10) Patent No.: US 10,652,438 B2
(45) Date of Patent: May 12, 2020

(54) MULTI-APERTURE IMAGING DEVICES, METHODS FOR PRODUCING SAME AND IMAGING SYSTEM

(71) Applicant: Fraunhofer-Gesellschaft zur Foerderung der angewandten Forschung e.V., Munich (DE)

(72) Inventors: Frank Wippermann, Meiningen (DE); Andreas Brueckner, Jena (DE); Andreas Reimann, Apolda/Sulzbach (DE); Andreas Braeuer, Schloeben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 118 days.

(21) Appl. No.: 16/035,520

(22) Filed: Jul. 13, 2018

(65) Prior Publication Data
US 2018/0324334 A1 Nov. 8, 2018

Related U.S. Application Data

(63) Continuation of application No. PCT/EP2017/050490, filed on Jan. 11, 2017.

(30) Foreign Application Priority Data

Jan. 13, 2016 (DE) .......................... 10 2016 200 287

(51) Int. Cl.
*H04N 5/225* (2006.01)
*G02B 13/00* (2006.01)
(Continued)

(52) U.S. Cl.
CPC ........... *H04N 5/2252* (2013.01); *G02B 7/008* (2013.01); *G02B 13/001* (2013.01);
(Continued)

(58) Field of Classification Search
CPC .. G02B 13/001; G02B 27/1066; G02B 7/008; H04N 5/2252; H04N 5/2253; H04N 5/3415
See application file for complete search history.

(56) References Cited

U.S. PATENT DOCUMENTS 9,201,193 B1 * 12/2015 Smith ...................... G02B 6/04
10,425,567 B2 9/2019 Wippermann et al.
(Continued)

FOREIGN PATENT DOCUMENTS

DE 102009049387 A1 4/2011
DE 102013209819 A1 11/2014
(Continued)

OTHER PUBLICATIONS

Wippermann, F C, et al., "Novel multi-aperture approach for miniaturized imaging systems", Proceedings of International Society for Optical Engineering. US, vol. 9760, XP060070249, Mar. 15, 2016, pp. 97600S-1-97600S-7.

*Primary Examiner* — Amy R Hsu
(74) *Attorney, Agent, or Firm* — Michael A. Glenn; Perkins Coie LLP

(57) ABSTRACT

A multi-aperture imaging device described herein includes at least one image sensor and an array of juxtaposed optical channels. Each optical channel includes optics for projecting at least one partial area of an object area on an image sensor area of the image sensor. The array includes: a housing including a wall structure facing or facing away from the image sensor, through which the optical channels pass, and a sidewall structure arranged on the wall structure, wherein the wall structure or the sidewall structure is formed including glass, ceramic, glass ceramic or a crystalline material, wherein the optics of the optical channels are arranged in the housing, and wherein the wall structure is connected to
(Continued)

optics of the optical channels and fixes the optics with respect to one another.

46 Claims, 46 Drawing Sheets

(51) Int. Cl.
*G02B 27/10* (2006.01)
*H04N 5/341* (2011.01)
*G02B 7/00* (2006.01)

(52) U.S. Cl.
CPC ....... *G02B 27/1066* (2013.01); *H04N 5/2253* (2013.01); *H04N 5/3415* (2013.01)

(56) References Cited

U.S. PATENT DOCUMENTS

| | | | |
|---|---|---|---|
| 2004/0080938 A1* | 4/2004 | Holman | F21S 8/08 362/231 |
| 2007/0041723 A1 | 2/2007 | Gutierrez et al. | |
| 2010/0328471 A1 | 12/2010 | Boland et al. | |
| 2011/0228142 A1 | 9/2011 | Brueckner et al. | |
| 2011/0248152 A1 | 10/2011 | Svajda et al. | |
| 2013/0162882 A1* | 6/2013 | Rudmann | H01L 27/14618 348/336 |
| 2014/0028825 A1* | 1/2014 | Yamagata | H04N 5/2621 348/77 |
| 2014/0055624 A1 | 2/2014 | Gaines et al. | |
| 2014/0111650 A1 | 4/2014 | Georgiev et al. | |
| 2015/0109468 A1 | 4/2015 | Larola | |
| 2015/0373262 A1 | 12/2015 | Georgiev et al. | |
| 2015/0373263 A1 | 12/2015 | Georgiev et al. | |
| 2016/0255330 A1 | 9/2016 | Wippermann et al. | |
| 2017/0059808 A1* | 3/2017 | Wippermann | G02B 7/025 |
| 2017/0108699 A1* | 4/2017 | Perez Calero | G02B 1/10 |
| 2017/0264825 A1 | 9/2017 | Wippermann et al. | |
| 2018/0172945 A1 | 6/2018 | Wippermann et al. | |
| 2018/0176437 A1 | 6/2018 | Wippermann et al. | |
| 2018/0176471 A1 | 6/2018 | Wippermann et al. | |
| 2018/0176472 A1 | 6/2018 | Wippermann et al. | |
| 2018/0176473 A1 | 6/2018 | Wippermann et al. | |
| 2018/0184068 A1 | 6/2018 | Wippermann et al. | |
| 2018/0198963 A1 | 7/2018 | Wippermann et al. | |
| 2018/0241920 A1 | 8/2018 | Wippermann et al. | |

FOREIGN PATENT DOCUMENTS

| | | |
|---|---|---|
| DE | 102014213371 B3 | 8/2015 |
| JP | 2005109622 A | 4/2005 |
| JP | 2008180773 A | 8/2008 |
| JP | 2008263340 A | 10/2008 |
| JP | 2009053011 A | 3/2009 |
| JP | 2009180976 A | 8/2009 |
| JP | 2014-023609 A | 2/2014 |
| KR | 10-2013-0093072 A | 8/2013 |
| WO | 2014126092 A1 | 8/2014 |
| WO | 2014168586 A1 | 10/2014 |
| WO | 2015005056 A1 | 1/2015 |

* cited by examiner

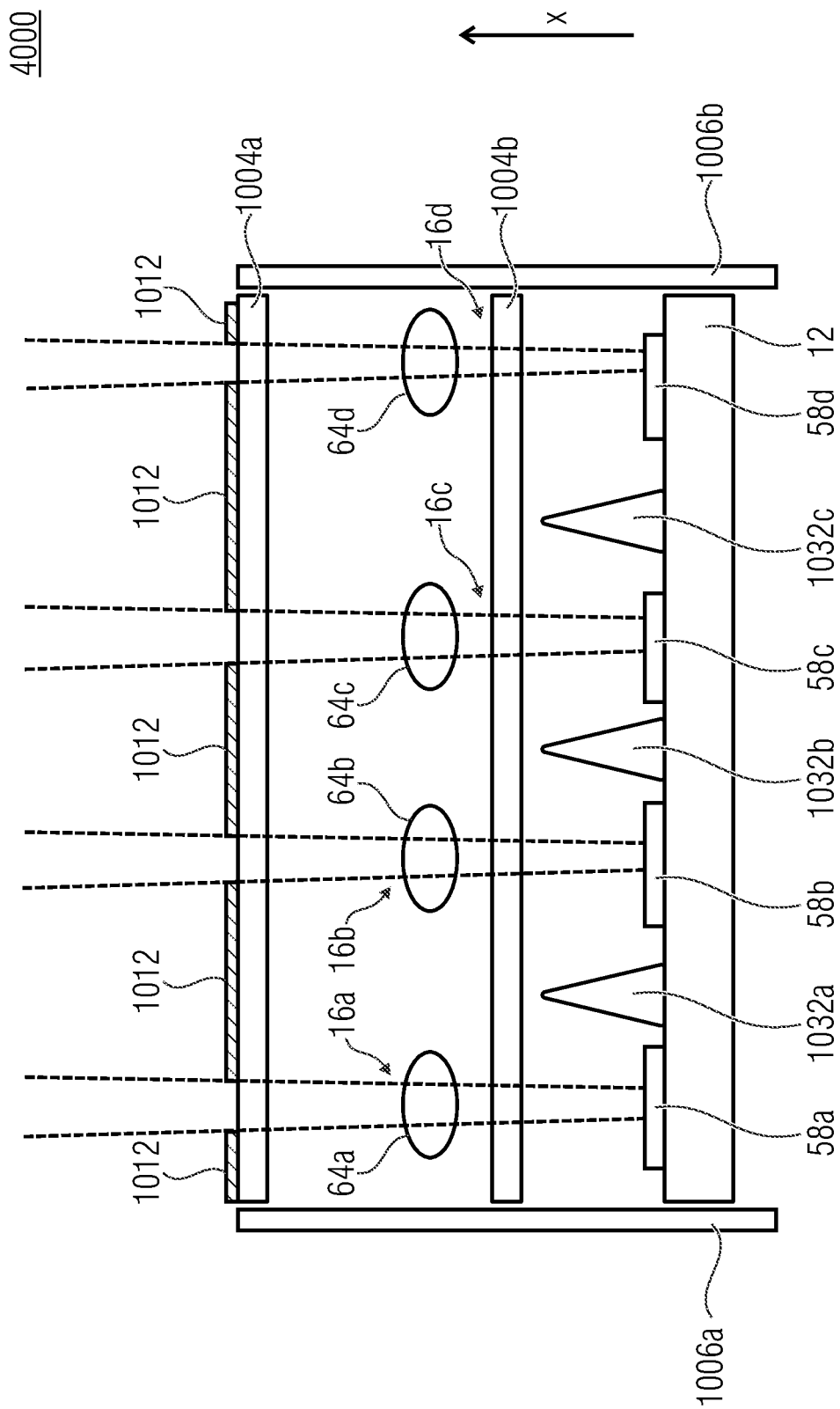

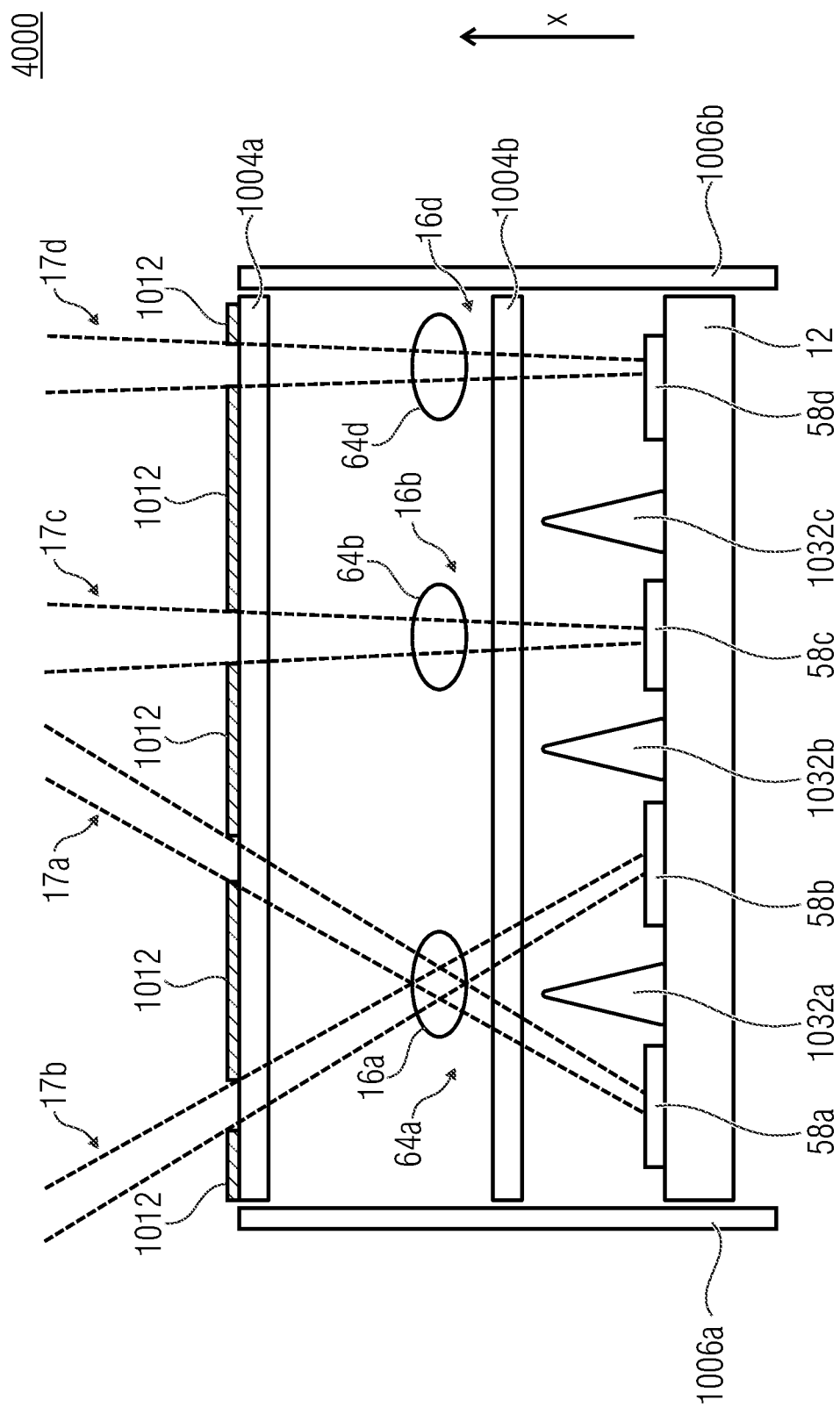

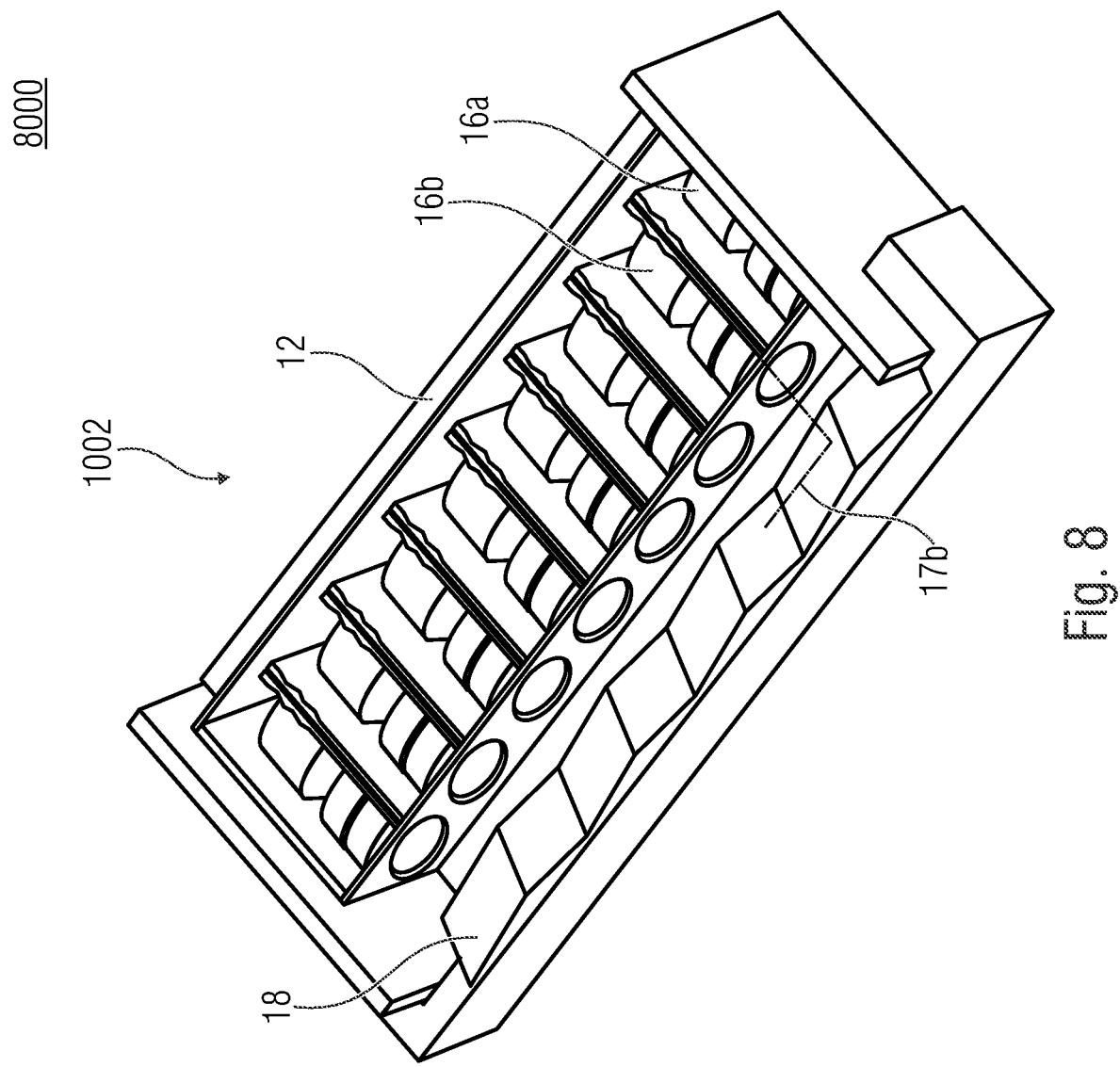

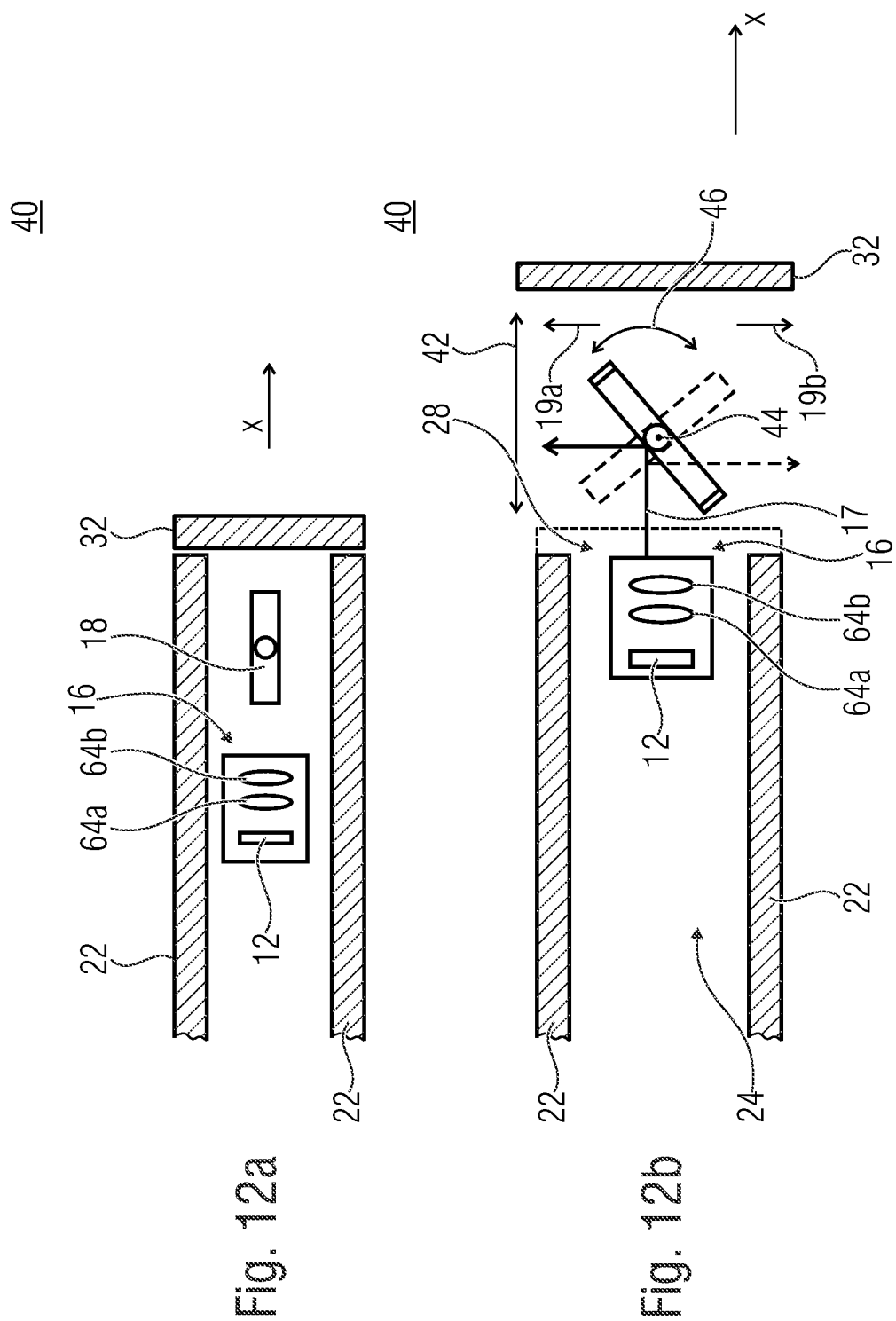

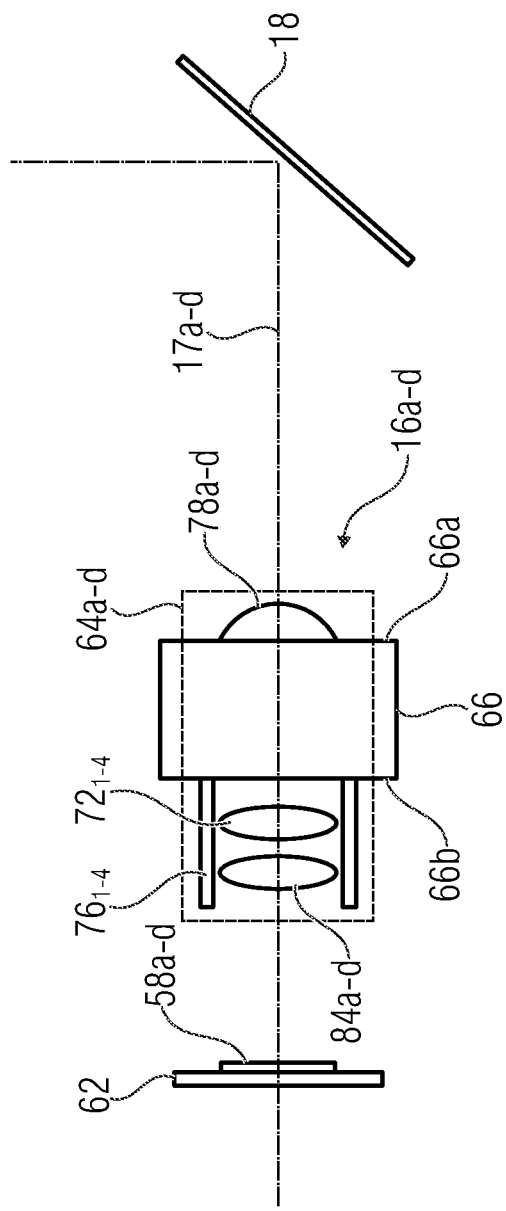

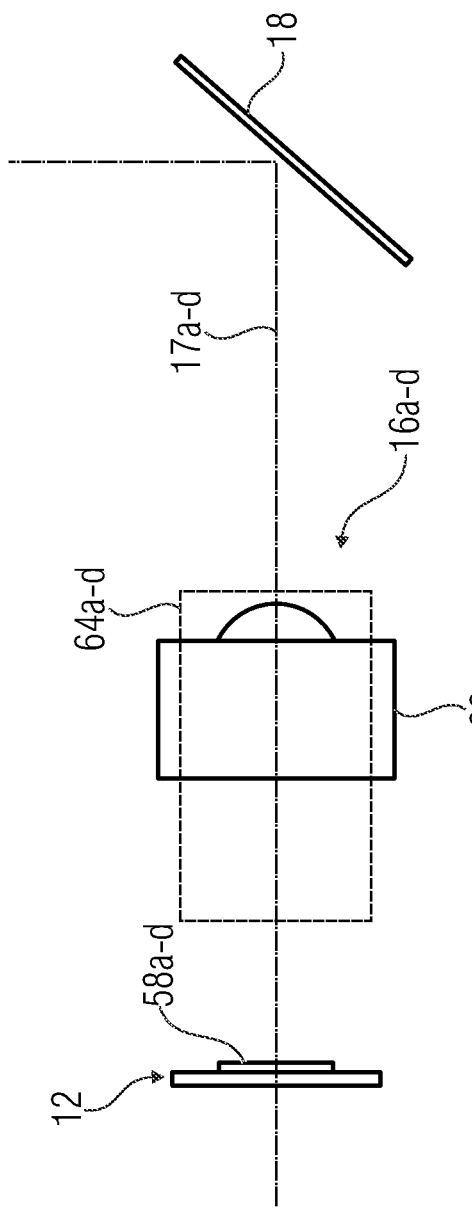

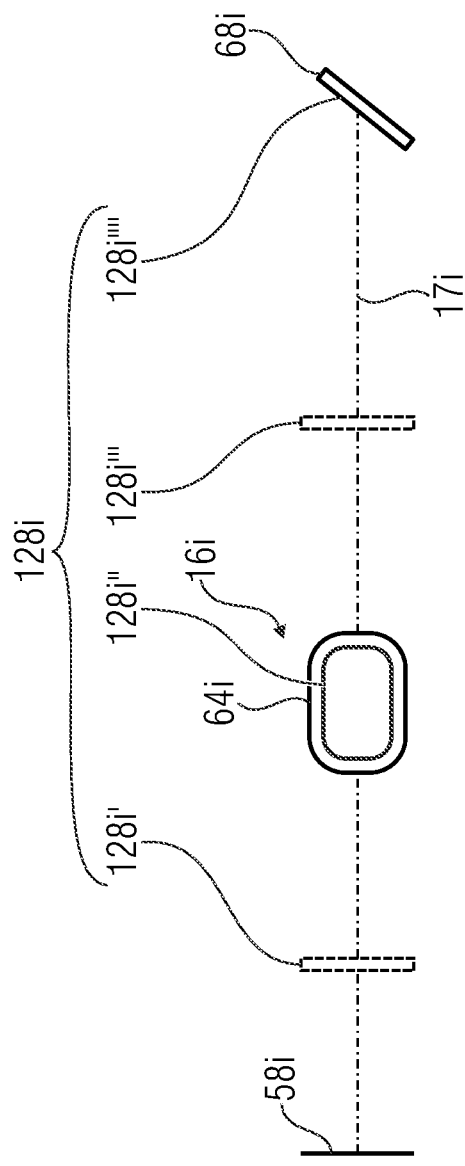

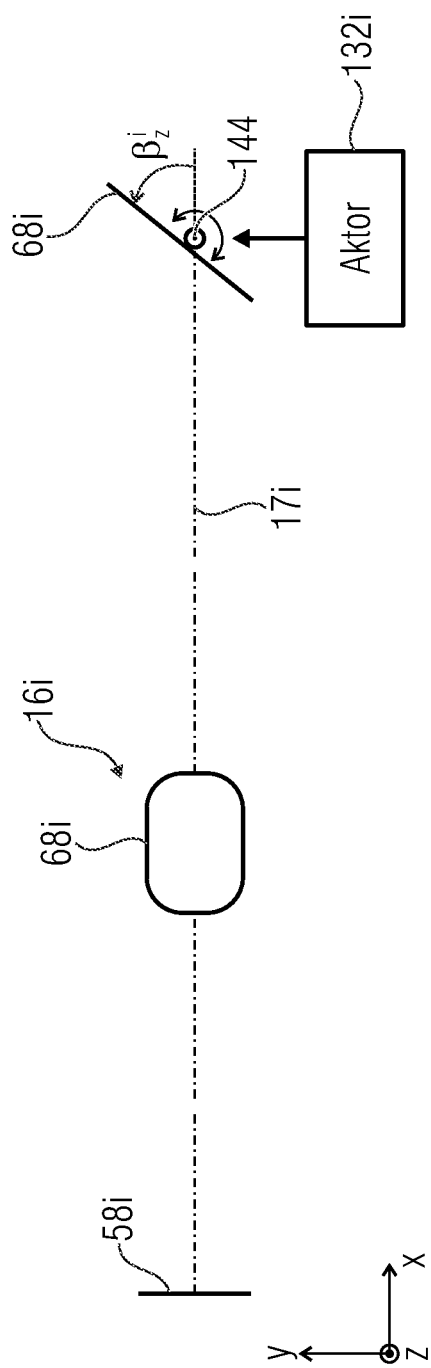

MULTI-APERTURE IMAGING DEVICES, METHODS FOR PRODUCING SAME AND IMAGING SYSTEM

CROSS-REFERENCE TO RELATED APPLICATIONS

This application is a continuation of copending International Application No. PCT/EP2017/050490, filed Jan. 11, 2017, which is incorporated herein by reference in its entirety, and additionally claims priority from German Application No. 10 2016 200 287.2, filed Jan. 13, 2016, which is incorporated herein by reference in its entirety.

The present invention relates to multi-aperture imaging devices, in particular those that are suitable for mobile devices, to methods for producing same and to an imaging system. Further, the present invention relates to a housing concept for multi-aperture imaging systems with linear channel arrangement.

BACKGROUND OF THE INVENTION

Conventional cameras transmit the total field of view in one channel and are limited as regards to their miniaturization. In smartphones, two cameras are used that are oriented in and opposite to the direction of the surface normal of the display. In known multi-aperture imaging systems, a contiguous partial object area, which is transformed into a contiguous partial image area, is allocated to each channel.

In conventional cameras for smartphones, the housings for the optics are produced from plastic by means of injection molding. Plastic materials have high coefficients of thermal expansion and a low modulus of elasticity, which results in deformations during thermal alternating stress. In particular in stereo systems using two spaced-apart cameras, restrictions of the depth information result from the position and location changes. In array cameras, where the individual channels each see a part of the field of view, the adjustments can additionally result in errors when assembling the total images.

Conventional cameras as illustrated, for example, in FIG. 27, consist of a single imaging channel. The lenses 502a to 502d are mostly produced by means of injection molding and have a circular disk shaped geometry. The housing 504 is also produced from plastic materials by means of injection molding which, as a result, have great coefficients of thermal expansion. The lens is aligned based on the diameters of the lenses 502a to 502d and respective recesses in the housing 504 (centering) as well as the thicknesses of the individual lens elements by using mechanical stops in the peripheral range of the lenses 502a to 502d around the optical functional area. Spacers 506a to 506c can be arranged between the lenses 502a to 502d. Also, the lens stack can be terminated via a spacer 506d. Since only one contiguous image results, temperature changes effect merely a change of the image quality (image sharpness) but not the occurrence of spurious image artefacts.

For 3D capturing of images, two conventional cameras are used which form a stereo structure, as it is illustrated, for example, in FIG. 28 for cameras 508a and 508b. Because of the high expansion of the plastic materials, negative influences result on the quality of the 3D data since uncontrolled changes of position of the cameras 508a and 508b result. Further, array camera arrangements exist that are based on the usage of several individual cameras and are described in US 2014/0111650 A1. FIG. 29 shows a respective device where each channel 512a to 512b transmits part of the total field view. The partial images are subsequently assembled to the total field of view. Changes of temperature cause uncontrollable position changes of the camera and hence erroneous image assembly which has a negative effect on the image quality due to the occurrence of heavily interfering image artefacts.

Thus, a concept allowing multi-aperture imaging devices for capturing a total field of view while ensuring high image quality would be desirable.

SUMMARY

According to an embodiment, a multi-aperture imaging device may have: at least one image sensor; and an array of juxtaposed optical channels, wherein each optical channel includes optics for projecting at least one partial area of an object area on an image sensor area of the image sensor, the array including: a housing including a wall structure facing or facing away from the image sensor, through which the optical channels pass, and a sidewall structure arranged on the wall structure, wherein the wall structure or the sidewall structure is formed including glass, ceramic, glass ceramic or a crystalline material, wherein the optics of the optical channels are arranged in the housing, and wherein the wall structure is connected to optics of the optical channels and fixes the optics with respect to one another; wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or wherein one of the optics includes a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

According to another embodiment, a multi-aperture imaging device may have: at least one image sensor; and an array of juxtaposed optical channels, wherein each optical channel includes optics for projecting at least one partial area of an object area on an image sensor area of the image sensor; wherein the array includes a housing in which the optics of the optical channels are arranged and fixed with respect to one another, wherein the housing is formed of juxtaposed plate-shaped structures and includes at least one wall structure facing or facing away from the image sensor and includes at least one sidewall structure; wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or wherein one of the optics includes a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

An embodiment may have an imaging system with an inventive multi-aperture imaging device or with a multi-aperture imaging device including at least one image sensor, and an array of juxtaposed optical channels; wherein each optical channel includes optics for projecting at least one partial area of an object area on an image sensor area of the image sensor, wherein the array includes a housing in which the optics of the optical channels are arranged and fixed with respect to one another, wherein the housing is formed of juxtaposed plate-shaped structures and includes at least one wall structure facing or facing away from the image sensor and includes at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics includes a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

According to an embodiment, a method for producing a multi-aperture imaging device may have the steps of: providing at least one image sensor; and arranging optics of optical channels, such that the same form an array of juxtaposed optical channels, and such that each optical channel includes optics for projecting at least one partial area of an object area on an image sensor area of the image sensor, wherein forming the array includes: arranging the optics of the optical channels in a housing, such that a wall structure of the housing through which the optical channels pass is facing or facing away from the image sensor and a sidewall structure arranged on the wall structure is arranged on the wall structure, wherein the wall structure or the sidewall structure is formed including glass, ceramic, glass ceramic or a crystalline material, wherein the optics are arranged such that the wall structure is connected to the optics of the optical channels and fixes the optics with respect to one another; wherein arranging the optics is performed such that the optics are arranged in a contactless manner with respect to an adjacent partition wall structure or are supported by a soft material such that the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or such that one of the optics includes a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

According to another embodiment, a method for producing a multi-aperture imaging device may have the steps of: providing at least one image sensor; and arranging optics of optical channels, such that the same form an array of juxtaposed optical channels, and such that each optical channel includes optics for projecting at least one partial area of an object area on an image sensor area of the image sensor; forming a housing of joined plate-shaped structures such that the housing includes at least one wall structure facing or facing away from the image sensor and includes at least one sidewall structure; and arranging the optics of the optical channels of the array in the housing, such that the optics are fixed with respect to one another; wherein arranging the optics is performed such that the optics are arranged in a contactless manner with respect to an adjacent partition wall structure or are supported by a soft material such that the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or such that one of the optics includes a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

A core idea of the present invention is the finding that by fixing optics of the optical channels with respect to one another, i.e., fixing optics with regard to further optics by a wall structure of a housing, an image quality influenced merely to a small extent by a temperature change can be obtained, such that in varying environmental conditions an almost consistent high image quality of the multi-aperture imaging device is obtained. Here, not only a housing material is replaced but a wall structure including glass, ceramic or a crystalline material is arranged and/or the housing is formed of joined planar or curved plate shaped structures and the optics are fixed on the housing with respect to one another. This has the advantage that a change of imaging characteristics in an optical channel, for example by temperature changes, causes a low or negligible deformation of the housing, such that an amount of mutual influence of optics of optical channels by deformation of the same is reduced or prevented.

According to an embodiment, a multi-aperture imaging device includes at least one image sensor and an array of juxtaposed optical channels, wherein each optical channel comprises optics for projecting at least one partial area of an object area on an image sensor area of the image sensor. The array includes a housing comprising a wall structure facing or facing away from the image sensor through which the optical channels pass. Further, the housing comprises a sidewall structure arranged on the wall structure, wherein the wall structure or sidewall structure is formed including glass, ceramic, glass ceramic or crystalline material. Optics of the optical channels are arranged in the housing. The wall structure is connected to optics of the optical channels and fixes the optics with respect to one another. The wall structure is, for example, a front or rear side of the housing arranged in viewing direction of the optical channels. An arrangement of glass, ceramic or crystalline materials enables a low temperature-induced deformation of the housing, in particular with respect to plastic materials. Further, fixing the optics of the optical channels with respect to one another on the wall structure enables low deformation forces of optical channels acting on other optical channels.

According to a further embodiment, the multi-aperture imaging device includes at least one image sensor and an array of juxtaposed optical channels, wherein each channel comprises optics for projecting at least one partial area of an object area on an image sensor area of the image sensor. The array comprises a housing in which the optics of the optical channels are arranged and fixed with respect to one another, wherein the housing is formed of joined plate-shaped structures and comprises at least one wall structure facing or facing away from the image sensor and comprises at least one side wall structure. Advantages of plate-shaped structures are high reproducibility as well as a high definability of the deformation of the respective structures. Further, housings of plate-shaped structures are very easy to build.

According to a further embodiment, a multi-aperture imaging device includes a housing with a wall structure including glass, ceramic or a crystalline material, as stated above, and is configured such that the housing is formed of joined plate-shaped structures. This means the above-described embodiments can be combined. Thereby, all above-stated advantages, as well as the synergetic effect can be obtained that high rigidity of glass, ceramic or the crystalline material does not pass on a deformation force induced by a deformation of the optics of the optical channels into the wall structure or only to a small extent.

According to a further embodiment, an imaging system, for example an image capturing device or a device having such an image capturing device includes at least one above-described multi-aperture imaging device.

According to a further embodiment, a method for producing a multi-aperture imaging device includes providing at least one image sensor and arranging optics of optical channels, such that the same form an array of juxtaposed optical channels, and such that each optical channel comprises optics for projecting at least one partial area of an object area on an image sensor area of the image sensor. Forming the array includes arranging the optics of the optical channels in a housing having a wall structure facing or facing away from the image sensor including glass, ceramic or a crystalline material, such that the wall structure is connected to the optics of the optical channels and fixes the optics with respect to one another.

According to a further embodiment, a method for producing a multi-aperture imaging device includes providing at least one image sensor, arranging optics of optical channels, such that the same form an array of juxtaposed optical channels, such that each optical channel comprises optics for projecting at least one partial area of an object area on an image sensor area of the image sensor. Further, the method comprises forming a housing of joined plate-shaped structures, such that the housing comprises at least one wall structure facing or facing away from the image sensor and comprises at least one sidewall structure. The method further comprises arranging the optics of the optical channels of the array in the housing such that the optics are fixed with respect to one another.

Further advantageous implementations are the subject matter of the dependent claims.

BRIEF DESCRIPTION OF THE DRAWINGS

Embodiments of the present invention will be detailed subsequently referring to the appended drawings, in which:

FIG. 4a shows a schematic top view of a multi-aperture imaging device according to an embodiment wherein one at least partly opaque structure is arranged respectively between the image sensor areas of an image sensor.

FIG. 4b shows a schematic top view of a multi-aperture imaging device according to an embodiment wherein an optical channel is configured to project two partial areas;

FIG. 8 shows a schematic perspective view of a multi-aperture imaging device according to an embodiment where the housing is as described, for example, in FIG. 7b;

FIG. 12a shows a schematic side sectional view of a device according to an embodiment in the first operating state having a translationally shiftable cover;

FIG. 12b shows a schematic side sectional view of the device of FIG. 12a in the second operating state;

FIG. 19a-c shows detailed illustrations of a multi-aperture imaging device according to an embodiment;

FIG. 19d-f shows implementations of the multi-aperture imaging device according to FIG. 19a-c for the case of optics of optical channels, which are held by a common carrier, according to an embodiment;

FIG. 24a shows a schematic view of a multi-aperture imaging device with an adjustment means for channel-individual adjustment of optical characteristics according to an embodiment, FIG. 24b shows a variation of a multi-aperture imaging device with the adjustment means according to an embodiment;

DETAILED DESCRIPTION OF THE INVENTION

Before embodiments of the present invention will be discussed in detail below based on the drawings, it should be noted that identical, functionally equal or equal elements, objects and/or structures are provided with the same reference numbers in the different figures, such that the description of these elements illustrated in different embodiments is inter-exchangeable or inter-applicable.

Figure 1:
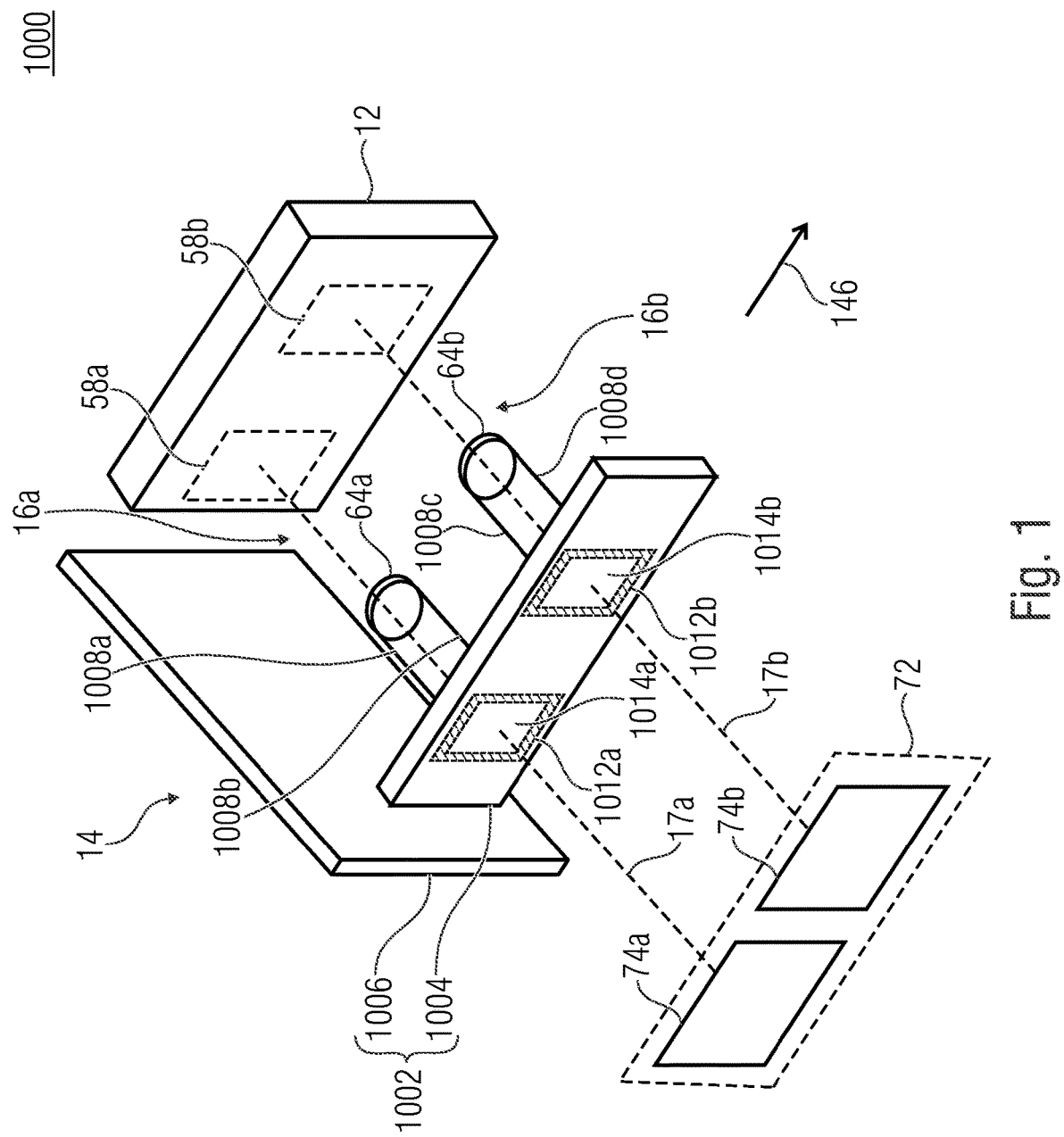
FIG. 1 shows a schematic perspective view of a multi-aperture imaging device according to an embodiment.

FIG. 1 shows a schematic perspective view of a multi-aperture imaging device 1000 according to an embodiment. The multi-aperture imaging device includes an image sensor 12 and an array 14 of juxtaposed optical channels 16a and 16b. Each optical channel 16a and 16b includes optics 64a or 64b for projecting at least one partial area 74a or 74b of an object area 72 on an image sensor area 58a and 58b, respectively of the image sensor 12. While the partial areas 74a and 74b are illustrated such that same are disjoint in the object area 72, the partial areas 74a and 74b can also directly abut on one another or partly, i.e., incompletely overlap with one another. The multi-aperture imaging device 1000 can be configured to scan the object area completely, i.e., to provide a complete image. Alternatively or additionally, the multi-aperture imaging device 1000 can be configured to project at least one partial area 74a and/or 74b of the object area 72 by at least two optical channels on at least two image sensor areas. This enables capturing of the object area with a higher resolution by using superresolution or an at least stereoscopic capturing of the object area 72.

The object area 72 can also be referred to as field of view of the multi-aperture imaging device 1000 and can represent an area which is imaged by the multi-aperture imaging device 1000. The partial areas 74a and 74b can also be referred to as partial fields of view of the field of view 72.

The array 14 includes a housing 1002. The housing 1002 includes a wall structure 1004 which is arranged along a line-extension direction 146 and perpendicular to an axial extension direction of optical paths 17a-b of the optical channels 16a-b. The wall structure 1004 can be arranged facing (not illustrated) and/or facing away (illustrated) from the optics 64a-b starting from the image sensor 12. The wall structure 1004 illustrated spaced apart from the image sensor 12 can also be described such that the same forms an entry side of the optical paths 17a-b of the optical channels 16a-b of the array 14. A wall structure arranged facing the image sensor alternatively or additionally to the wall structure 1004 can be referred to as exit side of the array 14. The housing 1002 comprises a sidewall structure 1006 that is arranged on the wall structure 1004 and configured to reduce or prevent entry of stray light, this means radiation that is undesired or spurious for an image captured by the multi-aperture imaging device 1000. While the sidewall structure 1006 is illustrated that the same is arranged on a lateral side of the wall structure 1004 along or opposite to the line-extension direction 146, the sidewall structure 1006 can also be arranged on a different side of the wall structure 1004 and can screen a side of the optical channels 46a and 64b from external light. Alternatively, further sidewall structures and a further wall structure facing the image sensor 12 can be arranged in order to form a complete housing.

The optics 64a and 64b are mechanically connected or mechanically fixed to the wall structure 1004. For this, it is, for example, provided that the optics 64a are mechanically fixed to the wall structure 1004 via mechanical mounting elements 1008a and/or 1008b. The mounting elements 1008a and 1008b can be formed as holding ridges or mounting ridges of any material, such as a plastic material, a metal material and/or a crystalline material. Alternatively or additionally, it can be provided that the optics 64a are mechanically fixed to the wall structure 1004 by means of an adhesive. The optics 64b can be connected and/or adhered to the wall structure 1004 via mounting elements 1008c and/or 1008d.

According to a first implementation, the wall structure 1004 and/or the sidewall structure 1006 includes a glass material, a ceramic material, a glass ceramic material or a crystalline material, such as silicon or polysilicon. The wall structure 1004 can be configured such that the same is transparent at least in areas 1014a-b in which optical paths 17a-b of the optical channels 16a-b run through the wall structure, for example in that the glass material, the ceramic or the crystalline material is implemented in a transparent manner for a useful wavelength range of a radiation to be captured by the multi-aperture imaging device 1000. This allows that the optical channels 64a and 64b run through the material of the wall structure 1004. For this, transparent areas 1014a and 1014b can be provided, which are possibly enclosed by diaphragm structures 1012a and 1012b, respectively. The optical channels 16a and 16b can look towards the object area 72 through the transparent areas 1014a and 1014b. A wall structure facing the image sensor 12 can comprise transparent areas 1014a and 1014b such that the optical channels look towards the image sensor 12. The transparent areas 1014a and 1014b can consist of the material of the wall structure 1004 or include the same when the same is transparent or at least partly transparent for the relative wavelength range. "At least partly transparent" means that low or acceptable optical attenuation takes place. Alternatively, the transparent areas 1014a and/or 1014b can be formed as openings, i.e. as recesses in the wall structure. Alternatively, the transparent areas 1014a and/or 1014b can comprise a transparent or at least partly transparent material and can be enclosed by a less transparent, i.e., at least partly opaque material of the wall structure 1004. Optically active areas, such as lenses, can be formed on or in the transparent areas 1014a-b. This means at least one lens influencing the respective optical path 17a-b can be formed in the transparent area 1014.

The diaphragm structures 1012a and 1012b can be configured to limit a viewing angle or viewing range of the optical channels 16a and 16b and to reduce or prevent, respectively, an entry of stray light from areas outside the partial areas 74a and 74b, respectively, toward the respective image sensor area 58a and 58b. According to an implementation, the wall structure 1004 is covered by an at least partly opaque layer forming the diaphragm structure 1012a and 1012b, with the exception of the areas where the optical channels 16a and 16b run through the wall structure 1004. According to a further embodiment, the diaphragm structure 1012a and/or 1012b is formed as an edge-shaped structure around the transparent areas 1014a and/or 1014b. This means that optical diaphragms 1012 can be arranged on the wall structure 1004, which are configured to limit the optical path 17a and 17b along a direction perpendicular to a course of the optical path 17a and 17b, respectively. It is an advantage of the diaphragm structures 1012a and 1012b that exact definition of the partial object areas 74a and 74b is enabled.

According to a further implementation, the housing 1002 is formed of joined plate-shaped structures, i.e., at least the wall structure 1004 and the sidewall structure 1006. Joining plate structures for obtaining the housing 1002 allows production of the housing 1002 with a lower production tolerance and with fast and inexpensive production processes, such that both the plate structures 1004 and 1006 and the housing 1002 are inexpensive to produce. Plate-shaped structures can be implemented in a planar manner, but can alternatively also comprise a curvature along one or two spatial directions. A plate-shaped structure can be considered such that an extension of the structure along at least one spatial direction remains essentially the same or constant across a course of the structure, as it is given, for example, for planar plates.

Features of the two implementations can be combined with another without any limitations. Detailed statements described herein can also be combined with both implementations.

Concerning a course of the optical paths 17a and 17b from the object area 72 towards the image sensor 12, wall structures can be referred to as entry side and exit side or as front side and rear side without this designation having a limiting effect. Other sides of the housing, such as the illustrated sidewall structure 1006, an opposing sidewall structure but also plate structures that can be referred to as top side and/or bottom side, will be referred to uniformly referred to below as sidewall structures. Simply put, this means that sidewall structures can be arranged on sides of the housing 1002 that are not formed by a wall structure 1004. Further, the housing 1002 can comprise the wall structure 1004 and/or a different or further wall structure. Sidewall structures, such as the sidewall structure 1002 arranged in addition to the wall structure can be arranged to reduce or prevent entry of stray light into the interior of the housing 1002 and/or towards the optical channels 16a and 16b and/or towards the image sensor areas 58a and 58b. This means also that sidewall structures can be formed of opaque materials and/or can be covered with an opaque layer in order to reduce or prevent entry of stray light. Alternatively, the use of sidewall structures 1006 can also be omitted, for example when entry of stray light is not to be feared or not harmful due to structural characteristics of the multi-aperture imaging device 1000. For example, the multi-aperture imaging device 1000 can be arranged in a housing, such as a smartphone, a tablet or another device such that entry of stray light need not to be feared.

According to embodiments described in detail below, the housing 1002 can also be formed as almost closed housing including six walls, two wall structures and four sidewall structures. The array 14 can moved by the housing 1002 as entire arrangement of members, which is advantageous for actuators, such as actuators for image stabilization and/or focusing since only little or no undesired relative movement takes place between components.

The wall structure 1004 can extend across at least one, at least two or across all optical channels 16a-b of the multi-aperture imaging device 1000. This is particularly advantageous when the wall structure 1004 comprises a material transparent for a useful wavelength range of the multi-aperture imaging device 1000 and the optical channels 64a and 64b pass through the wall structure 1004. In this way, the wall structure 1004 can cover an entire side of the array 14. The wall structure 1004 can include several elements that commonly form the wall structure 1004. Alternatively, the wall structure 1004 can also be formed integrally which simplifies production of the housing 1002.

Figure 2:
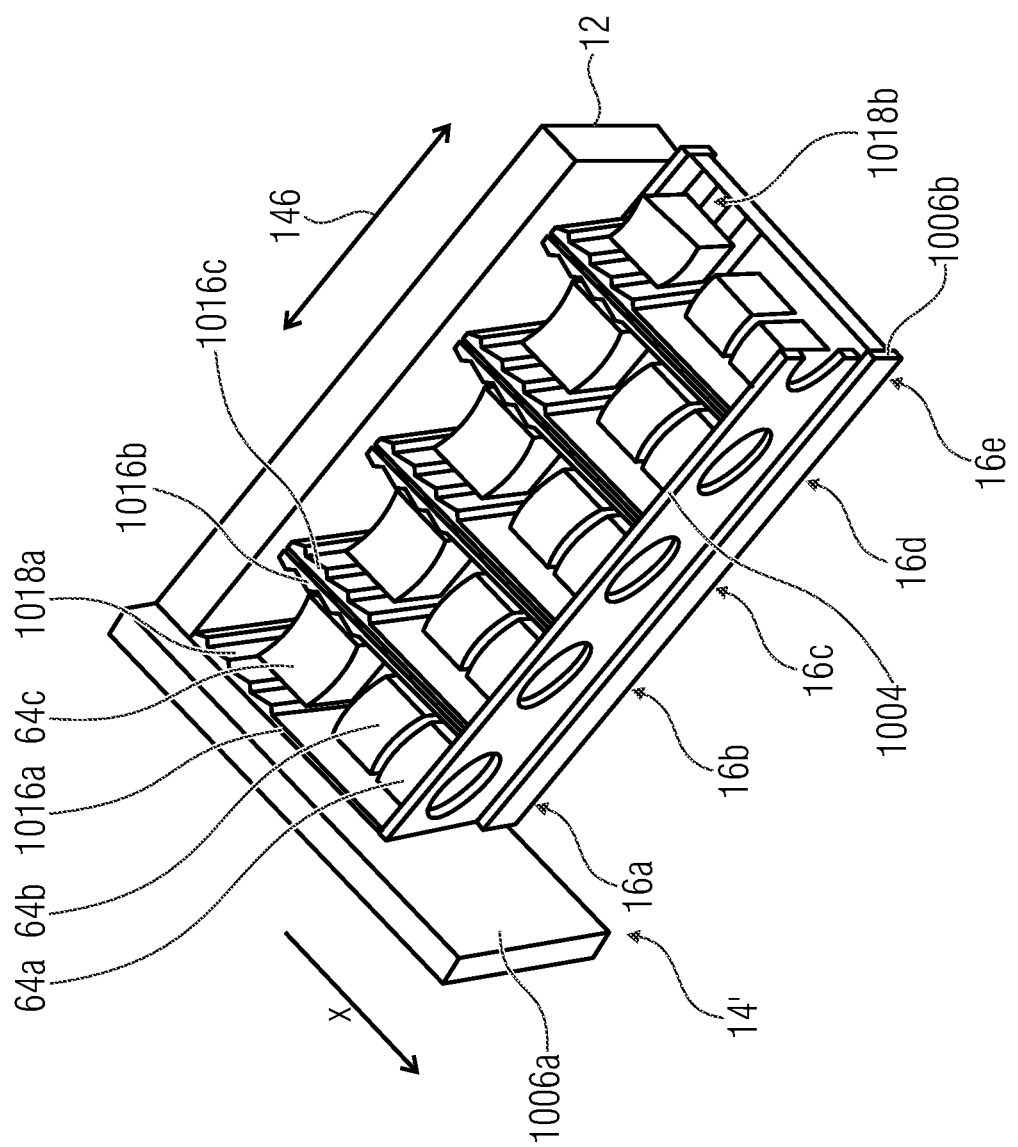
FIG. 2 shows a schematic perspective view of a further multi-aperture imaging device according to an embodiment.

FIG. 2 shows a schematic perspective view of a multi-aperture imaging device 2000 including an array 14'. The array 14' includes at least five optical channels 16a-e that are arranged in a line beside one another along the line-extension direction 146. For better illustration, the optical channel 16e is illustrated in a perspective side sectional view. The array 14' includes the sidewall structures 1006a and 1006b, wherein the sidewall structure 1006b is formed, for example, as bottom side of the array 14'. In this context, it should be noted that the terms such as "top side, bottom side, left side or right side" used herein can be arbitrarily exchanged with one another, for example when the orientation of the array 14' and/or multi-aperture imaging device 2000 in space is changed. These terms merely serve for a better understanding and do not have a limiting effect. A partition wall structure 1016a can be arranged between the sidewall structure 1006a and the lenses 64a-c of the optical channel 16a. Alternatively, a structure corresponding to the partition wall structure 1016a or an optical characteristic of the partition wall structure 1016a can also be formed integrally with the sidewall structure 1006a. According to further embodiments, the array comprises at least a second line of optical channels.

The array 14' includes partition wall structures 1016b and 1016c that are arranged between the optical channels 16a and 16b. The partition wall structures 1016b and 1016c can be formed of an at least partly opaque material, such that stray light suppression between the optical channels is obtained. According to an embodiment, the partition wall structures 1016a-b are plate-shaped and essentially formed in a planar manner. While the materials of the wall structure and sidewall structure are also suitable as material for the partition wall structures 1016a-b, a material differing therefrom, such as plastic, is advantageous since it is light and can be easily coated with other materials or can be re-shaped, for example for implementing microstructures. Plastic can also be useful when the partition wall structures 1016a-b are arranged such that they do not take on any essential supporting characteristics in the housing 1002 or merely maintain a distance between a top side and the bottom side (such as the sidewall structure 1006b and an opposing sidewall structure) of the housing. While the partition wall structures 1016b and 1016c are illustrated as two elements, merely one partition wall structure can be arranged between the optical channels 16a and 16b. At least one partition wall structure each can be arranged between two adjacent optical channels 16a and 16b, 16b and 16c, 16c and 16d or 16d and 16e.

The partition wall structures 1016a-c can be arranged as inner partition walls between two optical channels 64a-c and can be structured identically across the module (the multi-aperture imaging device). Further, the partition wall structures 1016 can be mirror-symmetrical with regard to a longitudinal extension direction or a longitudinal extension plane; this means the same can each be configured symmetrically to the respective optical channels.

At least one of the optical channels 16a-e can comprise several optics 64a-c as described below exemplarily for the optical channel 16a. According to one embodiment, all optical channels 16a-e of the array 14' are configured the same, such that the following statements can be applied to other optical channels without any limitations. The optical channel 16a includes lenses 64a, 64b and 64c connected in series behind one another, each influencing an optical path by the optical channel. Here, "serial" means that an optical path runs successively through the serially arranged lenses 64a-c.

The lenses 64a, 64b and 64c can be mechanically fixed to one another. For example, the lenses 64a, 64b and 64c are connected to one another via lens holders, i.e., mechanical structures on the edge of the lenses. According to a further embodiment, the lenses 64a, 64b and 64c are mechanically fixed on a sidewall structure, for example, the sidewall structure 1006b or an opposing sidewall structure, for example, by means of an adhesive.

The lenses 64a, 64b and/or 64c may be arranged in a contact-less manner or at least in a manner transferring little force to adjacent partition wall structures 1016a and/or 1016b or other mechanical elements. Contact-less means that the lenses merely have an indirect mechanical connection to one another via the wall structure or sidewall structure. Thereby, during thermally induced expansion of the lenses 64a, 64b and/or 64c, abutting (mechanical contact) of the lenses on the partition wall structures 1016a and/or 1016b is prevented, such that by the thermally induced expansion of the lenses 64a-c no or merely little force is applied to the partition wall structures 1016a and 1016b and/or lenses of adjacent optical channels 64a-c. Abutting could effect a change of distance of the optical channels to one another which would result in image errors. Preventing the abutment allows, on the one hand, little or no influence of adjacent channels induced thereby as well as only little or no induction of deformation forces on the wall structure 1004 and/or the sidewall structures 1006a and 1006b. This means that despite a thermally induced deformation of the lenses 64a-c, deformation of the housing of the array 14' is reduced or prevented. This leads, in a particularly advantageous manner, to a consistently high or at least only slightly affected image quality of the multi-aperture imaging device 2000. Alternatively, in particular for lenses 64a-c or lens stacks extending across a large extension of the optical paths of the optical channels, support of the same on partition wall structures can be advantageous for fixing a position of the optics. This means that lateral support towards the partition walls or the sidewall structures can be advantageous when the lens stacks become too long. For this, adhesives can be provided, wherein, in particular, UV light-curable adhesives are suitable. Alternatively, also a solder or the same can be used. Further, it is advantageous to implement these bonds and lateral supports, respectively, of a soft material such that a supporting effect results but only as little forces as possible are applied.

In an area facing the image sensor 12, the partition wall structures 1016a, 1016b and/or 1016c can comprise structures 1018a, comprising optically partly scattering and/or partly absorbing and/or partly reflecting characteristics. The optically partly scattering or partly absorbing structure 1018a is configured to scatter or reflect light leaving the optical channel 16a laterally, perpendicular to the optical path 17a, which impinges on the optically partly scattering or partly absorbing structure 2018 to a small extent towards the image sensor 12. The light leaving the optical channel 1016a may be reflected back and/or absorbed in the direction of the object area. This enables high image quality of an image received and/or converted by the image sensor 12 since an amount of stray light is reduced.

As illustrated for the at least partly scattering or partly absorbing and/or partly reflecting structure 1018b, a respective structure can also be arranged on a sidewall structure such as the sidewall structure 1006b or can be formed integrally with or on the same. This means that the sidewall structure can comprise the optically partly scattering or partly absorbing structure 1018a in an area arranged facing the image sensor 12. If merely a partition wall structure is arranged between two optical channels 16a and 16b, 16b and 16c, 16c and 16d or 16d and 16e, the same can comprise a structure 1018 comprising partly scattering, partly absorbing and/or partly reflecting characteristics, on both main sides facing an optical channel. The partly scattering, partly absorbing and/or partly reflecting structure 1018 can also be referred to as a so-called "baffle".

The multi-aperture imaging device 2000 can be configured such that the array 14' is arranged moveably with regard to the image sensor 12, so as to obtain a variable distance between the optics of the optical channels 16a-e and the image sensor 12, such that a focus of the multi-aperture imaging device 2000 is varied and corrected, respectively.

The optics of the optical channels 16a-e can be moveable together with the wall structure 1004 and the sidewall structures 1006a and 1006b along a direction x with regard to the image sensor 12. This allows adaptation of a focus of the multi-aperture imaging device 2000. Between the optics of the optical channels 16a-e facing the image sensor, for example, the lens 64c, and the image sensor 12, a further wall structure can be arranged which can form an exit side of optical paths of the optical channels. The wall structures can be connected to one another via sidewall structures, such as the sidewall structure 1006b and/or the sidewall structure 1006a. The direction x can, for example, run parallel to optical paths of the optical channels 16a-e between the image sensor 12 and the optics of the optical channels 16a-e. Alternatively or additionally, the direction x can run perpendicular to the line-extension direction 146.

In other words, according to embodiments described herein, a housing concept is suggested for an array of optical channels having, contrary to common injection molded plastic housings, a significantly reduced thermal expansion and hence heavily improved thermal stability. This results in a simplified and qualitatively improved assembly of the total image from the partial image as well as more robust 3-D image data. The concept does not only consist of substituting the materials of known solutions but also includes the advantageous arrangement of the respective housing components. Conventional housing and lens geometries prevent cost-effective production of housings for optical channels allowing at the same time high image quality in varying environmental temperatures.

Housing parts formed in plate-shapes can be produced extremely inexpensively and with high quality and precision. Advantageous materials are, for example, glass, glass ceramic, ceramic or silicon. Glass ceramic can have an amorphous, polycrystalline or crystalline structure. Ceramic and/or silicon can be available and can be used as polycrystalline or crystalline material. Producing the plate structures can be performed, for example, by a sawing process, a grinding process and/or breaking process. Alternatively, for example, a laser cutting process can be used for singularizing the plate structures after common production. Additional structures, such as the optically partly scattering, partly absorbing and/or partly reflecting structures 1018 and/or subsequently discussed guiding structures can be arranged, for example, by additional production steps that are performed prior to or after singularization. For example, by means of hot stamping, a topography can be deposited on the plate structures such that the topography structures are formed integrally with the respective plate element.

Optically functional areas, such as the structures 1018 and/or diaphragm structures 1012 can be obtained by additional darkening by depositing layers, layer stacks or the same. The layers can be formed in an absorptive and/or dielectric manner. Further, topographic microstructures can be used for realizing the baffle structures. A superposition of surface characteristics, (for example, in an absorptive manner) with an optically scattering microstructure, allows superposition of an absorbing effect with a scattering affect.

Figure 3:
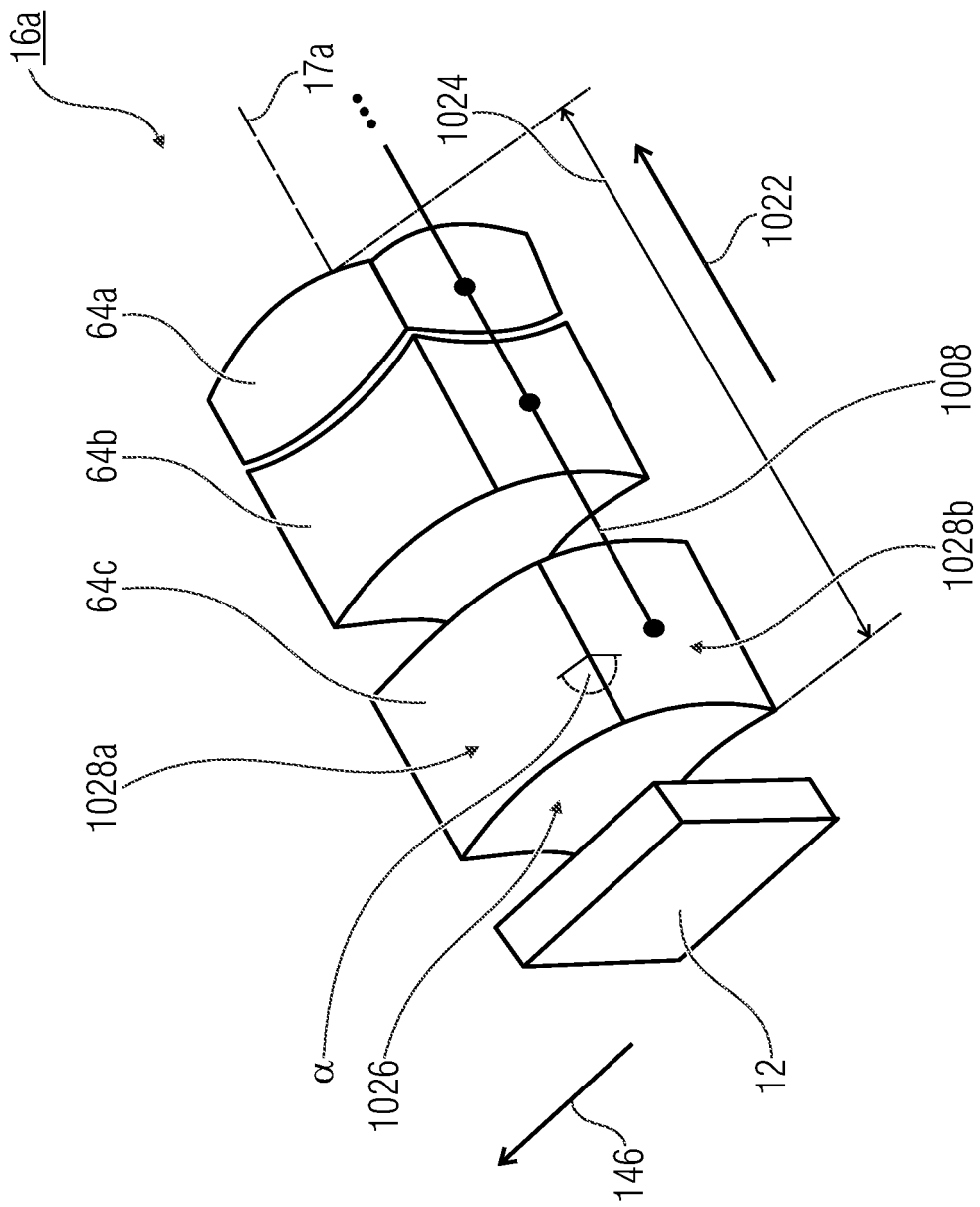
FIG. 3 shows a schematic illustration of an optical channel according to an embodiment comprising three lenses.

FIG. 3 shows a schematic illustration of the optical channel 16a. As described in the context of FIG. 2, the optical channel 16a comprises lenses 64a, 64b and 64c. The optics or lenses 64a-c can also be considered as optics elements of a total optics of the optical channel 16a. The lenses are, for example, mechanically connected to one another via the mechanical mounting element 1008. Simply put, the optics elements 64a-c are serially arranged. The optical path 17a can run parallel or anti-parallel to a direction 1022 indicating an axial extension direction of the optical channel 16a.

The lenses 64a-c can be arranged in a contact-less or at least in a soft manner, i.e., transferring little force, with respect to sidewall structures or other optics in the multi-aperture imaging device along the line-extension direction 1046 and laterally adjacent to the optical channel along a positive and/or negative direction of the line-extension direction 146. A length 1024 of the optical channel 16a and the housing 1002 can be determined, for example, by respectively facing-away surfaces of the optical element 64a (facing away from the image sensor) and the optics element 64c (facing the image sensor) and along an optical axis of the optical channel. In an area of at least 50%, at least 70% or at least 80% of the length 1024, the serial arrangement of the optics elements 64a, 64b and 64c as well as the mechanical connecting elements 1008 can be arranged parallel to the line-extension direction 146 in a contact-less manner with respect to other mechanical structures, such as partition wall structures.

Optics 64 and the individual lenses 64a, 64b and/or 64c can be mechanically fixed to a sidewall structure, such as a bottom side or a top side, for example, by means of adhesive and/or by means of alignment structures described below. Such an arrangement allows a contact-less arrangement of the optics of the optical channel along the positive and/or negative line-extension direction 1046. Mounting by means of adhesion can, for example, be performed by means of a thermally activated adhesive, adhesive becoming active at room temperature, by means of ultra violet radiation-cured adhesive and/or by means of an adhesive tape. Alternatively or additionally, the lenses can be mounted by means of laser soldering and/or by means of clamping.

While the lenses 64a, 64b and/or 64c can also be formed as round or oval lenses, at least one of the lenses 64a-c can comprise a first, second, third and fourth secondary side 1028a-b connecting a first optically effective main side 1026 and a second optically effective main side of the lens. A main side of a lens can be indicated by an entry and/or exit of the optical path 17a. The main sides 1026a-b can be arranged (by neglecting surface curvatures) essentially parallel to one another. Two juxtaposed secondary sides 1028a and 1028b can be arranged at an angle α of at least 60° and at the most 120°, of at least 80° and at most 100°, or of at least 85° and at the most 95°, for example, by approximately 90°. For example, at least one of the lenses 64a-c and/or the obtained total optics can have a rectangular or square cross section. Secondary sides 10281 and/or 1028b configured in a planar manner can allow an increased contact area for connecting means (for example, adhesive or solder or the same) for a component to be mounted thereon.

An arrangement of the total optics of an optical channel along the line-extension direction 146 that is contact-less or at least applying little force with respect to adjacent optical channels at least across a large area of the length 1024, allows that, during thermal deformation, an optical characteristic of a respective (partial) lens 64a, 64b and/or 64c is changed and/or that a distance between the lenses changes. Such a corruption of the image captured by the total optics can be corrected by refocusing the optical channel 16a, for example, by means of autofocus. Preventing or at least reducing transverse forces on other optical channels reduces or prevents influences of the respective optical channels at the same time, such that a correspondence of partial areas within the object area is mostly maintained.

FIG. 4a shows a schematic top view of a multi-aperture imaging device 4000 where an at least partly opaque structure 1032a, 1032b or 1032c, respectively, is arranged between image sensor areas 58a and 58b, 58b and 58c and 58c and 58d. The at least partly opaque structures 1032a to 1032c are configured to reduce or prevent crosstalk between the optical channels 16a-d. Crosstalk between the optical channels 16a-d means an exit of light from a first optical channel and an entry of this stray light into another optical channel. The at least partly opaque structures 1032a-c can at least reduce such a transfer of stray light, such that, all in all, a higher image quality is obtained.

The at least partly opaque structures 1032a-c can taper along the x direction, wherein the tapering can be adapted, for example, to a viewing angle of the respective optical channel 16a-b which results in further optimization of stray light suppression. According to other embodiments, the at least partly opaque structures 1032a, 1032b and/or 1032c are formed differently, for example, straight, this means with an approximately constant cross section. The at least partly opaque structures 1032a-c can be formed in the same way or differently. For example, channel-individual adaptation of the geometry of the at least partly opaque structures 1032a-c can be performed.

The wall structures 1004a and 1004b can each be mechanically fixed to the sidewall structures 1006a and 1006b, such that the sidewall structures 1006a and 1006b define a distance between the wall structures 1004a and 1004b. The housing of the multi-aperture imaging device 4000 can be formed such that the distance between the wall structures 1004a and 1004b is defined by, at the most, two sidewall structures 1006a and/or 1006b. For example, the distance can also be defined by merely one of the sidewall structures 1006a and 1006b. Additional sidewall structures, such as on a top side and/or a bottom side of the housing can be arranged such that the same are not fixed to the wall structures 1004a and 1004b, i.e., do not define the distance between the wall structures. This allows that the deformation or torsion of the housing is reduced or prevented during temperature induced change of shape of the lenses 64a-d which can result application of force to the wall structures 1004a and/or 1004b, since, for example, the respective deformation forces decrease in the sidewall structures 1006a and 1006b without coupling to one another via further sidewall structures.

In other words, additionally, inner partition walls 1032 may be arranged outside an imaging channel, which do not extend across the entire length of the structure, i.e., the optical channels in the housing and may have a wedge-shaped cross-section (seen from the top). The housing can be configured such that only two walls (respective inner or outer sidewall structures or partition wall structures) define the distance between front and rear glass bodies (wall structures) which include alignment structures and, if need be, lenses.

FIG. 4b shows the multi-aperture imaging device 4000 of FIG. 4a where the optical channel 64a is configured to project two partial areas. A first partial area of the object area is projected on the image sensor area 58a. A second partial area of the object area is projected on the image sensor area 58b. The at least partly opaque structure 132 is arranged between the first image sensor area 58a and the second image sensor area 58b in order to reduce or prevent crosstalk and/or transfer of stray light between the image sensor area 58a and the image sensor area 58b. One advantage of multi-use of optics within an optical channel is a possible reduction of the installation size since the installation space requirement for optics is reduced. The optics 64a can, for example, be configured in a rotationally symmetric or mirror-symmetric manner with respect to the image sensor areas 58a and 58b or a center axis between the image sensor areas 58a and 58b in order to allow simultaneous projection of two or several partial areas of the object area. The at least partly opaque structure 132a can taper along a direction x facing away from the image sensor 12.

Figure 5A:
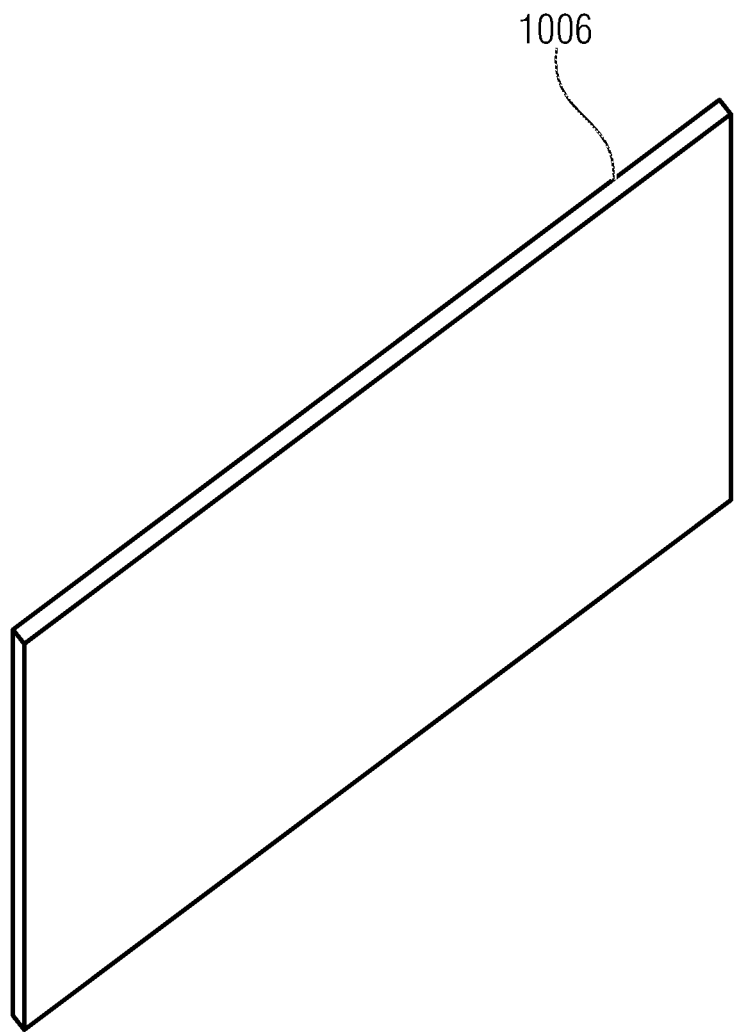
FIG. 5a shows a schematic perspective view of a sidewall structure for a multi-aperture imaging device according to an embodiment.

FIG. 5a shows a schematic perspective view of a sidewall structure 1006. The sidewall structure 1006 can be formed as a simple plate-shaped structure which allows a simple and cost-effective production. Alternatively, the illustrated sidewall structure 1006 can also be arranged as a partition wall structure as discussed in the context of FIG. 2.

Figure 5B:
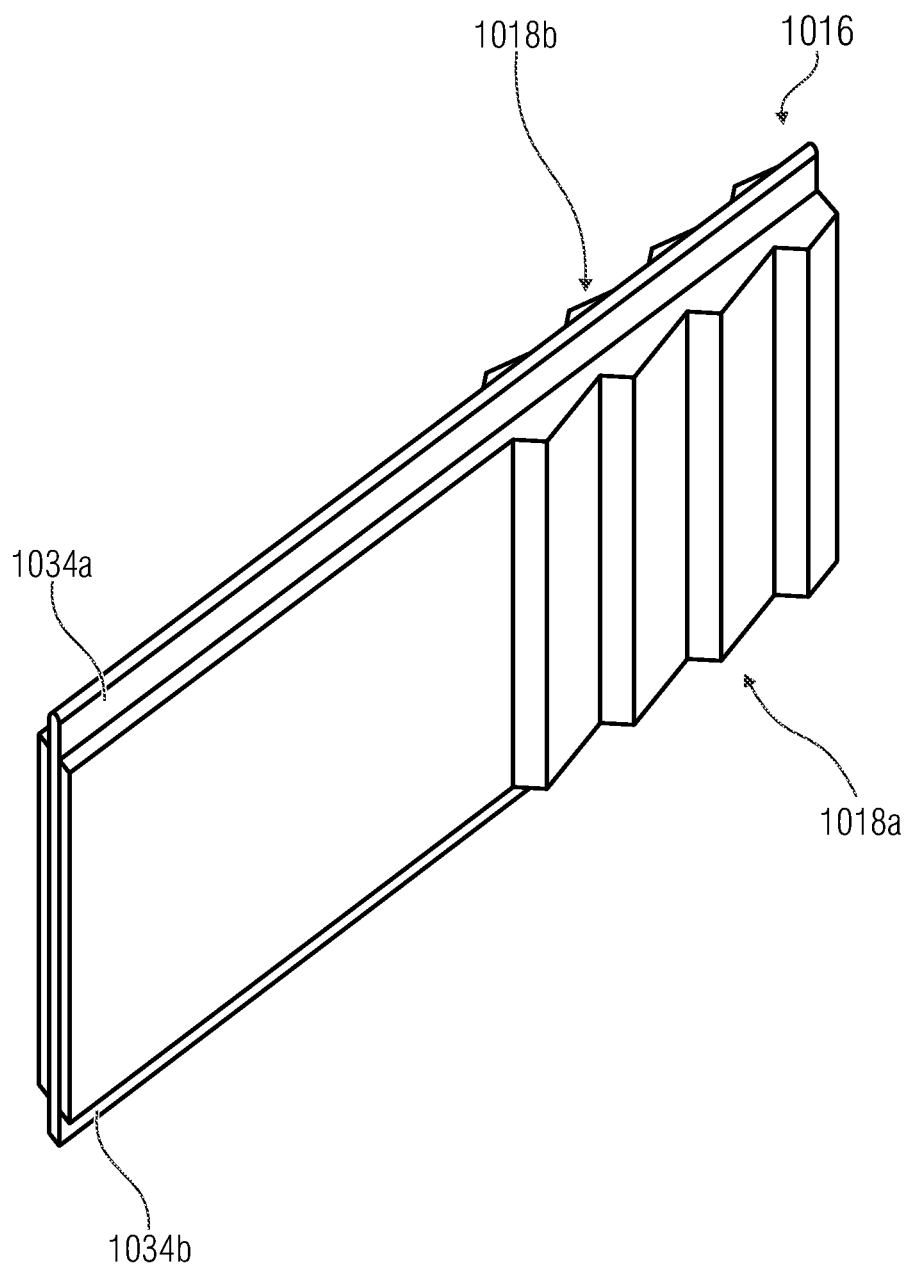
FIG. 5b shows a schematic perspective view of a partition wall structure for a multi-aperture imaging device according to an embodiment.

FIG. 5b shows a schematic perspective view of the partition wall structure 1016 as described in the context of FIG. 2. The partition wall structure 1016 can be essentially formed as a plate-shaped structure and can have optically or at least partly scattering and/or at least partly absorbing and/or at least part reflecting structures 1018a and 1018b on both sides, i.e., both main sides. The scattering effect can, for example, be effected by an implementation of microstructures on the surface as indicated by the surfaces that are inclined to one another. The at least partly absorbing characteristic can be effected by coating and/or an additional material on the main sides of the partition wall structure 1016. Simply put, in addition to darkening by depositing layers, layer stacks or the same that are absorptive and/or dielectric, such that absorption is enabled, an overlapping microstructure can be arranged for obtaining scattering.

Further, the partition wall structure 1016 can comprise guiding springs 1034a and/or 1034b extending along a main extension direction of the partition wall structure 1016 on secondary sides of the same, wherein the secondary sides connect the main sides of the partition wall structure 1016.

Figure 5C:
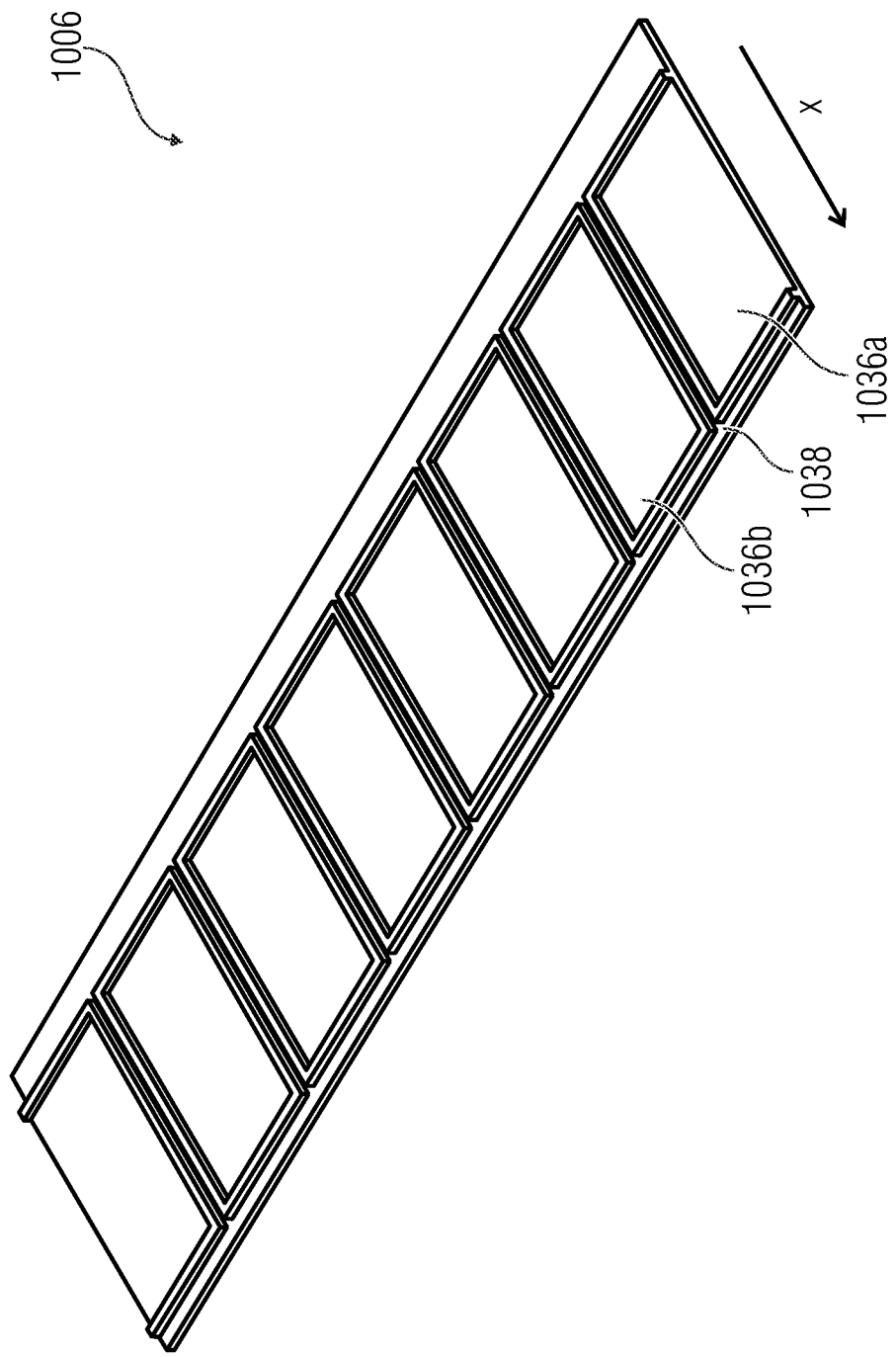
FIG. 5c shows a schematic perspective view of a sidewall structure for a multi-aperture imaging device according to an embodiment which can be used, for example, as top and/or bottom side of a housing.

FIG. 5c shows a schematic perspective view of a sidewall structure 1006 which can be used, for example, as top and/or bottom side of the housing. The sidewall structure 1006 can comprise projections 1036a and 1036b. The topography of the projection can be used as a mechanical guiding structure for other elements of the housing. In that way, the projections 1036a and 1036b can each form a circumferential frame, such that optics of optical channels can be arranged within the frame and can mechanically engage in the same. Further, an area 1038 between two adjacent projections 1036a and 1036b can serve as a guiding groove, for example, for allowing a position of partition wall structures 1016. In that way, a guiding spring 1034 can be guided in the groove 1038 and at least partly fix a position of the partition wall structure. This means the partition wall structure can be mechanically mounted. In or opposite to the x direction, the partition wall structures can, for example, be moveable or freely moveable. With reference to FIG. 4, for example, the distance between wall structures 1004a and 1004b can also be defined via the top side and the bottom side of the housing, while the sidewall structures 1006a and 1006b in FIG. 4 do not define the distance between the wall structures 1004a and 1004b.

Guiding grooves and/or guiding springs can also be used for defining distances between two elements. Thus, a definition of the axial distance of two wall structure can be performed via grooves/notches on the base and/or cover plate (sidewall structures), this means via the guides in the top side and/or bottom side.

Figure 5D:
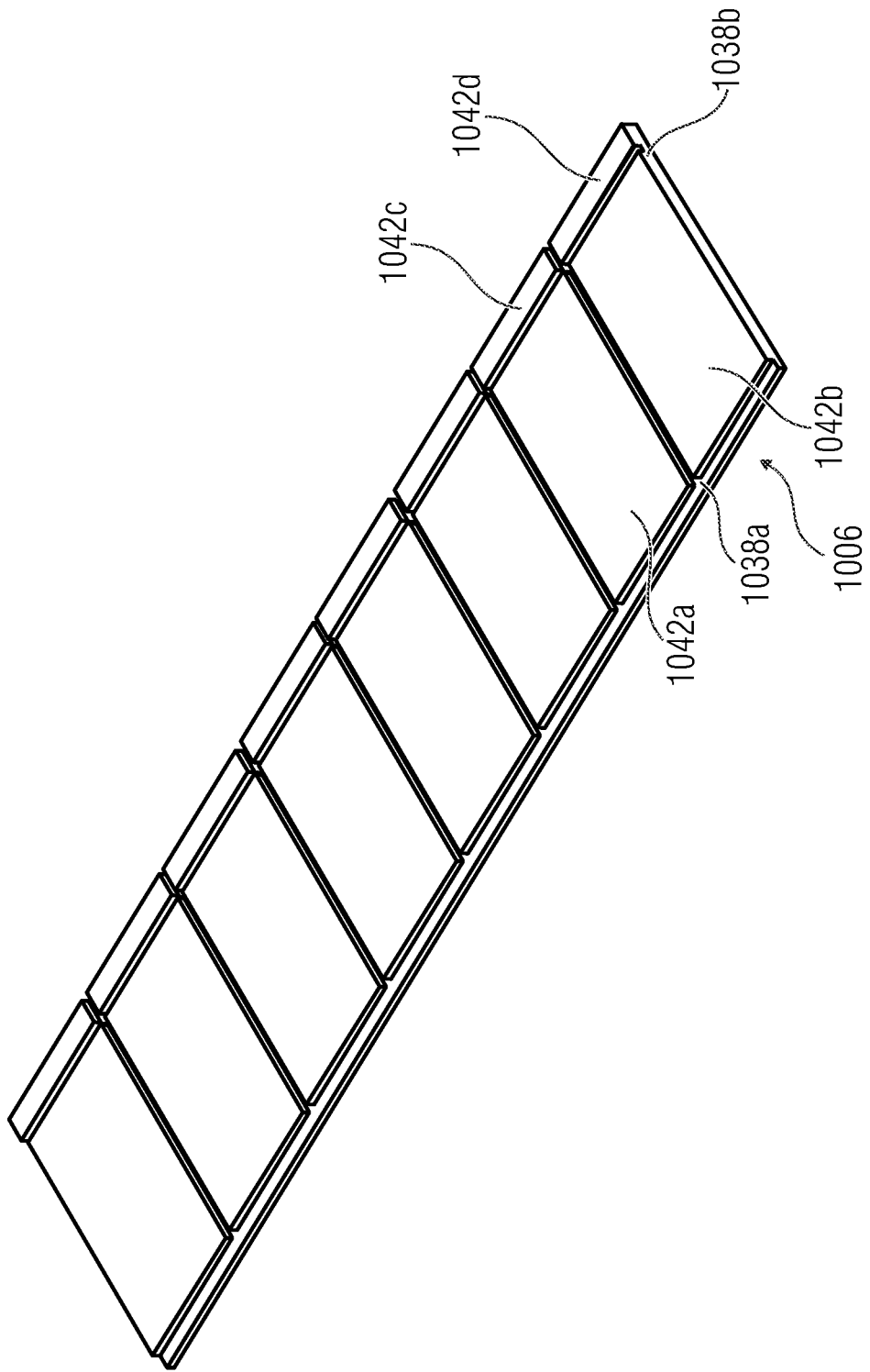
FIG. 5d shows a schematic perspective view of an alternative sidewall structure for a multi-aperture imaging device according to an embodiment.

FIG. 5d shows a schematic perspective view of an alternative sidewall structure 1006 which can also be used as top side and/or bottom side of the housing. The sidewall structure 1006 comprises planar projections 1042a-d that are arranged, for example, distributed in a 2-D matrix pattern. Along lateral extension directions, the planar projections 1042a-d can have extensions that differ from one another at least line by line or column by column. Areas 1038a and 1038b between two adjacent planar projections can be used as guiding grooves for partition wall structures and/or wall structures. In other words, the sidewall structure 1006 comprises mechanical guides 1038 that are configured to mechanically mount the partition wall structures.

Figure 5E:
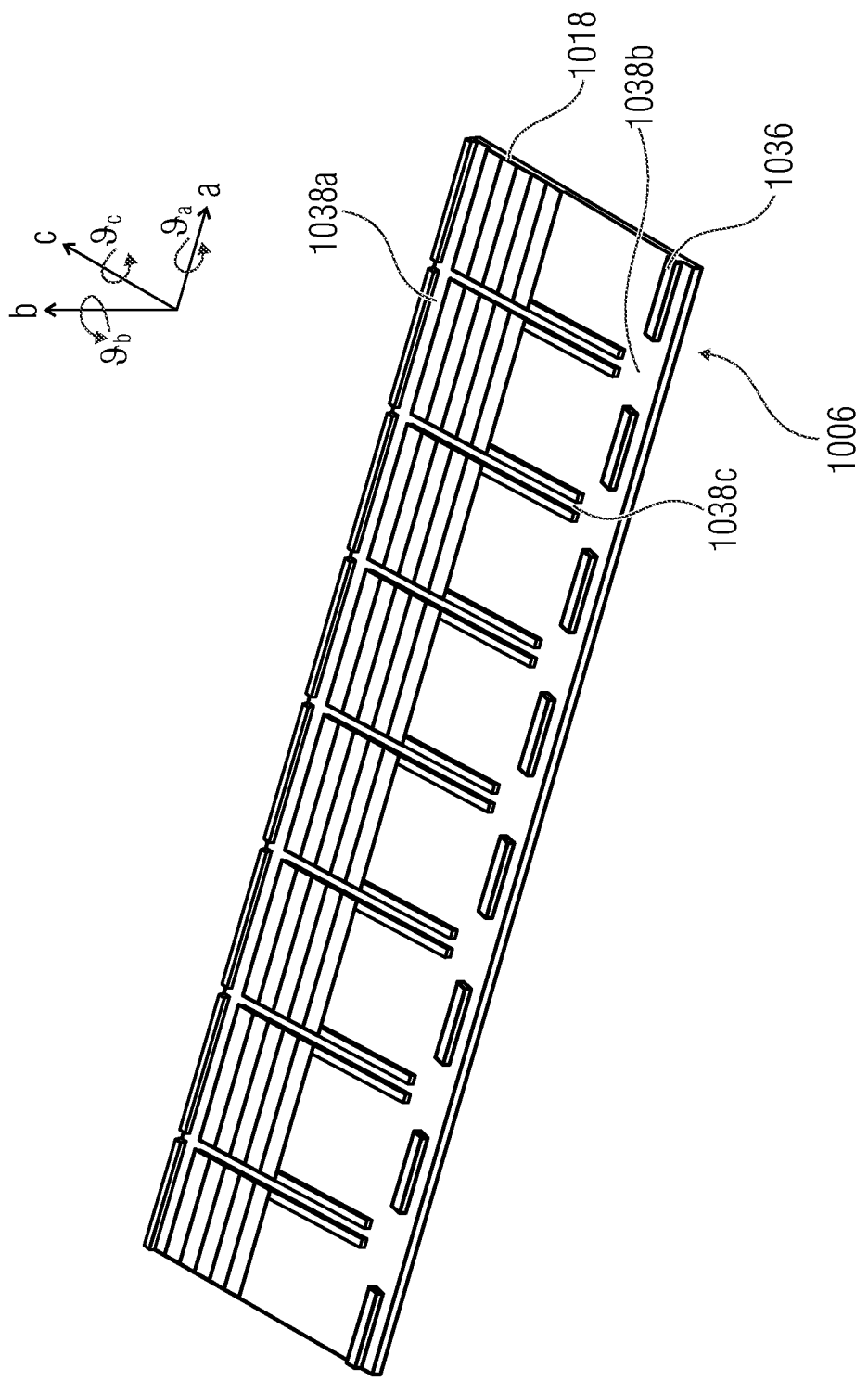
FIG. 5e shows a schematic perspective view of a further sidewall structure for a multi-aperture imaging device according to an embodiment where the projections are formed as interrupted frame.

FIG. 5e shows a schematic perspective view of a further sidewall structure 1006 where the projections 1036 are each formed as multi-piece, i.e., interrupted frame, such that two guiding grooves 1038a and 1038b are obtained along which the wall structures can be mounted. Further, the sidewall structure 1006 comprises at least partly scattering and/or at least partly absorbing and/or at least partly reflecting structures 1018. If, for example, partition wall structures are arranged with such structures, the optical channels can comprise at least partly scattering and/or at least partly absorbing and/or at least partly reflecting structures on four circumferential sides of the optical channels.

Thus, a notch (groove) along a direction a, for example, obtained by the area 1038a or 1039b, enables alignment of a structure along a direction c, along an angle $\vartheta_c$ and an angle $\vartheta_x$. Other notches, such as the notch 1038c along a direction c can enable alignment along the direction c and/or the direction b and/or the direction a. Further, a respective structure can be aligned with regard to an angle $\vartheta_c$ and/or an angle $\varepsilon_b$.

Figure 6:
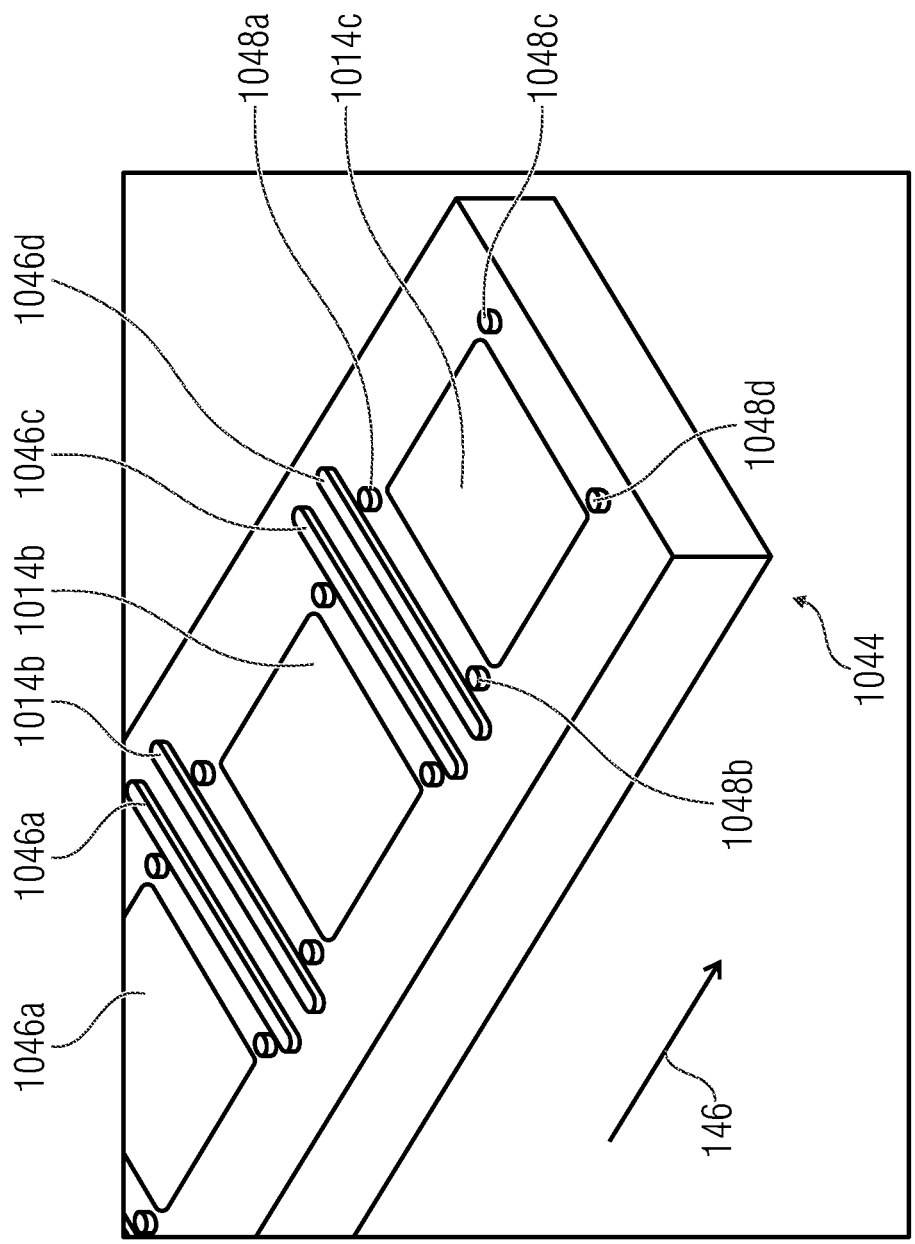
FIG. 6 shows a schematic perspective view of a portion of a wall structure for a multi-aperture imaging device according to an embodiment.

FIG. 6 shows a schematic perspective view of a section of a wall structure 1044, as it can be arranged, for example, as wall structure 1004 in the multi-aperture imaging devices 1000, 2000 or 4000. The wall structure comprises transparent areas 1014a-c. Projections or guides 1046a and 1046b or 1046c and 1046d are arranged between two adjacent transparent areas 1014a and 1014b or 1014b and 1014c. Between two adjacent projections 1046a and 1046b or 1046c and 1046d, the partition wall structures can be arranged in the housing, such that the partition wall structures are guided or fixed along the line-extension direction 146 by means of the projections 1046a-d.

Further, the wall structure 1044 comprises fixing areas 1048a-d that are arranged adjacent to the transparent areas 1014a-c and that are configured to allow mechanical fixing or locking of lenses of the respective optical channel. For example, the fixings 1048a-d can be formed as projections and/or recesses. Accordingly, the lenses can comprise complimentary structures or can be connected to a frame having these complimentary structures such that exact positioning of the lenses in the optical channel is enabled.

The elements 1048a-d can also be referred to as alignment structure for the lenses of the optical channel. With reference to FIGS. 5d and 5e, the areas 1038 can be referred to as alignment structures for the wall structures and/or partition wall structures arranged thereon. Projections and/or recesses in sidewall structures or wall structures can be obtained, for example, by a hot stamping method. This has the advantage that the wall structure or sidewall structure can be formed integrally and/or of a material that is deformed by means of the hot stamping method such that the respective structures are obtained. Alternatively or additionally, some or all of the structures can be arranged by means of a deposition method or adhesion method, for example UV replication. In this way, for example, a polymer structure can be obtained on a glass material, a glass ceramic, a ceramic and/or silicon. Simply put, a polymer layer can be arranged on a substrate.

This has the advantage that the structures can be obtained in a cost-effective and simple manner and with a high reproduction rate. In combination with an implementation of the wall structures and sidewall structures as plate-shaped structures, the elements and hence the housing can be produced in a very cost effective manner. The plates themselves can be singularized, for example, by means of a cutting method, sawing method and/or breaking method.

The projections and/or recesses can also be referred to as assembly structures on the respective plates. Continuous notches or grooves (areas 1038) on a respective base plate allow an alignment of the respective structures along individual directions in a direction along the line-extension direction 146.

Alternatively or additionally, an individual diaphragm can be mechanically arranged and/or adjusted on the structures 1048a-d. The structures 1048a-d can be used as fixed bearing for lenses, partition wall structures, sidewall structures and/or wall structures. Although all structures 1046 and 1048 are described such that the same are arranged on an inside of the housing 1002, the same or similar structures can also be arranged on an outside of the housing 1002, for example for arranging diaphragms or the same.

Further, the wall structures 1044 in the transparent areas 1014a-c can each additionally have optical functional areas, such as lenses or diffractive elements, that can be formed of the same material as the wall structure 1044 itself or the material deposited by means of UV replication. Here, the optical functional areas as well as the structures 1046a-d and 1048a-d can also be integrally formed.

Figure 7A:
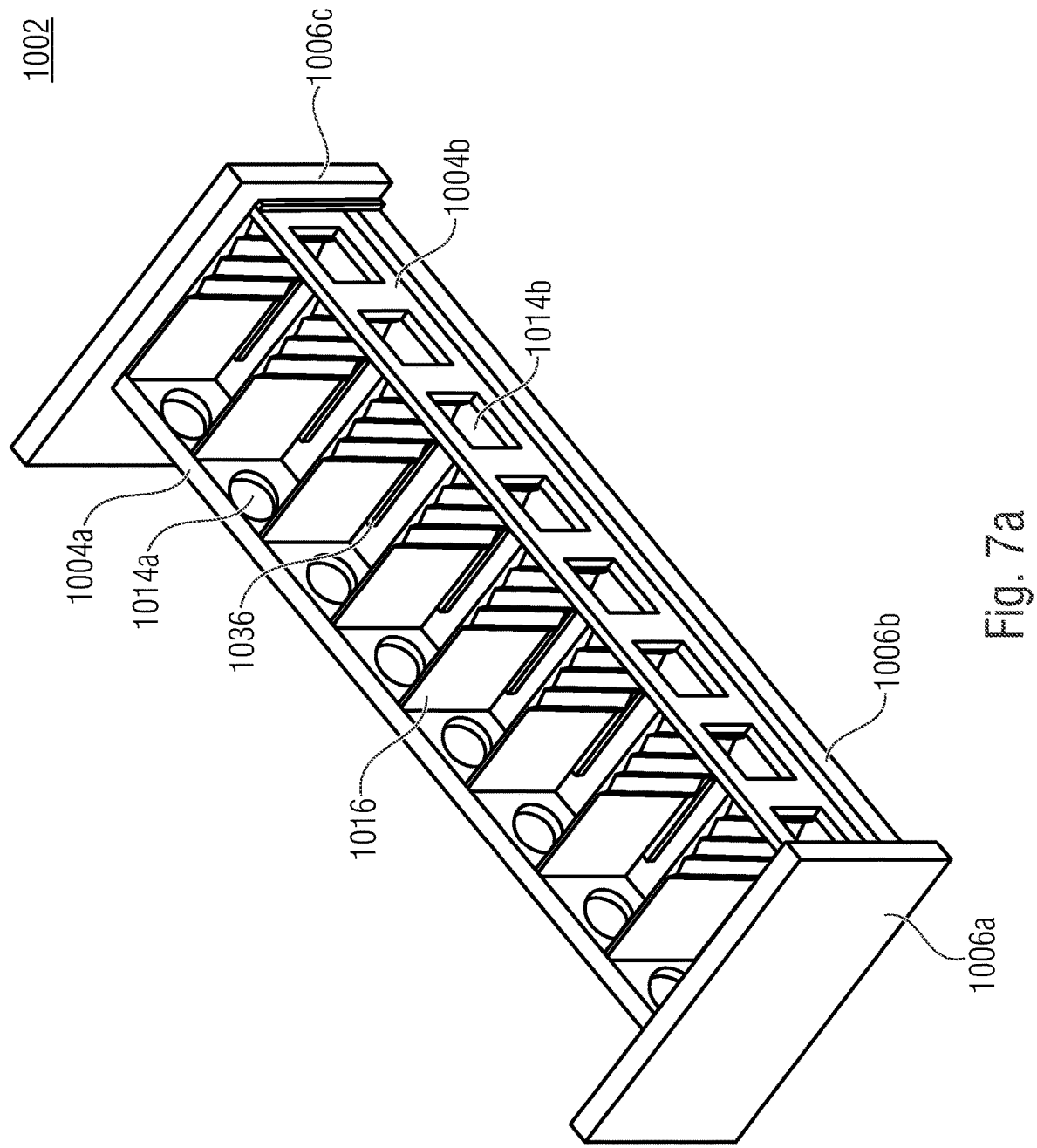
FIG. 7a shows a schematic perspective view of a possible implementation option of a housing for a multi-aperture imaging device according to an embodiment.

FIG. 7a shows a schematic perspective view of a possible implementation of the housing 1002 where exemplarily sidewall structures 1006a-c are arranged. The wall structure 1004a arranged facing the object area and facing away from an image sensor comprises the transparent areas 1014a that are adapted to the optics of the optical channels and/or to the partial areas of the object area and are, for example, configured in a round manner. The wall structure 1004b facing the image sensor is arranged opposite to the wall structure 1004a and comprises, for example, the transparent areas

1014b that are adapted to the image sensor areas of the image sensor and form, for example, a rectangular or square transparent area.

Partition wall structures 1016 are mounted, for example, on sidewall structures via grooves formed by the projections 1036. Further, the housing 1002 can comprise a further sidewall structure that covers, for example, the optical channels as top side or bottom side.

Alternatively, the partition wall structures 1016 can also be realized as planar structures as described, for example, in the context of FIG. 5a. Alternatively, the partition wall structures might also not be arranged. For example, it can be provided that the at least partly opaque structures 1032 are arranged on the image sensor and the housing is arranged in an environment where sufficient stray light suppression is provided.

Figure 7B:
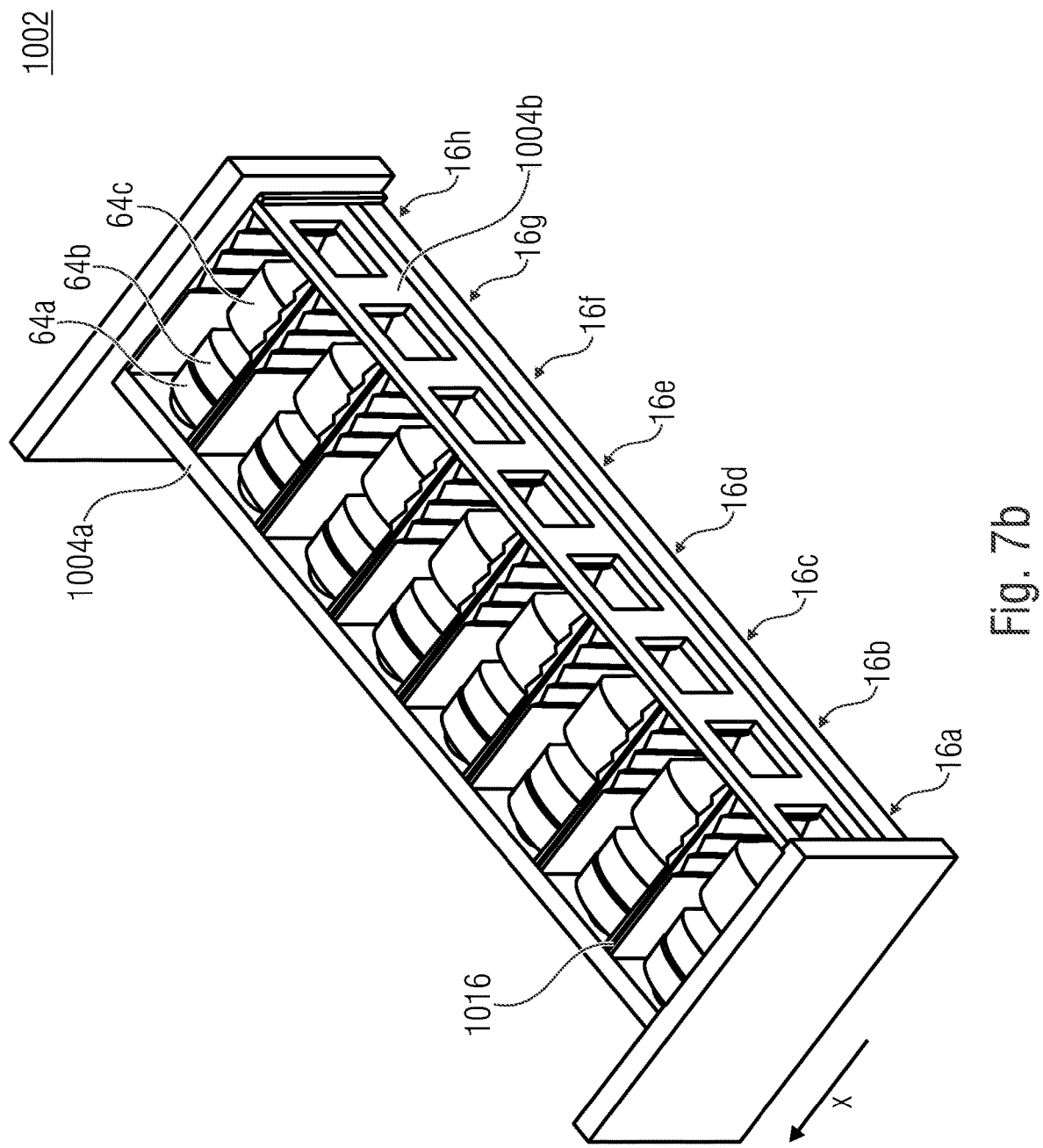
FIG. 7b shows the housing of FIG. 7a, wherein several lenses are arranged for each optical channel as described in the context of FIG. 3.

FIG. 7b shows the housing 1002 of FIG. 7a, wherein the lenses 64a-c are arranged for each optical channel 16a-h as described in the context of FIG. 3. The implementation of the housing 1002 of planar plates with possibly additional microstructures enables that an opening of the optical channels in the wall structures 1004a and 1004b maintains essentially the same size during a deformation of the lenses, independent of an axial position or deformation of the lenses 64a-c, such that an unamended high image quality is obtained. In known solutions, the extension of the opening increases in the axial direction towards the image sensor. Further, a rectangular cross-section of the lenses 64a-c is used to obtain a simple and robust mounting of the lenses and to allow a simple, almost planar, configuration of the partition walls and sidewalls since technically simple and hence cost-effective production methods can be used for producing the same. In known solutions, designs of round shapes to square shapes exist. The necessitated more complex housing shapes are obtained by means of injection molding of polymers having disadvantageously great dimension and shape variations during a change of temperature.

As the optics 64a-c can be arranged in a contactless manner or at least by transmitting little force with respect to adjacent partition wall structures 1016, the same do not abut, simply put, in a direction transversal to the viewing direction. Thus, no warping forces which can result in image errors are induced in the housing 1002.

According to an embodiment, the optical channels 16a-h can form a total amount of optical channels of the array projecting a total amount of partial areas of the object area on a total amount of image sensor areas of the at least one image sensor. The total amount of partial areas projected in that manner can completely project the object area to be captured. Further, structures are possible where each partial area of the total object area to be captured is transmitted by at least two channels 16a-h for realization. This serves to realize stereoscopic image capturing systems and/or the option of using methods of superresolution. Simply put, the entirety of the channels 16a-h can completely project the total object area several times.

While the optical channels are described above such that the same comprise one or three lenses or lens elements, alternatively, two or more than three lenses or lens elements can be arranged, such as 4, 5 or more.

FIG. 8 shows a schematic perspective view of a multi-aperture imaging device 8000, where the housing 1002, as described, for example, in FIG. 7b, is arranged, which additionally comprises the image sensor 12 and where further a beam-deflecting means 18 is arranged. The beam-deflecting means 18 is configured to deflect the optical paths of the optical channels 16a-b as illustrated, for example, for the optical path 17b. Outer walls of the housing 1002 can comprise structures that are configured for mounting further components. On the front side of the housing, i.e., facing away from the image sensor 12, such components can, for example, include the beam-deflecting means 18. Alternatively or additionally, these can be actuators that are configured to move the beam-deflecting means, the housing 1002 and/or the image sensor 12. As will be described below in more detail, these can be translational and/or rotational movements that allow focusing of the multi-aperture imaging device 8000 and/or optical image stabilization.

Further, on the rear side of the housing, i.e., facing the image sensor 12 or such that the image sensor 12 is arranged between the housing 1002 and the actuators, mounting of further components can be provided. For example, actuators spaced apart from the housing 1002 by the image sensor 12 can be configured to move the image sensor with respect to the housing. Alternatively or additionally, a connection to or with a further housing comprising further optical channels can be provided. On the side, i.e., along or opposite to the line-extension direction 146, connecting locations can also be provided for further housing and/or actuators. These can, for example, be permanent magnets and/or spring bearings that are configured to move the housing 12.

The embodiments described herein allow a reduction of the installation height by using a multi-aperture approach with linear channel arrangement. This further allows saving a second camera by beam deflection with a mirror, in particular when the beam-deflecting means 18 is configured to deflect, in a time variable manner, the optical path of the optical channels in different directions and hence in differing object areas. The above-described embodiment of housing allows an improvement of the thermal stability for improving image assembly and the robustness of 3D object data. This allows additionally a reduction of production costs and/or a reduction of the installation volume.

According to a further embodiment, the image sensor and some of the optical channels 16a-d can form a first partial module in the housing that is configured to (completely) capture the object area. Other optical channels, such as the optical channels 16e-h can form a second partial module together with the image sensor or a further image sensor, which also completely captures the object area. The wall structure 1004a and/or 1004b can extend across the optical channels of both partial modules. The image sensor of the two partial modules can be formed integrally as one image sensor. Alternatively or additionally, each of the partial modules can comprise at least one image sensor. For example, if a subsequently discussed actuator is arranged for a focusing means and/or an optical image stabilizer, the optical image stabilizer and/or the focusing means for optical channels can have a joint effect for optical channels of the first and second partial modules. This can be obtained in that the partial modules and their optical channels, respectively, are arranged in the same housing that experiences a relative movement with respect to other components, for example the image sensor or the beam-deflecting means. This means that at least one actuator of the focusing means is configured for adjusting a focus of the first partial module and the second partial module. Alternatively or additionally, a beam-deflecting means for deflecting an optical path of optical channels can be configured to deflect the optical paths of the first partial module and the second partial module together.

In the following, reference is made to devices including at least on multi-aperture imaging device. The devices can be imaging systems that are configured to project the object area by means of the at least one multi-aperture imaging device. The multi-aperture imaging devices described below can, for example, be the multi-aperture imaging device 1000, 2000, 4000 and/or 8000.

Figure 9A:
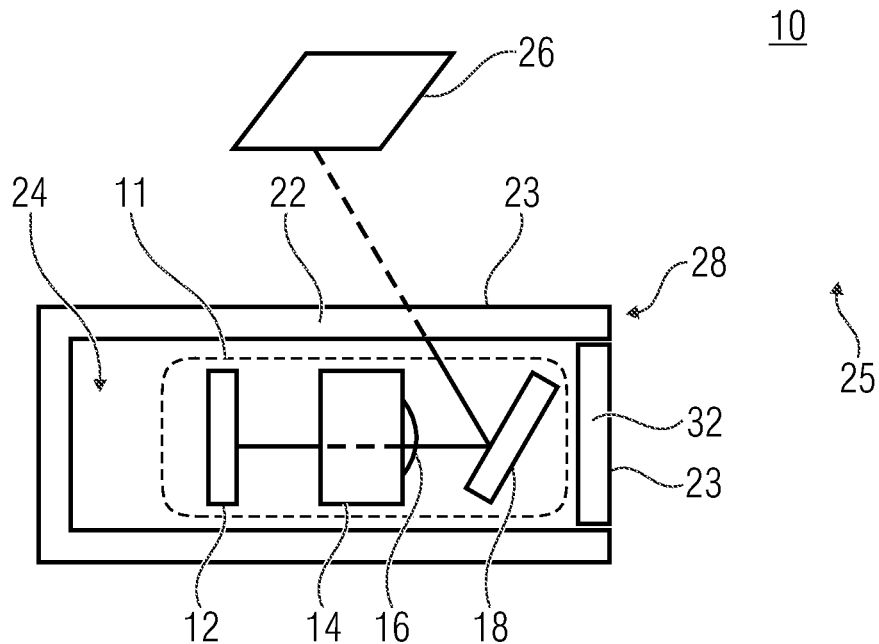
FIG. 9a shows schematic side-sectional view of a device according to an embodiment in a first operating state.

FIG. 9a shows a schematic side sectional view of a device 10 according to an embodiment in first operating state. The device 10 can be a mobile or immobile device, such as a mobile phone, a smartphone, a mobile computer such as a tablet computer and/or a mobile music player.

The device 10 includes a multi-aperture imaging device 11, such as the multi-aperture imaging device 1000, 2000, 4000 and/or 8000. The multi-aperture imaging device 11 comprises an image sensor 12, an array 14 of juxtaposed optical channels 16 and beam-deflecting means 18. The beam-deflecting means 18 is configured to deflect an optical path 17 of the optical channels 16 and will be discussed in detail below. The device 10 includes a housing 22 with external surfaces 23 enclosing a housing volume 24. This means the housing volume 24 can include an inner volume of the housing 22 and the volume of the housing 22. Thus, the housing volume includes also a volume claimed by the housing walls and is hence enclosed by the external surfaces 23 of the housing. The housing 22 can be formed in a transparent or opaque manner and can include, for example, plastic materials and/or metal materials. The beam-deflecting means 18 has a first position inside the housing volume 24. Holes or openings in the sides of the housing, such as for acoustical channels of microphones or for electrical contacts of the device 10, can be neglected for determining the housing volume 24. The housing 22 and/or members arranged within the housing 22 can block the optical path 17 of the optical channels 16 after deflection by the beam-deflecting means 18, such that a field of view 26 arranged outside the housing 22 that is to be captured by the multi-aperture imaging device 11 cannot be captured at all or only to a limited extent. The members can, for example, be an accumulator, printed circuit boards, non-transparent areas of the housing 22 or the same. In other words, instead of a conventional camera objective, a different, possibly non-optical, device can be arranged on a housing.

The housing 22 can comprise an opening 28 through which the housing volume 24 is connected to an external volume 25 of the housing 22. At times, the opening 28 can be completely or partly closed by a cover 32. The first operating state of the device 10 can be an inactive operating state of the multi-aperture imaging device 11 where the optical channels 16 are directed, for example, on the inner side of the housing 22 or are not deflected at all.

In other words, the installation height of the structure of the multi-aperture imaging device is at least partly determined by the diameter of optics of the optical channels 16 (lenses). In a (possibly optimum) case, the extension of the mirrors (beam-deflecting means) in this thickness direction is equal to the extension of the lenses in this direction. Here, however, the optical path of the optical channel 16 is restricted by the mirror 18. This results in a reduction of image brightness, wherein this reduction depends on the field angle. The present embodiments solve this problem by moving parts of or the total multi-channel camera structure, such that, in the operating state of the camera, parts of the structure project beyond the housing, e.g., of a smartphone compared to the non-usage state of the camera. The movement of the parts, such as the beam-deflecting means, can be rotational (folding out or folding open), translational (extending) or a mixed form. The additional movements of parts and the total system, respectively, allow a minimum structural shape in the non-usage mode of the camera, similar to known objectives of compact cameras, and a greater structural shape in the usage mode of the camera optimized for realizing the technical function.

Figure 9B:
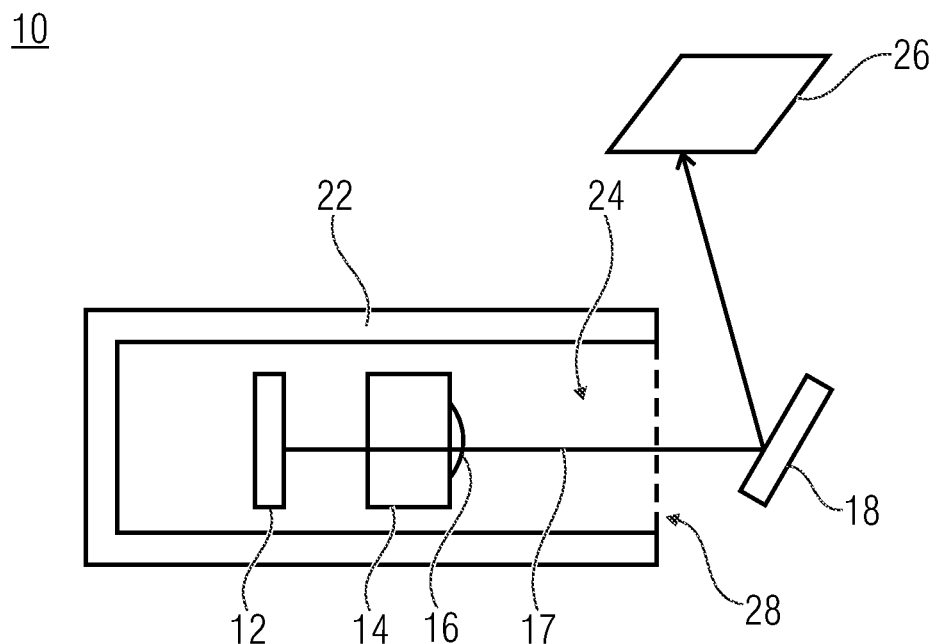
FIG. 9b shows a schematic side-sectional view of the device of FIG. 9a in a second operating state.

FIG. 9b shows a schematic side sectional view of the device 10 in a second operating state. In the second operating state, the beam-deflecting means 18 has a second position outside the housing volume 24. This enables the beam-deflecting means 18 to deflect the optical paths 17 of the optical channels 16 outside the housing volume 24 and the field of view 26 so that the same can be captured outside the housing 22 by the multi-aperture imaging device 11. The cover 32 can be moved away from the position shown in FIG. 9a, such that the beam-deflecting means 18 can be moved out of the housing volume 24 through the opening 28 of the housing 22. The beam-deflecting means 18 can be moved translationally and/or rotationally between the first position and the second position. It is advantageous that the members inside the housing 22 and/or the housing 22 itself do not block the deflected optical path 17 of the optical channels 16.

The multi-aperture imaging device 11 can be arranged in a camera housing which is arranged again at least partly inside the housing 22. The camera housing can be formed, for example, at least partly by a travel carriage as described in the context of FIG. 13. This differs from a concept where a single-channel camera is oriented in different directions by means of a folding mechanism in that in the present case rotation or tilting of the image sensor and/or the imaging optics can be prevented.

A total field of view can be captured by means of the device 10 such that, starting from the first position, the beam-deflecting means is moved into the second position, where the beam-deflecting means is placed at least partly outside of a housing volume. When the beam-deflecting means is in the second position, the total field of view can be captured by the array of juxtaposed optical channels of the multi-aperture imaging device whose optical paths are deflected by the beam-deflecting means.

Figure 10A:
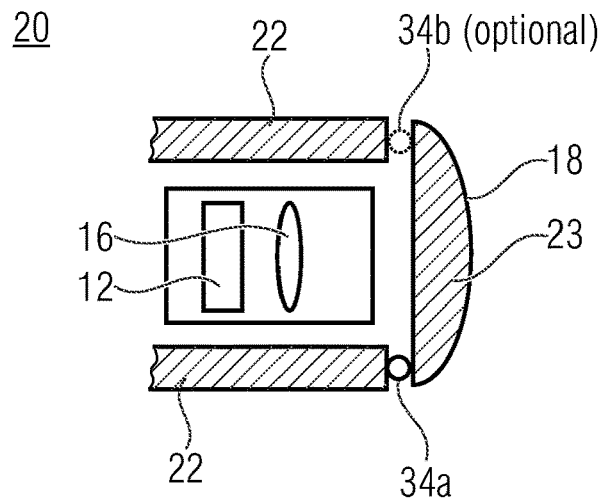
FIG. 10a shows a schematic side-sectional view of a device according to a further embodiment comprising a cover.

FIG. 10a shows a schematic side sectional view of a device 20 according to a further embodiment in a first operating state. The device 20 comprises the cover 23 which is pivoted on the housing 22, for example via a connecting element 34a and/or via an optional connecting element 34b. The connecting element 34a and/or 34b can be configured to allow tilting and hence rotational movement between the cover 23 of the beam-deflecting means 18 with respect to the housing 22 and can be formed, for example, as hinge or roller bearing.

The beam-deflecting means 18 can form a cover of the housing or can be part thereof. One of the beam-deflecting surfaces of the beam-deflecting means 18 can be an outer edge of the housing. The beam-deflecting means 18 comprising a first position and closes the housing 22 partly or completely. The beam-deflecting means 18 can comprise, for example, a reflective area for deflecting the optical path 17 and can comprise contact areas that are configured to form a mechanical contact with the housing 22 in the first position. Simply put, the camera might not or only hardly be visible when not in use.

Figure 10B:
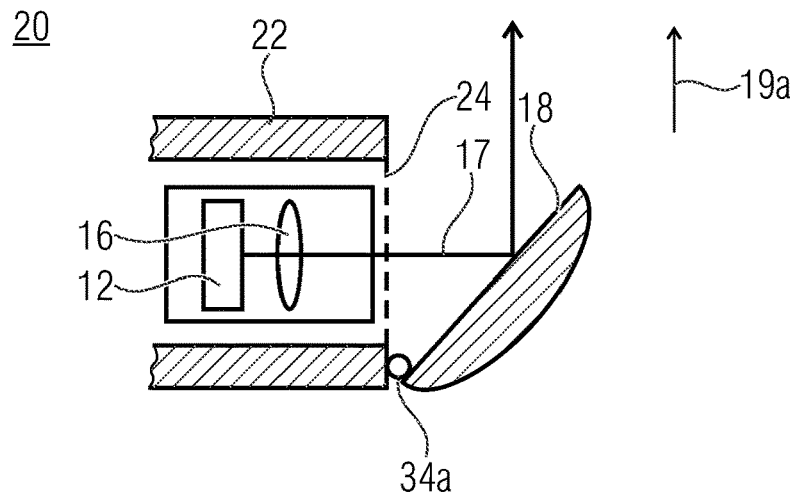
FIG. 10b shows a schematic side-sectional view of the device of FIG. 10a in a second operating state.

FIG. 10b shows a schematic side sectional view of the device 20 in a second operating state. In the second operating state, the beam-deflecting means 18 can be moved rotationally with respect to the housing 22, i.e., folded out, such that the housing volume 24 is opened. The rotational tilting allows an inclined or tilted orientation of the beam-deflecting means 18 with respect to a course of the optical path 17 of the optical channel 16 between the image sensor 12 and the beam-deflecting means 18, such that the optical path 17 is deflected in a first direction 19a at the beam-deflecting means 18.

Figure 10C:
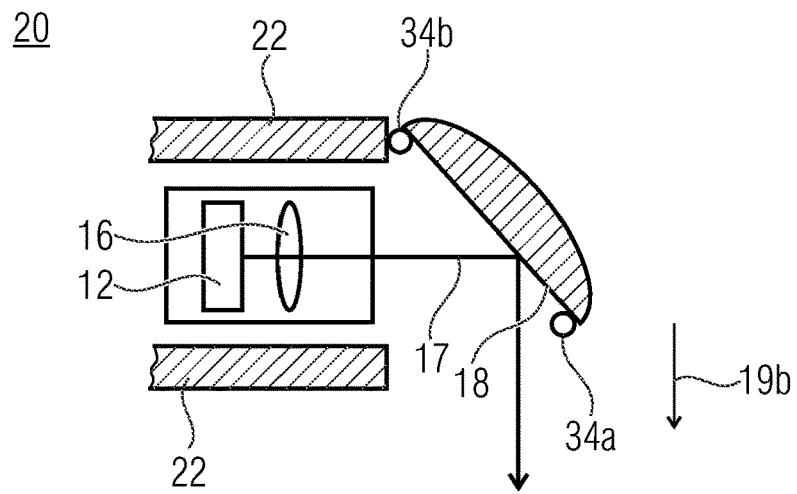
FIG. 10c shows a schematic side-sectional view of the device of FIG. 10a in a third position.

FIG. 10c shows a schematic side sectional view of the device 20 in a third position. The device 20 can be in the second operating state. Compared to the second position as illustrated in FIG. 16b, the beam-deflecting means 18 can deflect the optical path 17 of the optical channels 16 in a different direction 19b, such that a different field of view or a field of view positioned at a different location can be captured. For example, this can be a first side and an opposite side such as front side and rear side, left and right or top and bottom of the device 20 and/or a user into which the optical path 17 is deflected. The connecting elements 34a and 34b can be connected, for example, with a frame structure and the beam-deflecting means 18, such that the beam-deflecting means 18 can alternatively comprise the second or third position. By a switchable viewing direction of the multi-aperture imaging device, conventional solutions in particular in smartphones using two cameras with viewing direction to the front and back can be replaced by one structure.

Figure 11A:
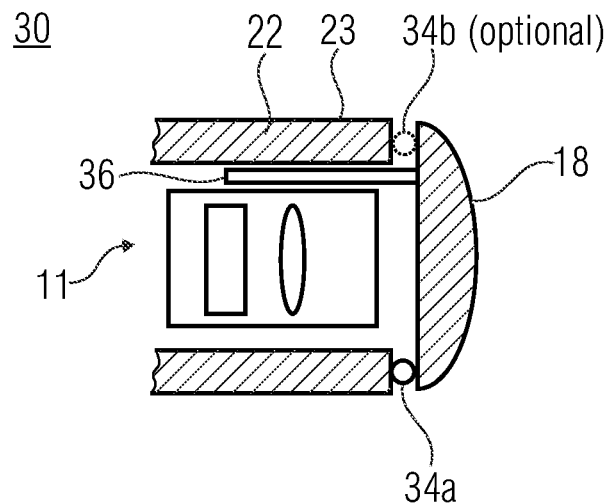
FIG. 11a shows a schematic side sectional view of a device according to a further embodiment in the first operating state comprising an at least partly transparent cover.

FIG. 11a shows a schematic side sectional view of a device 30 according to a further embodiment in the first operating state. Compared to the apparatus 20 as described in FIGS. 10a-c, the device 30 comprises an at least partly transparent cover 36 arranged between an outer edge 23 of the housing 22 and the multi-aperture imaging device 11. The at least partly transparent cover is connected to the beam-deflecting means 18 and configured to move based on a movement of the beam-deflecting means 18. The at least partly transparent cover 36 can, for example, comprise polymer and/or glass materials.

In other words, devices can be provided which allow encapsulation of the optics for protection from decontamination with the option of changing the encapsulated volume (moveable cover glasses).

Figure 11B:
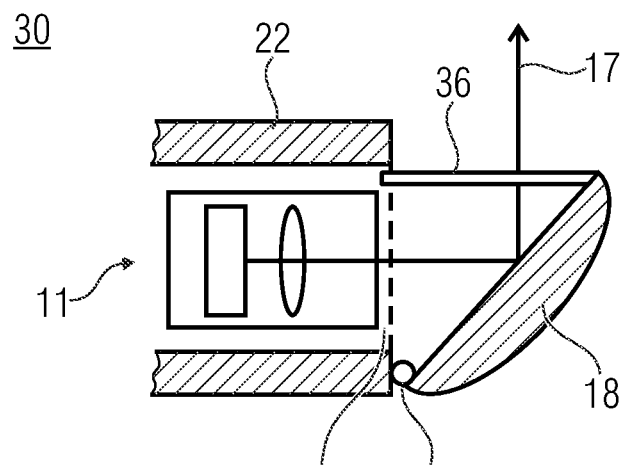
FIG. 11b shows a schematic side sectional view of the device of FIG. 11a in the second operating state.

FIG. 11b shows a schematic side sectional view of the device 30 in the second operating state. Compared to the device 20 in FIG. 10b, the at least partly transparent cover is moved at least partly out of the housing volume 24. This can be performed by a rotational movement of the beam-deflecting means around the connecting element 34. The beam-deflecting means 18 is configured to deflect the optical path 17 of the optical channels 16 such that the optical channels run through the at least partly transparent cover. The cover 36 is configured to reduce or prevent entry of particles, dirt and/or moisture into the housing volume 24. Here, the cover 36 can be formed in a transparent and/or partly opaque manner for the optical paths 17. The cover 36 can, for example, be opaque for specific wavelength ranges of electromagnetic radiation. It is an advantage of the cover 36 that due to the reduced amount of particles, dirt and/or moisture, long operating life of the device and/or a continuously high image quality can be obtained since contamination of optics of the optical channels is low.

Figure 11C:
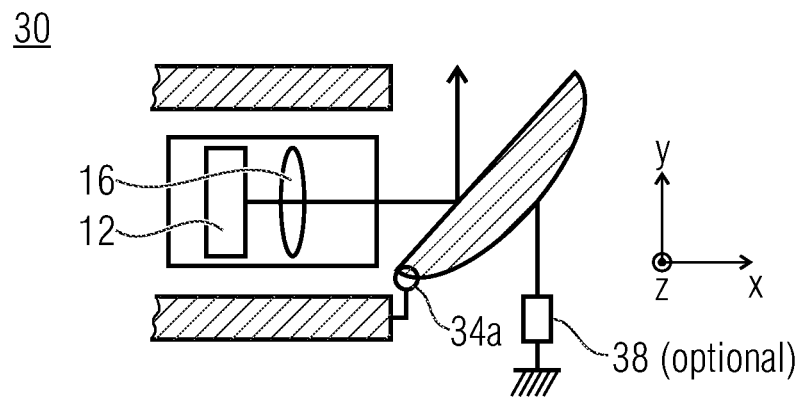
FIG. 11c shows a schematic side sectional view of the device of FIG. 11a where a beam-deflecting means is additionally moveable in a translational manner.

FIG. 11c shows a schematic side sectional view of the device 30 where the beam-deflecting means 18 is translationally movable with an optional actuator 38 along a direction y perpendicular to a direction x of the optical path 17 between the image sensor 12 and the optical channels 16 and perpendicular to a direction z perpendicular to a line-extension direction of the array of optical channels 16. The beam-deflecting means 18 can also be moved translationally around the connecting element 34 based on the rotational movement, for example around a guide, a level or the same.

The folding up (rotational movement) can be performed manually or by using an actuator. The optional actuator 38 can be arranged on the beam-deflecting means 18. Alternatively, the actuator 38 can be arranged between the housing 22 and the beam-deflecting means 18. The actuator 38 can be arranged, for example, between the housing 22 and the connecting element 34a and/or between the connecting element 34a and the beam-deflecting means 18. It is an advantage that due to the translational movement of the beam-deflecting means along the x direction of the housing, shading of the field of view to be captured by the housing 22 can be reduced.

FIG. 12a shows a schematic side sectional view of a device 40 according to an embodiment in the first operating state, in the first position the beam-deflecting means 18 is arranged inside the housing volume of the housing 22 and is configured to be moved, based on a translational movement 42, from the first position to the second position which is schematically illustrated in FIG. 12b. As illustrated in FIG. 12a, the housing can comprise the cover 32 which closes the housing 22 and an opening therein, respectively, in the first operating state. The beam-deflecting means 18 can be oriented in the first operating state such that the same has a minimum extension perpendicular to a direction x which is defined by the optical path inside the housing 22.

FIG. 12b shows a schematic side sectional view of the device 40 in the second operating state. The beam-deflecting means is moved out of the housing volume 24 based on the translational movement 42, for example, along the x direction. For this, the beam-deflecting means 18 can be moved through the opening 28. The beam-deflecting means 18 can be rotationally moveable around an axis of rotation 44. During the translational movement between the first operating state and the second operating state, the beam-deflecting means 18 can perform a rotational movement around the axis of rotation 44. An angular orientation of the beam-deflecting means can be amended compared to the first operating state of FIG. 12a, such that the area of the beam-deflecting means used by the optical path of the multi-aperture imaging device increases in comparison to the first operating state. A rotational movement 46 around the axis of rotation 44 allows a variable inclination of the beam-deflecting means 18 with respect to the optical path 17 between the optical channels 16 and the beam-deflecting means 18 and hence a variable direction in which the optical path 17 of the optical channel 16 is deflected. The optical channels 16 can comprise optics 64a-b.

In addition to the beam-deflecting means 18, optics 64a-b of the optical channels 16 and/or the image sensor 12 can be arranged outside the housing volume 24 in the second operating state. The optics 64a-b of the optical channels 16 and/or the image sensor 12, for example, can be moved together with the beam-deflecting means 18.

In other words, multi-aperture cameras with linear channel arrangement comprise several optical channels that are juxtaposed and each transmit parts of the total field of view. Advantageously, a mirror is mounted in front of the imaging lenses which can be used for beam deflection and contributes to reducing the installation height. In combination with a mirror that is adapted channel by channel, such as a facet mirror, wherein the facets are planar or curved in an arbitrary manner or provided with a freeform area, it is advantageously possible that the imaging optics of the optical channels are essentially structured identically, whereas the viewing direction of the channels is predetermined by the individual facets of the mirror array. A surface of the beam-deflecting means is at least mirrored at the reflecting facets allocated to the optical channels. It is also possible that the imaging optics of the channels are implemented differently, such that different viewing directions result by the angle of the mirror facet and the implementation of the respective optical channel. It is further possible that several channels use the same area of the beam-deflecting means and hence the number of facets is smaller than the number of channels. Here, the deflecting mirror can be pivoted, wherein the axis of rotation runs, for example, parallel to the extension direction of the channels. The deflecting mirror can be reflective on both sides, wherein metallic or dielectric layers (sequences) can be used. The rotation of the mirror can be analog or stable along one/several directions. Based on the rotational movement, the beam-deflecting means can be movable between at least a first position and a second position, wherein the optical paths are deflected in differing directions in each position. In a similar way as described for the positions of the beam-deflecting means 18 in FIG. 10-c, the beam-deflecting means can also be moved around an axis of rotation. In addition to the translational movement of the housing cover 32 and the beam-deflecting means 18, parts and all additional components of the multi-aperture imaging device, respectively, can be co-moved in a translational manner in the same direction, wherein the same or also different travel ranges are possible.

Figure 13A:
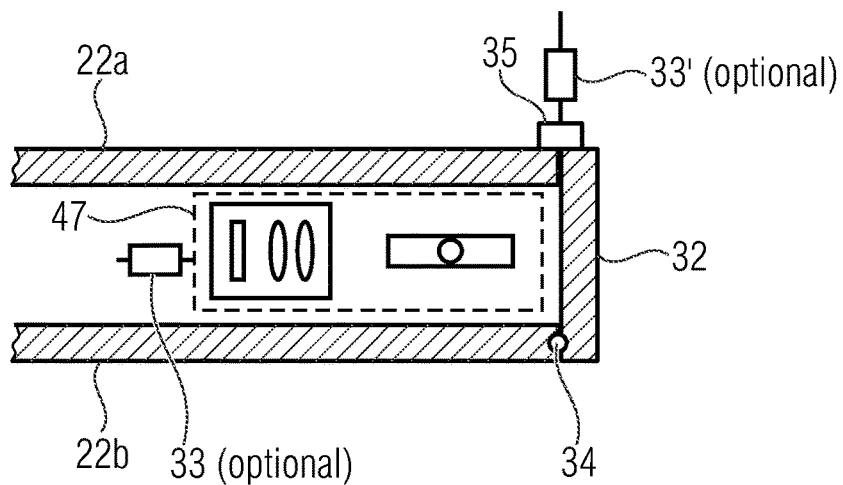
FIG. 13a shows a schematic side sectional view of a device according to an embodiment where the cover is arranged in a rotationally moveable manner.

FIG. 13a shows a schematic side sectional view of the device 50 where the cover 32 is arranged rotationally moveable via a moving element 34 on a housing side 22b of the housing 22. The beam-deflecting means 18 can be mechanically connected to a travel carriage 47. The travel carriage 47 can be considered as mechanical transport means for moving at least the beam-deflecting means 18. The device 50 can include an actuator 33 that is configured to translationally move the travel carriage 47. The actuator can include any drive, such as step motor, piezoelectric drive or a voice coil drive. As an alternative or in addition to the actuator 33, the device 50 can include an actuator 33' that is configured to release a mechanical lock 35 which locks the cover 32 and the housing on, at least, one housing side 22a. The beam-deflecting means or travel carriage 47 can be driven out of the housing by means of a spring force when the lock 33' is released. This means the lock 35 can be configured to maintain the beam-deflecting means 18 in the first position. The travel carriage 47 can also be arranged in the device 40. This means the travel carriage 47 can also be used for translational movement of the cover 32.

Figure 13B:
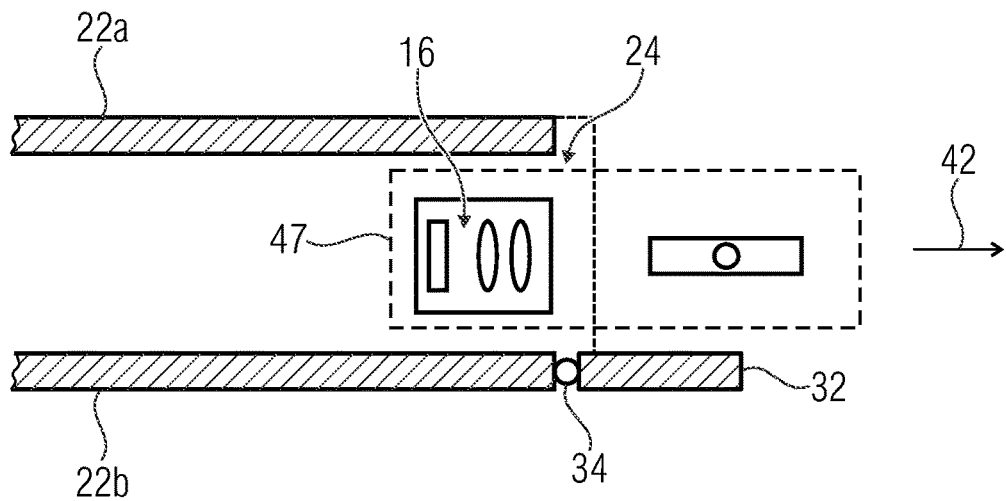
FIG. 13b shows a schematic side sectional view of the device of FIG. 13a where a travel carriage is translationally moveable.

FIG. 13b shows a schematic side sectional view of the device 50 where the travel carriage 47 is moved along the translational direction of movement 42, such that the beam-deflecting means 18 is moved out of the housing volume 24. The image sensor 12 and/or optics of the optical channels 16 can also be mechanically connected to the travel carriage 47 and can be moved together with the beam-deflecting means 18 to the same extent. Alternatively, the image sensor 12 and/or the optics of the optical channels 16 can be moveable to a smaller extent than the beam-deflecting means 18, such that a distance between the image sensor 12, the optics and/or beam-deflecting means 18 increases during extension. Alternatively or additionally, the image sensor 12 and/or the optics of the optical channels can be located stationary with respect to the housing, such that merely the beam-deflecting means 18 is moved by means of the travel carriage 47. An increasing distance between the image sensor 12, the optics and/or beam-deflecting means 18 during an extension allows a lower distance of the components in the first operating state, such that the multi-aperture imaging device can be accommodated in the housing 22 with less installation space requirements.

Figure 13C:
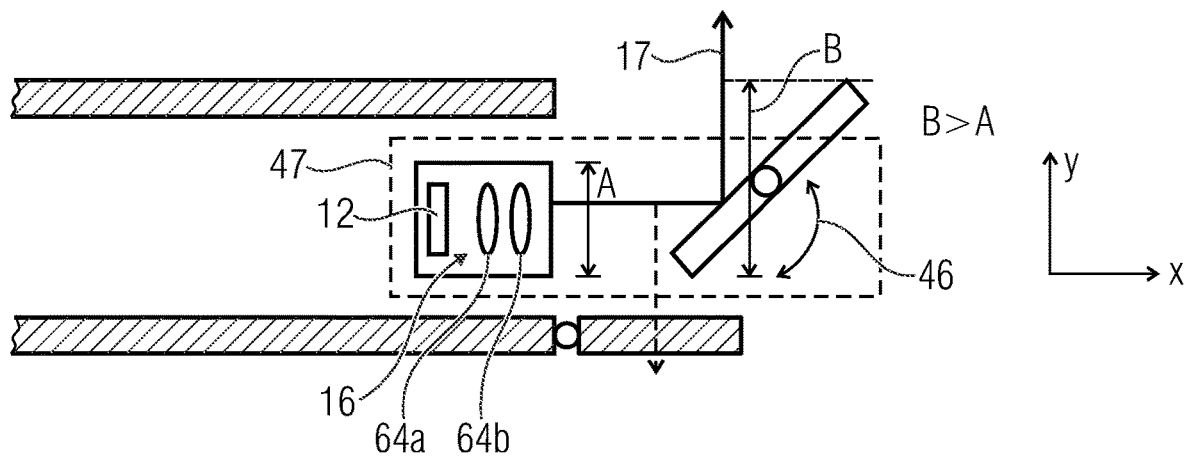
FIG. 13c shows a schematic side sectional view of the device of FIG. 13a in the second operating state.

FIG. 13c shows a schematic side sectional view of the device 50 in the second operating state. The beam-deflecting means can be pivoted for performing the rotational movement 46 as described, for example, for the device 40. As described in the context of FIG. 12b, the angular orientation of the beam-deflecting means 18 can be amended compared to the first operating state of FIG. 13a or the state in FIG. 13b, such that the area of the beam-deflecting means used by the optical path of the multi-aperture imaging device increases compared to the first operating state. The side of the beam-deflecting means 18 facing the optical channels 16 and the image sensor 12, respectively, can have a dimension B perpendicular to the translational direction of movement 42, for example along the y direction that is greater than a dimension A of the image sensor 12 and the optical channels 16, respectively, along this direction. The dimension B is, for example, perpendicular to a line-extension direction of the array and parallel to a surface of an image sensor on which the optical channels impinge. This can have the effect that a high amount of light can be deflected by the beam-deflecting means 18 and a brightness of an image to be captured is high. In a position shown in FIG. 13a, the extension or dimension B is smaller than in the position shown in FIG. 13c or a position where the beam-deflecting means 18 directs the optical path in another viewing direction.

Figure 14A:
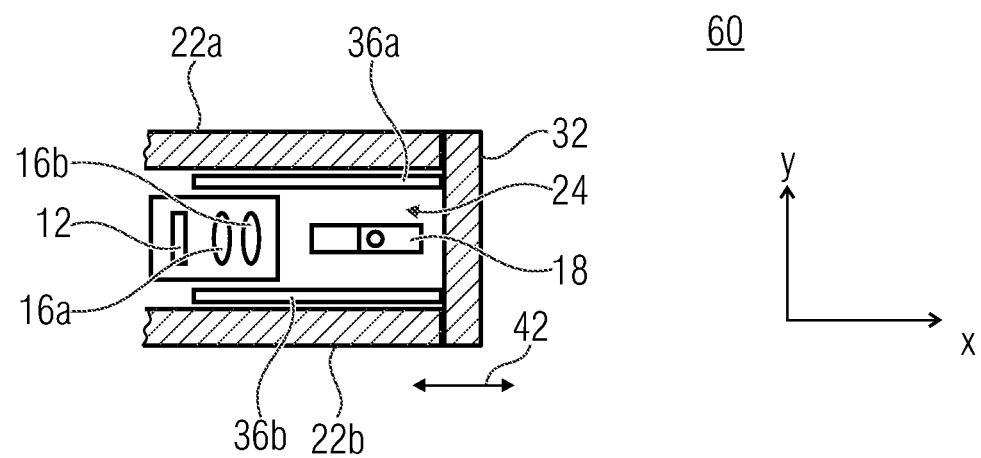
FIG. 14a shows a schematic side sectional view of a device according to an embodiment in the first operating state comprising at least partly transparent covers compared to the device of FIG. 13.

FIG. 14a shows a schematic side sectional view of a device 60 according to an embodiment in the first operating state. The beam-deflecting means 18 is in the first position. Compared to the device 40 and the device as described in FIGS. 12a and 12b, the device 50 comprises at least partly transparent covers 36a and 36b that are connected to the cover 32 and can be moved with the same along the translational direction of movement 42. The at least partly transparent covers 36a and 36b can each be arranged on different sides of the beam-deflecting means 18 between the same and the housing 22. In the first operating state, the covers 36a and 36b can be arranged partly or completely inside the housing volume 24. The covers 36a and 36b can be arranged, for example, on the travel carriage 47 illustrated in FIG. 13a-c or can be transparent areas of the travel carriage 47.

Figure 14B:
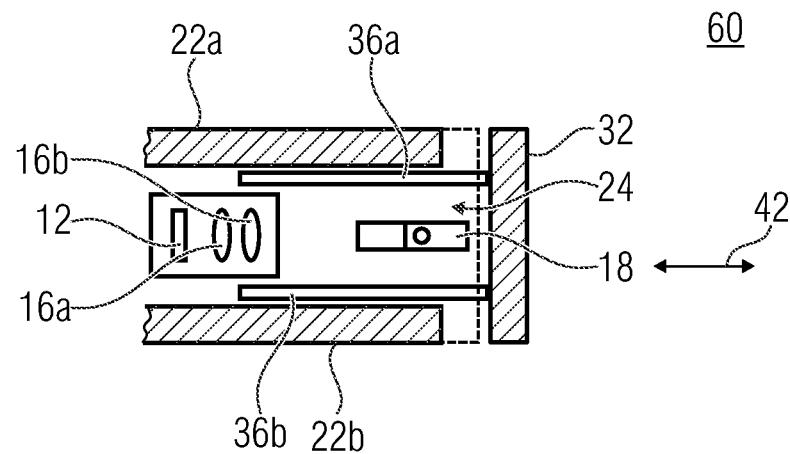
FIG. 14b shows a schematic side sectional view of the device of FIG. 14a wherein the beam-deflecting means comprises an intermediate position between a first position and a second position.

FIG. 14b shows a schematic side sectional view of the device 60 where the beam-deflecting means 18 is in an intermediate position between the first position and the second position. The intermediate position of the beam-deflecting means can be obtained, for example, during retraction or extension of the beam-deflecting means 18 into the housing volume 24 and out of the housing volume 24, respectively. The beam-deflecting means 18 is partly moved out of the housing volume 24.

Figure 14C:
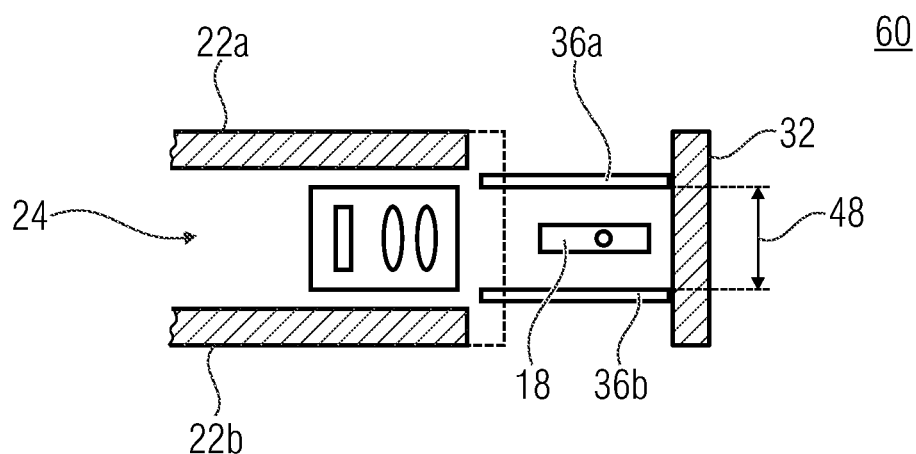
FIG. 14c shows a schematic side sectional view of the device of FIG. 14a where the beam-deflecting means is completely extended out of a housing volume.

FIG. 14c shows a schematic side sectional view of the device 60 where the beam-deflecting means 18 is in the second position, i.e., the beam-deflecting means 18 is, for example, completely extended out of the housing volume 24. The at least partly transparent covers 26a and 36b have a distance 48 to one another that is smaller than a comparative distance between lateral faces of the housing 22a and 22b.

Figure 14D:
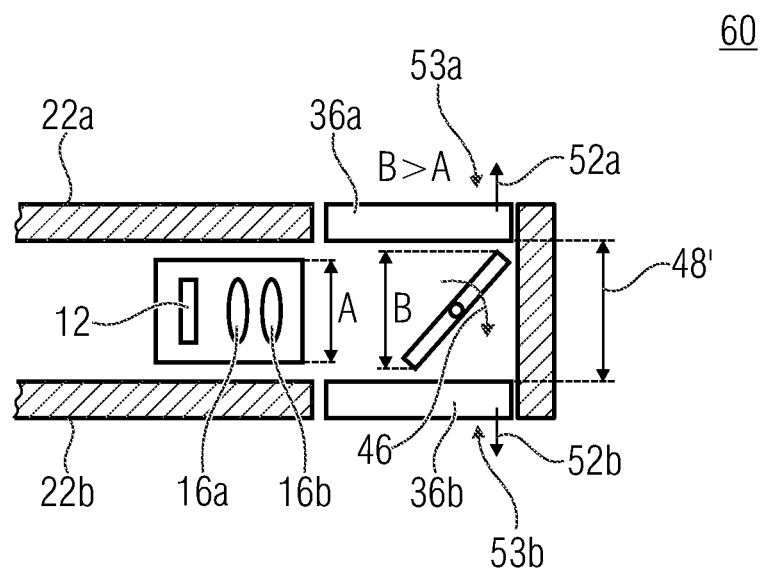
FIG. 14d shows a schematic side sectional view of the device of FIG. 14a where a distance between the at least partly transparent covers is enlarged compared to FIG. 14a-c.

FIG. 14d shows a schematic side sectional view of the device 60 where a distance of the at least partly transparent covers 36a and 36b is enlarged compared to FIGS. 14a-c. The at least partly transparent covers 36a and/or 36b can be moveable along a translational direction of movement 52a and 52b, respectively, e.g. along a positive or negative y direction facing away from the respective other at least partly transparent cover 36a and 36b, respectively. The state of the at least partly transparent covers 36a and 36b illustrated in FIG. 14a-c can be considered as retracted or folded-in state. The state illustrated in FIG. 14d can be considered as extended or folded out state, where a distance 48' between the at least partly transparent covers 36a and 36b is changed and enlarged, respectively, with respect to the distance 48. The distance 48' can, for example, be greater than or equal to the distance between the comparable sides of the housing 22. The beam-deflecting means 18 is configured to deflect the optical paths of the optical channels such that the same run through the at least partly transparent covers 36a and/or 36b. As described in the context of FIG. 12b, FIG. 13a and FIG. 13b, the angular orientation of the beam-deflecting means 18 can be amended compared to the first operating state of FIG. 14a or the state in FIG. 14b or 14c, such that the area of the beam-deflecting means used by the optical path of the multi-aperture imaging device increases compared to the first operating state. Alternatively or additionally, the enlarged distance 48' can allow an increased extent of the rotational movement 46. With the rotational movement 46, the beam-deflecting means 18 can be switchable between at least a first and a further position, wherein each position can be allocated to a viewing direction of the multi-aperture imaging device. A rotation of the mirror can be analog or stable along one/several directions. The rotational movement 46 for changing a viewing direction of the multi-aperture imaging device can be combined with a rotational movement of the beam-deflecting means 18 for optical image stabilization, which is described in the context of FIG. 20. The covers 36a and/or 36b can encapsulate the other components of the multi-aperture imaging device.

The oppositely arranged covers 36a and/or 36b and transparent areas thereof, respectively, can comprise a switchable diaphragm, such that the switchable diaphragm is introduced, for example, above and/or below or along any direction of the beam-deflecting means. The diaphragm can be switched depending on the operating state and viewing direction of the camera. For example, a viewing direction of the multi-aperture imaging device which is not used can be at least partly closed by the diaphragm for reducing entry of stray light. The diaphragms can be, for example, mechanically moved or can be electrochromic. The areas influenced by the diaphragm can additionally be provided with a switchable diaphragm which covers the optical structure for the case of non-usage. The diaphragm can be electrically controllable and can include an electrochromic layer (sequence). The diaphragm can include a mechanically moved part. The movement can be performed by using pneumatic, hydraulic, piezoelectric actuators, DC motors, step motors, thermal actuators, electrostatic actuators, electrostrictive and/or magnetostrictive actuators or drives. In a state of the multi-aperture imaging device where the viewing direction penetrates a diaphragm, the diaphragm can be switched such as to let the optical paths of the optical channels pass. This means that the multi-aperture imaging device can have a first operating state and a second operating state. The beam-deflecting means can deflect the optical path of the optical channels in the first operating state such that the same passes through a first transparent area of the cover 36a. In the second operating state, the optical path of the optical channels can be deflected such that the same passes through a second transparent area of the cover 36b. A first diaphragm 53a can be configured to optically close the first transparent area in the second operating state at least partly. A second diaphragm 53b can be configured to optically close the second transparent area at least partly in the first operating state at times. In that way, entry of stray light from a direction which is not the current viewing direction of the multi-aperture imaging device can be reduced, which has an advantageous effect on the image quality. The first and/or second diaphragm 53a-b can be effective for at least one, for at least two or for all of the optical channels. For example, at least one, at least two or all optical channels of the multi-aperture imaging device can pass through the first diaphragm when the optical path of the optical channel is directed through the first transparent area and can pass through the second diaphragm when the optical path of the optical channels is directed through the second transparent area.

It should be noted that it is possible to combine a mechanism for folding out the beam-deflecting means according to FIGS. 10 and 11 with a mechanism for translational movement, i.e., mixed forms can occur. Folding out the housing and/or extending the beam-deflecting means can be performed such that possibly the imaging module, i.e., the optical channels, optics thereof and/or the image sensor are moved out of the housing volume. An angular change of the beam-deflecting means can enable an extension of the multi-aperture imaging device in thickness direction to be large and/or that the beam-deflecting means can unimpededly deflect the optical path towards the "front" and "back". Cover glasses, such as the covers 36 can also be fixed with respect to the folded out or extended elements. The cover glasses can have any planar or non-planar surface.

Figure 15:
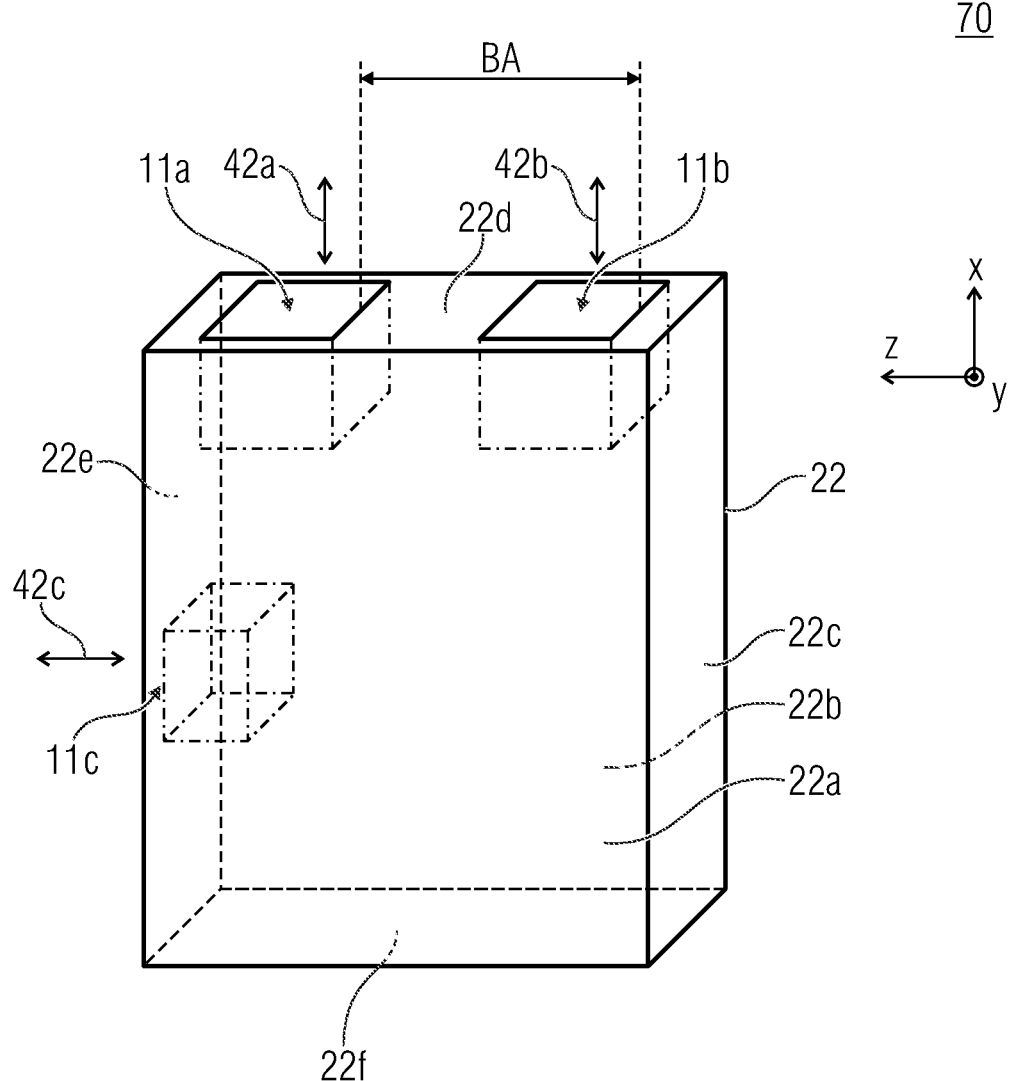
FIG. 15 shows a schematic perspective view of a device according to an embodiment comprising three multi-aperture imaging devices.

FIG. 15 shows a schematic perspective view of a device 70 according to an embodiment having the three multi-aperture imaging devices 11a-c. The multi-aperture imaging devices 11a-c can be translationally movable along a respective translational movement direction 42a-c. The multi-aperture imaging devices 11a-c can be arranged in secondary sides 22c-f of the housing 22. The housing can be formed in a flat manner, this means a first extension of the housing 22 along a first housing direction, for example an x direction, and a second extension of the housing 22 along a second housing direction, for example a z direction can have at least a three-fold dimension, at least a five-fold or at least a seven-fold dimension compared to a third extension of the housing 22 along a third housing direction, such as a y direction. A main side 22a and/or 22b of the housing 22 can have the first and second dimension and can be arranged, for example, in parallel to a x/z plane in space. The secondary sides 22c-f can connect the main sides 22a and 22b and can be arranged between the same, respectively.

The multi-aperture imaging devices 11a and 11b can be arranged in or on the same side 22d in the housing 22 and can have, for example, a base distance BA to one another, such as for the purpose of stereoscopy. More than two modules would also be possible. In this way, the total field of view can be captured, for example, stereoscopically or higher by usage of the multi-aperture imaging device 11c and at least one further multi-aperture imaging device 11a and/or 11b. The multi-aperture imaging devices 11a, 11b and/or 11c can be individually moveable. Alternatively, two or more of the modules can also be movable together as total system.

As will be described in detail below, the device 70 can be configured to capture a total field of view at least stereoscopically. The total field of view is arranged, for example, on one of the main sides 22a or 22b, but can also be arranged on a secondary side 22c-f. For example, the multi-aperture imaging devices 11a-c can each capture the total field of view. While the multi-aperture imaging devices 11a-c are illustrated in a manner spatially spaced apart from one another, the multi-aperture imaging devices 11a, 11b and/or 11c can also be arranged spatially adjacent or combined. The arrays of the imaging devices 11a and 11b, possibly arranged in a single line, can, for example, be arranged beside one another or parallel to one another as described, for example, in the context of FIG. 21b. The arrays can form lines with respect to one another, wherein each multi-aperture imaging device 11a and 11b comprises a single-line array. The imaging devices 11a and 11b can comprise a common beam-deflecting means and/or a common carrier of optics of the optical channels and/or a common image sensor.

Figure 16:
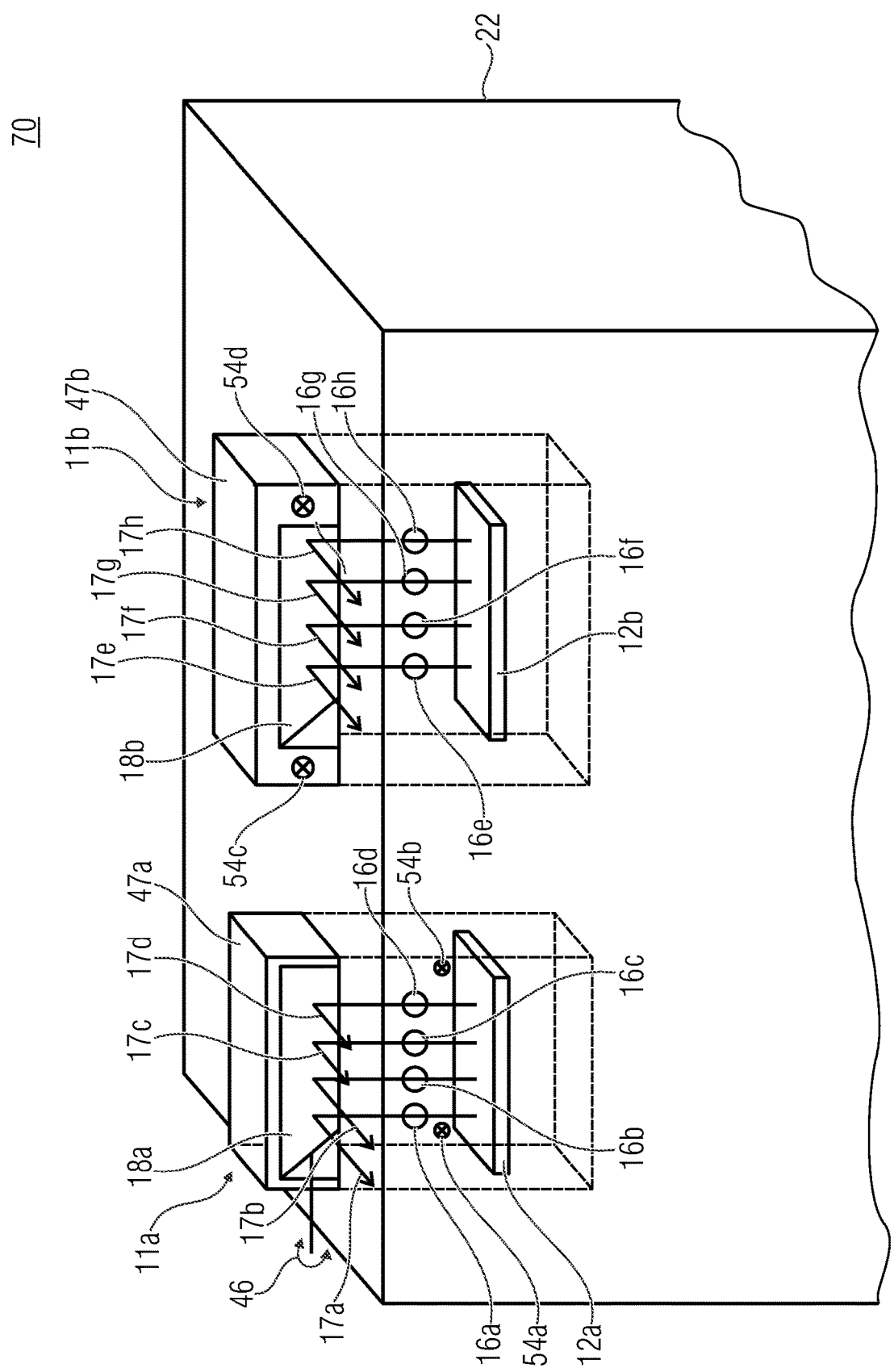
FIG. 16 shows an enlarged perspective view of a section of the device of FIG. 15.

FIG. 16 shows an enlarged perspective view of a section of the device 70 and the multi-aperture imaging devices 11a and 11b. The device 70 is in the second operating state. The multi-aperture imaging device 11a and/or 11b projects, for example, beyond the original housing side. The beam-deflecting means 18a and 18b are moved at least partly and based on the translational directions of movement 42a and 42b outside the housing volume. Alternatively, in the second operating state, merely part of the beam-deflecting means of the multi-aperture imaging devices 11a-b can be moved out of the housing volume of the housing 22.

The multi-aperture imaging devices 11a-b comprise, for example, four optical channels 16a-d and 16e-h each. The beam-deflecting means 18a and 18b are each configured to deflect the optical paths 17a-d and 17e-h, respectively, of the optical channels 16a-d and 17e-h, respectively. As will be described in detail below, other multi-aperture imaging devices can have a differing number of optical channels. The multi-aperture imaging devices 11a-b can have the same or a differing number of optical channels.

The multi-aperture imaging devices 11a and 11b each comprise illumination means 54a and 54b and 54c and 54d, respectively. The illumination means 54a-d are configured to illuminate the total field of view to be captured at least partly and, for example, can each be configured to illuminate a center of the total field of view (object area) to be captured. According to an embodiment, at least one of the illumination means 54a or 54b and 54c or 54d, respectively, can be arranged such that the same illuminates the total field of view along a central viewing direction of the optical channels 16a-d and 16e-h, respectively. The total field of view can comprise differing partial fields of view that are each captured by at least one optical channel 16a-d and 16e-h, respectively. A central viewing direction of optical channels 16a-d or 16e-h can, for example, be a geometrical average of the viewing directions or a median value of the viewing directions.

The illumination means 54a-b and 54c-d can be operated as a flash light of the respective multi-aperture imaging device 11a or 11b and can include any light source. Advantageously, the light source can be configured, for example, as a light emitting diode (LED) since the same have low insulation space requirements and low energy requirements. According to further embodiments, a multi-aperture imaging device can include no, one or more than two illumination means 54a-d, wherein the number of illumination means 54a-d of a multi-aperture imaging device can differ from other multi-aperture imaging devices of a device or can be the same. At least one of the illumination means 54a-d can be configured to illuminate several object areas. In that way, light can, for example, be selectively emitted by the illumination means in one or several directions. The illumination means can emit light along at least two viewing directions of the multi-aperture imaging device. For this, the illumination means can comprise at least two light sources. The light sources can emit light in opposite sides of the device. For example, one light source each can be mounted on a top and bottom, front and rear and/or left and right side of the travel carriage 47, where only the light source(s) of that side are used that opposes the object area to be captured according to the selected orientation and hence the operating state of the beam-deflecting means 18 and emits light in its direction. The above mentioned front, rear top and bottom as well as the terms left or right merely serve for illustration purposes and are not to be understood in a limiting sense, since the same are mutually exchangeable with each orientation in space. This means, for example, that light sources 54i can be arranged on the front and rear of the travel carriage 47b and depending on the position of the beam-deflecting means 18b respective light sources can be used. The other opposite light sources can remain unused.

For example, the illumination means 54a and 54b are arranged between the beam-deflecting means 18a and the image sensor 12a of the multi-aperture imaging device 11a. The beam-deflecting means 18 can be configured to deflect illumination radiation, for example flashlight, emitted by the illumination means 54a and/54b. The illumination means 54a-b can be arranged in the first operating state and in the second operating state of the device 70 inside the housing volume. The illumination radiation can be at least partly part of the optical paths 17a-d. As illustrated, for example, for the multi-aperture imaging device 11b, an illumination means 54c and/or 54d can be arranged laterally beside the beam-deflecting means on the travel carriage 47b. The illumination means 54c and 54d can be moved with the translational movement 42b into the housing 22 or out of the housing 22. While the illumination means is described in the context of the device 70, also other devices or multi-aperture imaging devices described herein can comprise an illumination means.

The illumination means 54c and 54d can be mechanically connected to the travel carriage 47a and can thus be arranged within the volume 42 in the first operating state and hence be arranged in a manner invisible for a user. Alternatively and/or additionally, the illumination means 54a and 54b can be arranged in a stationary manner inside the housing 22. A movement of the travel carriage 47b can effect a movement of the illumination means 54c and 54d.

Together with the beam-deflecting means 18a and 18b, respectively, optics 16a-d or 16e-f and possibly the image sensor 12a and 12b, respectively, can be moved out of the housing volume by the movement of the travel carriage 47a and 47b, respectively.

In other words, LEDs for realizing additional illumination (flash light) can be mounted on the moveable parts. Here, the LEDs can be arranged such that the same radiate in the central direction of the channels and the beam-deflecting means can provide further areas that are used for deflecting the radiation, respectively.

Figure 17:
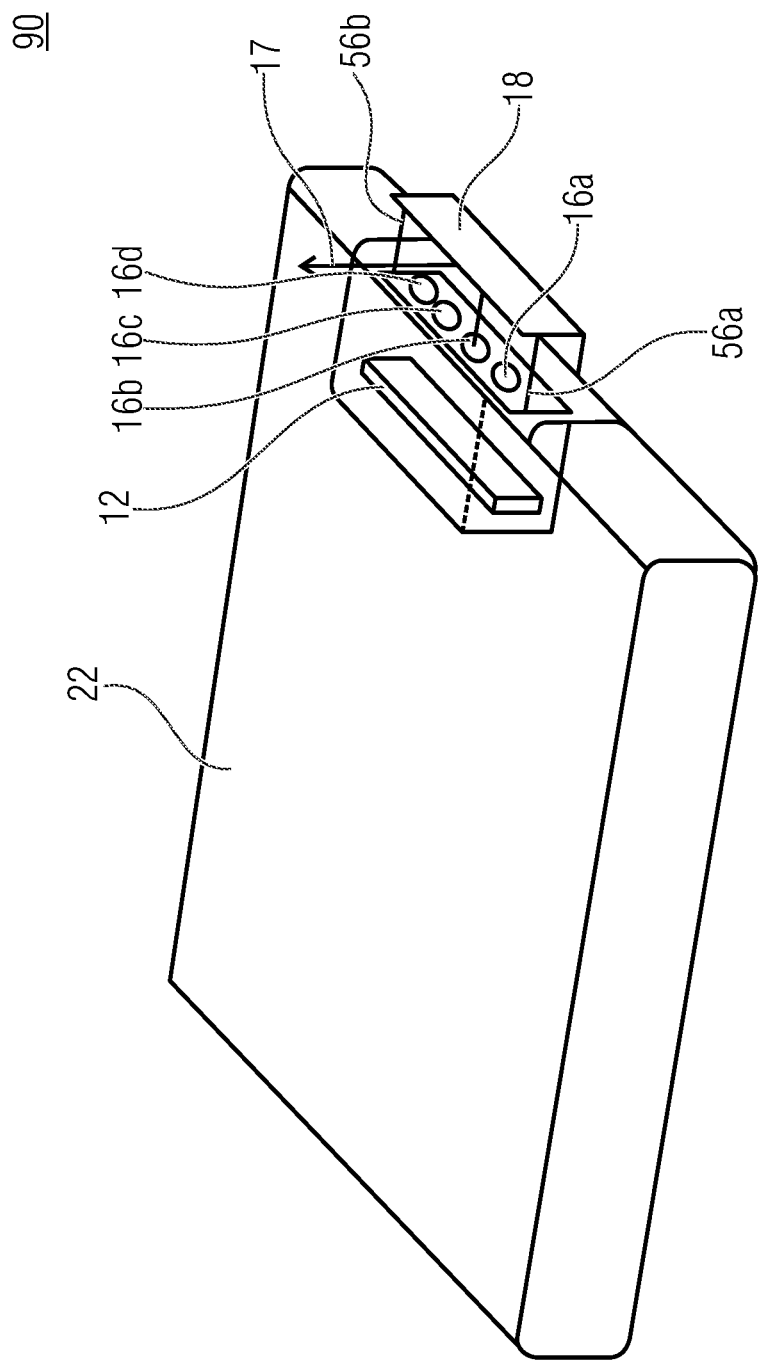
FIG. 17 shows a schematic perspective view of a device according to an embodiment wherein the beam-deflecting means is connected to the multi-aperture imaging device by means of mounting elements.

FIG. 17 shows a schematic perspective view of device 90 according to an embodiment comprising the second operating state. The beam-deflecting means 18 can be connected to the multi-aperture imaging device by means of mounting elements 56a and 56b. The mounting element 56a and 56b can be part of a travel carriage.

Figure 18A:
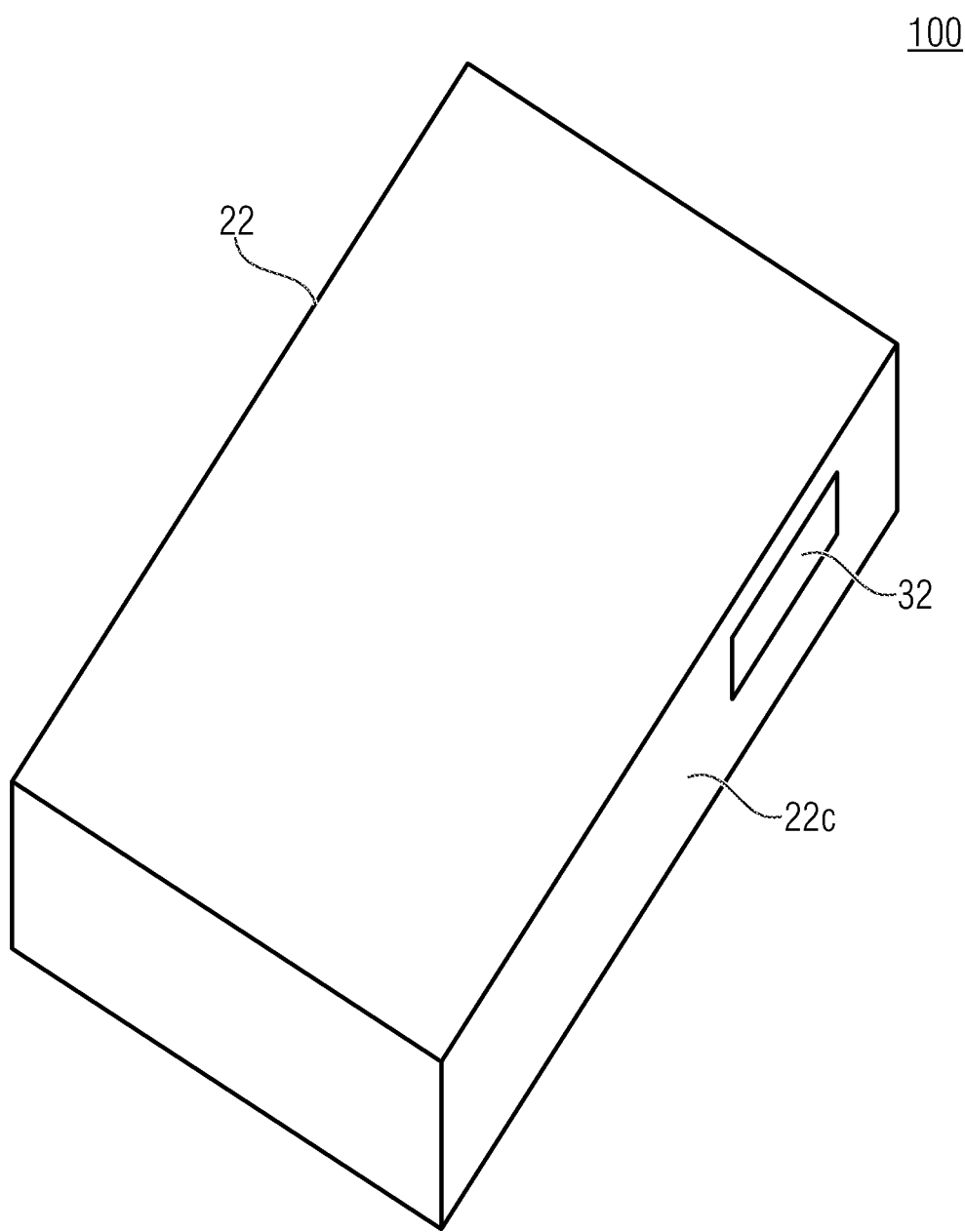
FIG. 18a shows a schematic perspective view of a device according to an embodiment in the first operating state with an exemplary shape of a cover.

FIG. 18a shows a schematic perspective view of device 100 according to an embodiment in the first operating state. The cover 32 can form one plane with a housing main side and/or a housing secondary side, for example the housing plane side 22c. No gap or merely a small gap approximately less than or equal to 1 mm, less than or equal to 0.5 mm or less than or equal to 0.1 mm can be arranged between the cover 32 and the housing side 22c, such that a transition between the cover 32 and the housing side 22c is not or only hardly noticeable. Simply put, the cover 32 might not be visible.

Figure 18B:
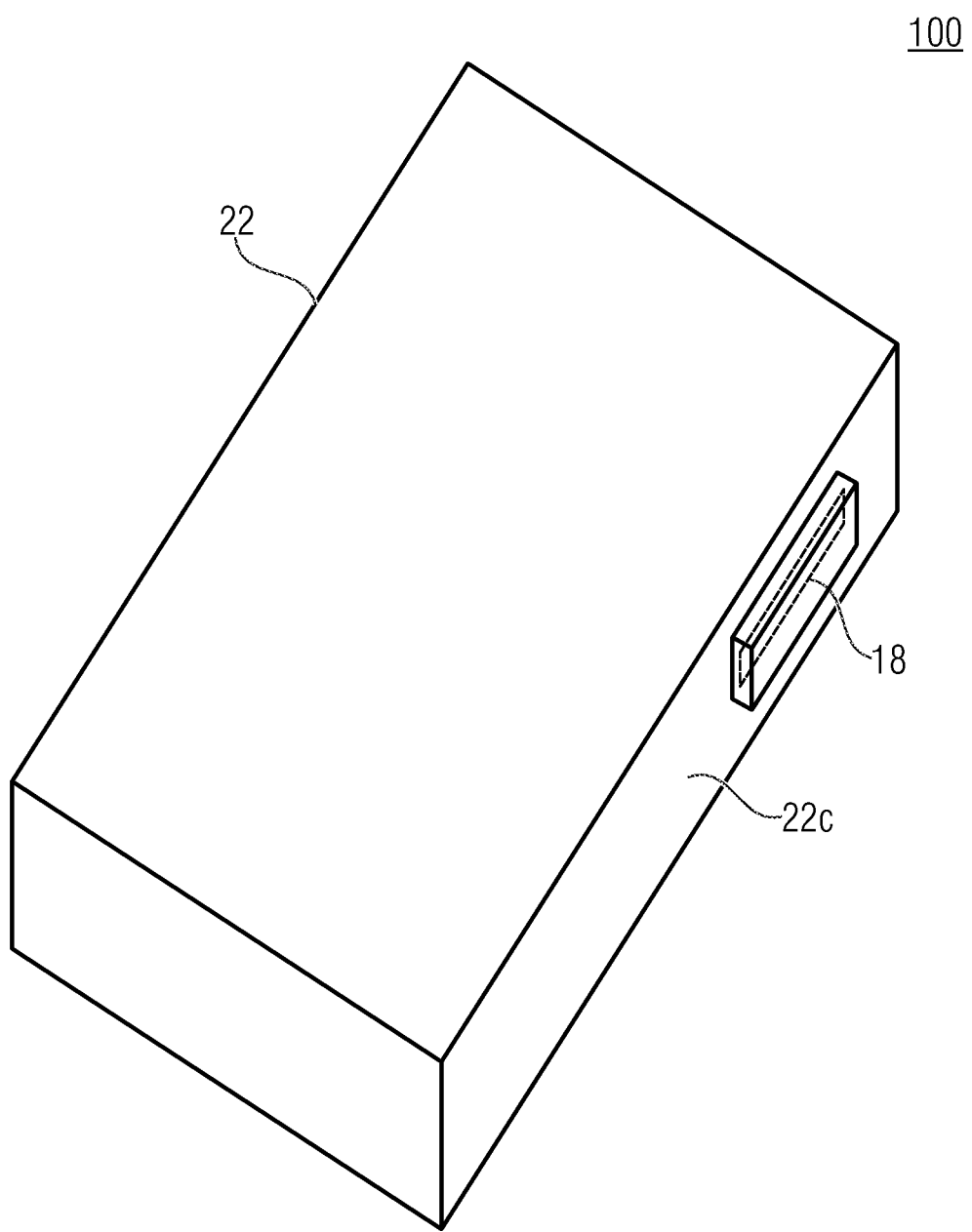
FIG. 18b shows a schematic view of the device of FIG. 18a in the second operating state according to an embodiment.

FIG. 18b shows a schematic view of the device 100 in the second operating state. The beam-deflecting means 18 comprises the second position outside the housing volume. Seen from outside, the extended multi-aperture imaging device can be enclosed by the inactive housing frame on all sides and/or can have an appearance like a button. The device 100 can, for example, be configured to release a mechanical lock during mechanical pressure on the cover 32 according to FIG. 18a, such that the beam-deflecting means can be moved out of the housing 22, for example based on a spring force. The mechanical pressure can be generated, for example, by an actuator and/or by a user, such as by finger pressure. The beam-deflecting means can be moved from the second position again to the first position by means of the actuator or by means of the mechanical pressure and can activate a lock there. The actuator can, for example, be the actuator 33 or 33'. In other words, the movement can also be performed manually, such that the user retracts or extends and folds in or out, respectively, the parts or the total system on his own accord. The movement can, in particular, be a combination of manual operation and effect of spring force. In that way, the user folds or shifts parts and the total system, respectively, manually into the housing of the device, such as a smartphone, for switching off the camera, thereby compressing a spring and a locking mechanism maintains this position. When switching on the camera, for example by means of suitable software on the smartphone, the switchable locking mechanism is released by a suitable controllable mechanism, such as an electrical relay, and the spring force of the spring effects the extension and folding out, respectively, of parts of the camera and the total system, respectively. Further, the cover forming part of the housing, the extendable and/or tiltable part and/or a further mechanism based thereon can be implemented such that (finger) pressure on this cover releases the lock, the parts or the total system expand or fold out, respectively, and possibly the image capturing software on the device starts. The co-moving cover, which can form part of the housing on the lateral faces, can be enclosed on all sides by the inactive housing, visible from the outside, or can interrupt the lateral faces across the total height (=thickness direction of the housing).

Figure 18C:
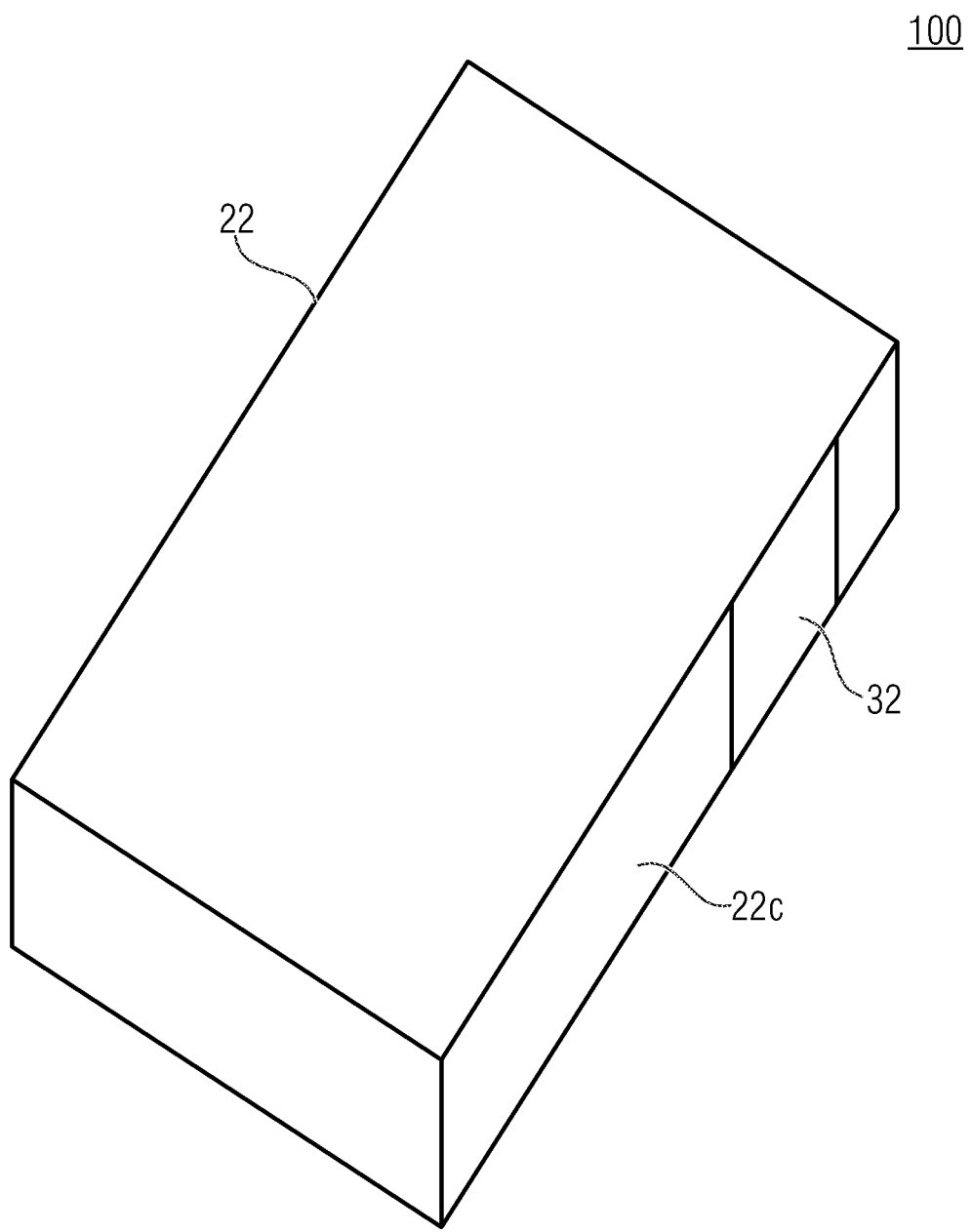
FIG. 18c shows a schematic illustration of an alternative to FIG. 18a according to an embodiment.

FIG. 18c shows a schematic illustration of an alternative to FIG. 18a where the cover 32 is formed such that a continuous gap is formed in the secondary side 22c between main sides of the housing 22. This enables that merely two instead of four gaps illustrated in FIG. 18a can be perceived in the housing 22. The extendable or foldable cover 32 and/or further covers can be formed as part(s) of the housing 22 on one or several lateral faces of the flat housing.

In the following, reference is made to some possible embodiments of the multi-aperture imaging device as it can be used according to embodiments.

Figure 19A:
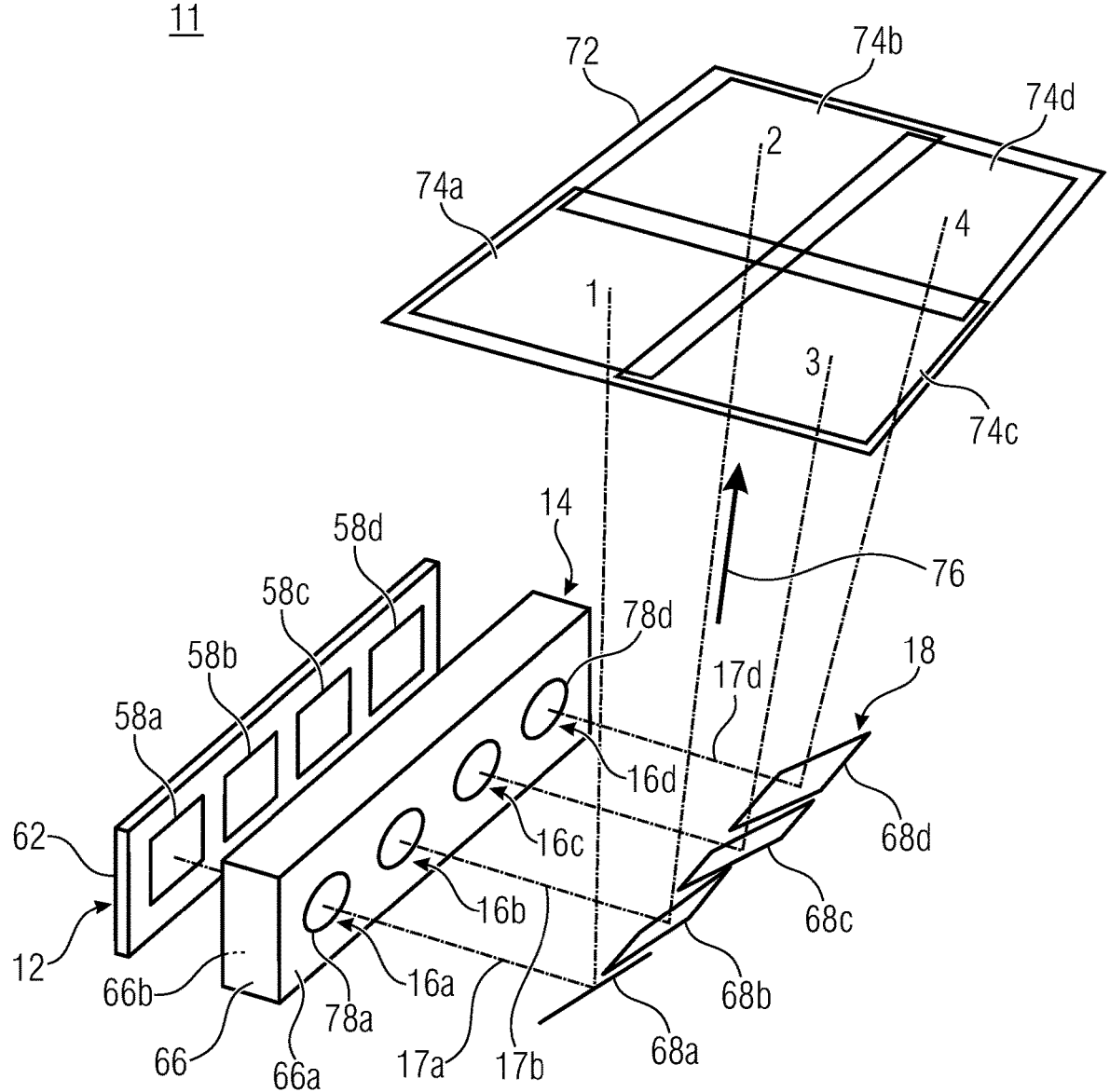
Figure 19B:
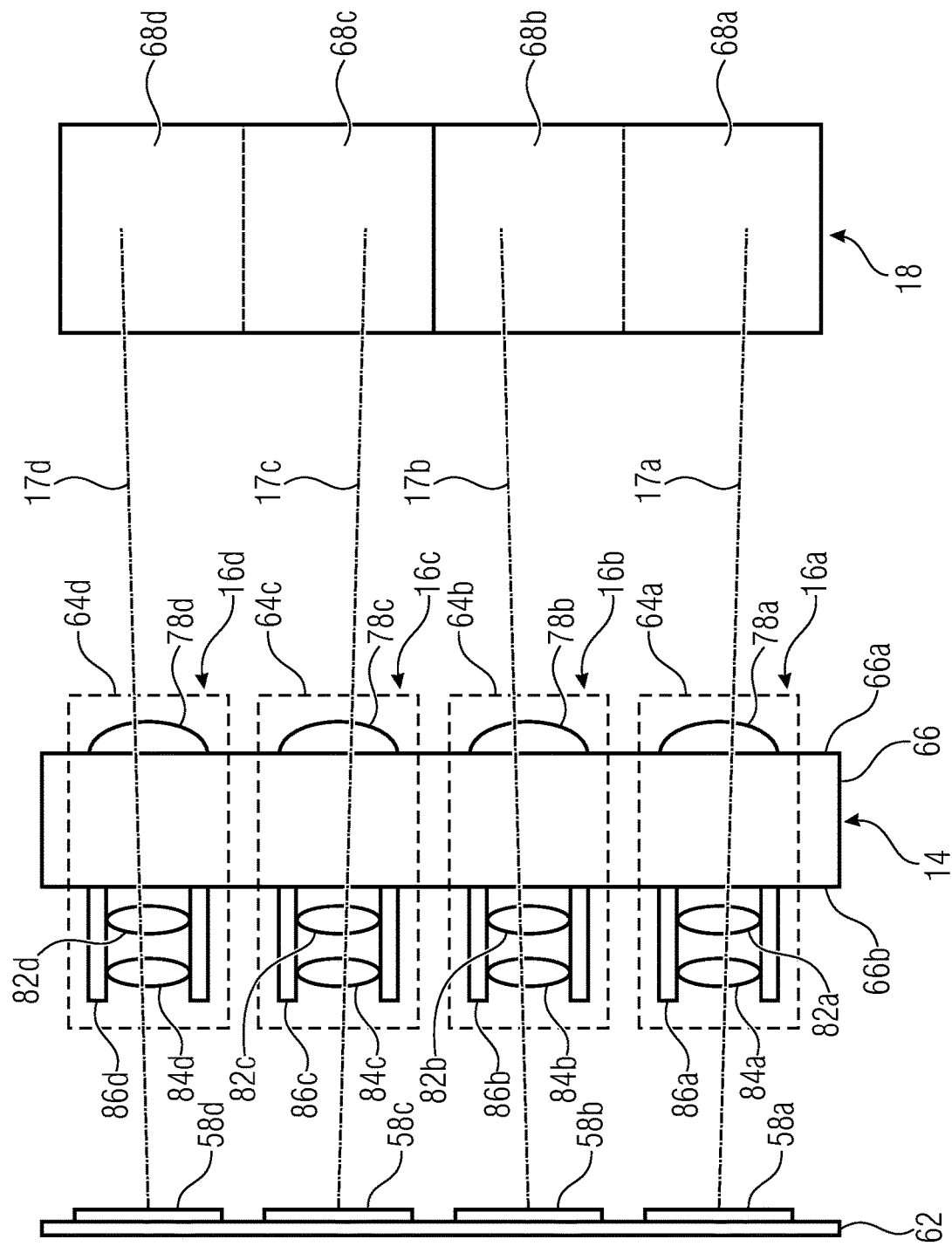

FIGS. 19a-c show a multi-aperture imaging device 11 according to an embodiment of the present invention. The multi-aperture imaging device 11 of FIGS. 19a-c includes a single-line array 14 of juxtaposed optical channels 16a-d. Each optical channel 16a-d includes optics 64a-d for projecting a respective partial field of view 74a-d of a total field of view 72 of the device 11 on a respectively allocated image sensor area 58a-d of an image sensor 12. The image sensor areas 58a-d can, for example, each be formed of one chip including a respective pixel array, wherein the chips can be mounted on a common substrate and a common printed circuit board 62, respectively, as indicated in FIGS. 19a-c. Alternatively, it would also be possible that the image sensor areas 58a-d are each formed of part of a common pixel array continuously extending across the image sensor areas 58a-d, wherein the common pixel array is formed, for example, on a single chip. For example, merely the pixel values of the common pixel array are read out in the image sensor areas 58a-d. Different mixtures of these alternatives are also possible, such as the presence of one chip for two or more channels and a further chip for again other channels or the same. In the case of several chips of the image sensor 12, the same can be mounted, for example, on one or several printed circuit boards, such as e.g., all together or in groups or the same.

In the embodiment of FIGS. 19a-c, four optical channels 16a-d are arranged in a single line beside one another in line-extension direction of the array 14, but the number four is merely exemplary and could also be any other number greater than one. Above that, the array 14 can also comprise further lines extending along the line-extension direction.

Optical axes and optical paths 17a-d, respectively, of the optical channels 16a-d run parallel to one another between the image sensor areas 58a-d and the optics 64a-d. For this, the image sensor areas 58a-d are arranged, for example, in a common plane and also the optical centers of optics 64a-d. Both planes are parallel to one another, i.e., parallel to the common plane of the image sensor areas 58a-d. Additionally, in a projection perpendicular onto the plane of the image sensor areas 58a-d, optical centers of the optics 64a and 64d coincide with centers of the image sensor areas 58a-d. In other words, in these parallel planes, optics 64a-d on the one hand and image sensor areas 58a-d are arranged with the same repeat distance in line-extension direction.

An image-side distance between image sensor areas 58a-d and the allocated optics 64a-d is adjusted such that the projections on the image sensor areas 58a-d are set to a desired object distance. The distance is, for example, in a range equal to or greater than the focal length of optics 64a-d or, for example, in a range between one time and two times the focal length of the optics 64a-d, both inclusive. The image-side distance along the optical axes 17a-d between image sensor area 58a-d and optics 64a-d can also be adjusted, such as manually by a user or automatically via autofocus control.

Without additional measures, the partial fields of view 74a-d of the optical channels 16a-d overlap essentially completely due to the parallelism of the optical paths and optical axes 17a-d, respectively. For covering a greater total field of view 72 and so that the partial fields of view 74a-d merely overlap partly in space, the beam-deflecting means 18 is provided. The beam-deflecting means 18 deflects the optical paths 17a-d and optical axes, respectively, with a channel-individual deviation into a total field of view direction 76. The total field of view direction 76 runs, for example, parallel to a plane that is perpendicular to the line-extension direction of the array 14 and parallel to the course of the optical axes 17a-d prior to and without beam deflection, respectively. For example, the total field of view direction 76 results from the optical axes 17a-d by rotation around the line-extension direction by an angle that is >0° and <180° and is, for example, between 80 and 100° and can, for example, be 90°. Thus, the total field of view of the device 11 corresponding to the total coverage of the partial fields of view 74a-d is not in the direction of an extension of the series connection of the image sensor 12 and the array 14 in the direction of the optical axes 17a-d, but due to the beam deflection, the total field of view is on the side of the image sensor 12 and array 14 in a direction in which the installation height of the device 11 is measured, i.e., the lateral direction perpendicular to the line-extension direction. Additionally, the beam-deflecting means 18 deflects each optical path and the optical path of each optical channel 16a-d, respectively, with a channel-individual deviation from the deflection resulting in the direction 76 mentioned above. For this, the beam-deflecting means 18 comprises a reflecting facet 68a-d for each channel 16a-d. The same are slightly inclined with respect to one another. The mutual tilting of the facets 68a-d is selected such that, during beam deflection by the beam-deflecting means 18, the partial fields of view 74a-d are provided with a slight divergence such that the partial fields of view 74a-d overlap merely partly. Here, as indicated exemplarily in FIG. 19a, the individual deflection can also be designed such that the partial fields of view 74a-d cover the total field of view 72 in a two-dimensional manner, i.e., are arranged in a two-dimensionally distributed manner in the total field of view 72.

If, for example, a beam-deflecting means 18 formed as an array of facets is arranged adjacent to the multi-aperture imaging device 4000 described in FIG. 4b, the optical path 17a can be deflected towards a first partial area of the object area and the optical path 17b towards a second partial area of the object area by the same facet. Alternatively or additionally, also more than two optical paths can be deflected by the same facet, wherein the optical paths can be allocated to a common or different optical channels. This means that any amount of channels can use the same facet. Alternatively, the optical paths 17a and 17b could also be deflected by different facets.

It should be noted that many of the details described so far concerning the device 11 have merely been selected exemplarily. This already concerned, for example, the above-mentioned number of optical channels. The beam-deflecting means 18 can also be formed differently than described above. For example, the beam-deflecting means 18 is not necessarily reflective. The same can also be implemented differently than in the form of a facet mirror, such as in the form of transparent prism wedges. In that case, for example, the average beam deflection could be 0°, i.e., the direction 76 could, for example, be parallel to the optical paths 17a-d prior to or without beam deflection or, in other words, the device 11 could still "look straight ahead" despite beam-deflecting means 18. The channel-individual deflection by the beam-deflecting means 18 would again have the effect that the partial fields of view 74a-d merely slightly overlap, such as in pairs with an overlap <10% with regard to the spatial angular ranges of the partial fields of view 74a-d.

Also, the optical paths and optical axes, respectively, could deviate from the described parallelism and the parallelism of the optical paths of the optical channels could still so distinct that the partial fields of view that are covered by the individual channels 16a-N and projected on the respective image sensor areas 58a-d, respectively, would mostly overlap without further measures, namely beam deflection, such that in order to cover a greater total field of view by the multi-aperture imaging device 11, the beam-deflecting means 18 would provide the optical paths with an additional divergence such that the partial fields of view of N optical channels 16a-N overlap less. The beam-deflecting means 18 has, for example, the effect that the total field of view has an aperture angle that is greater than 1.5 times the aperture angle of the individual partials fields of view of the optical channels 16a-N. With some sort of pre-divergence of the optical paths 17a-d, it would also be possible that, for example, not all facet inclinations differ but that some groups of channels have, for example, the facets with the same inclination. The latter could then be formed integrally and continuously merging, respectively, as virtually one facet that is allocated to this group of channels adjacent in line-extension direction. The divergence of the optical axes of these channels could then originate from the divergence of these optical axes, as it is obtained by lateral offset between optical centers of the optics and image sensors areas of the channels or prism structures or decentered lens sections. The pre-divergence could be limited, for example, to one plane. Prior to or without beam deflection, respectively, the optical axes could run, for example, in a common plane but divergent within the same, and the facets effect merely an additional divergence in the other transversal plane, i.e., the same are all parallel to the line-extension direction and inclined with respect to one another only varying from the above-mentioned common plane of the optical axes, wherein here again several facets can have the same inclination or can be allocated together to a group of channels, whose optical axes differ, for example, already in the above mentioned common plane of the optical axes in pairs prior to and without beam deflection, respectively.

When omitting the beam-deflecting means or implementing the beam-deflecting means as planar mirror or the same, the total divergence could be accomplished by the lateral offset between optical centers of the optics on the one hand and centers of the image sensor areas on the other hand or by prism structures or decentered lens sections.

The above-mentioned possibly existing pre-divergence can, for example, be obtained in that the optical centers of the optics are on a straight line along the line-extension direction, while the centers of the image sensor areas are arranged deviating from the projection of the optical centers along the normal of the plane of the image sensor areas on points on a straight line in the image sensor plane, such as on points deviating from the points on the above mentioned straight line in the image sensor plane in a channel-individual manner along the line-extension direction and/or along the direction perpendicular to both the line-extension direction and the image sensor normal. Alternatively, pre-divergence can be obtained in that the centers of the image sensors are on a straight line along the line-extension direction, while the centers of the optics are arranged deviating from the projection of the optical centers of the image sensors along the normal of the plane of the optical centers of the optics on points on a straight line in the optics center plane, such as on points deviating from the points on the above-mentioned straight line in the optics center plane in a channel-individual manner along the line-extension direction and/or along the direction perpendicular to both the line-extension direction and the normal of the optics center plane. It is advantageous when the above mentioned channel individual deviation from the respective projection merely runs in line-extension direction, i.e., merely the optical axes in a common plane are provided with a pre-divergence. Both optical centers and image sensor area centers are then on a straight line parallel to the line-extension direction but with different gaps in-between. A lateral offset between lenses and image sensors in perpendicular lateral direction to the line-extension direction would, in comparison, result in an enlargement of the installation height. A pure in-plane offset in line-extension direction does not change the installation height but possibly less facets result and/or the facets have only a tilting in one angular orientation which simplifies the structure.

Figure 19E:
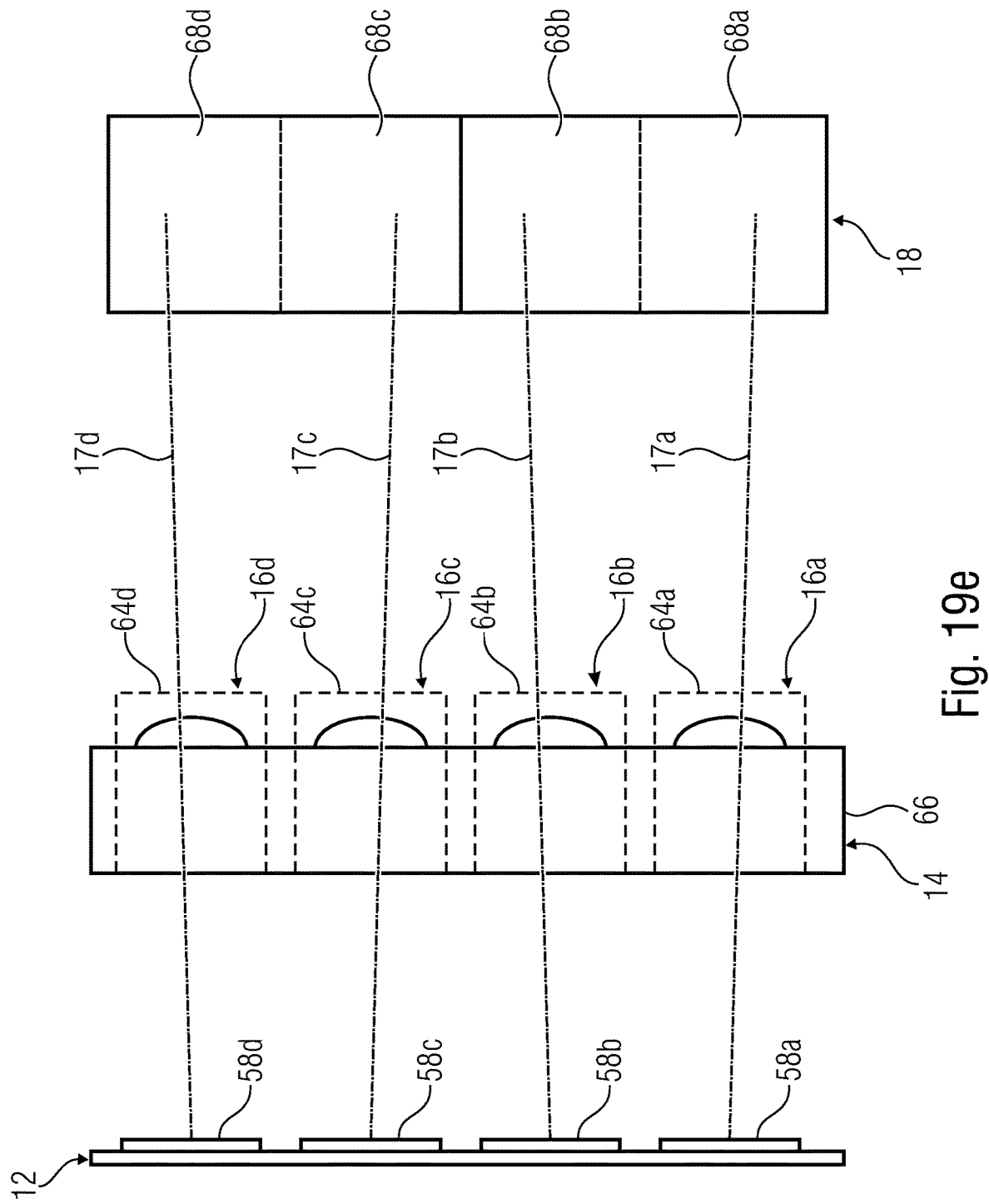

This is shown exemplarily in FIGS. 19d and 19e for the case of optics mounted on a common carrier, wherein the adjacent channels 16a and 16b on the one hand and the adjacent channels 16c and 16d on the other hand comprise optical axes 17a and 17b, and 17c and 17d, respectively, running in the common plane and squinting with respect to one another, i.e. being provided with a pre-divergence. The facets 68a and 86b can be formed by one facet and the facets 68c and 68d can be formed by a different facet, as indicated by dotted lines between the respective pair of facets, and the only two facets are merely inclined in one direction and are both parallel to the line-extension direction. It is also possible that individual facets merely have a tilting in one spatial direction.

Further, it could be provided that some optical channels are allocated to the same partial field of view, such as for the purpose of superresolution for increasing the resolution by which the respective partial field of view is scanned by these channels. The optical channels within such a group would then run parallel, for example, prior to beam deflection and would be deflected on a partial field of view by one facet. Advantageously, pixel images of the image sensor of a channel of a group would lie in intermediate positions between images of the pixels of the image sensor of a different channel of this group.

Even without superresolution purposes, but merely for stereoscopic purposes, an implementation would be possible where a group of immediately adjacent channels completely cover the total field of view in line-extension direction with their partial fields of view, and that a further group of immediately adjacent channels also completely cover the total field of view and the optical paths of both channel groups pass through the substrate and a carrier 66, respectively. This means that the multi-aperture imaging device can comprise a first plurality of optical channels that are configured to capture a total field of view, possibly completely. A second plurality of optical channels of the multi-aperture imaging device can be configured to also capture the total field of view possibly completely. In this way, the total field of view can be captured at least stereoscopically by the first plurality of optical channels and by the second plurality of optical channels. The first plurality of optical channels and the second plurality of optical channels can impinge on a common image sensor, can use a common array (array optics) and/or can be deflected by a common beam-deflecting means. In contrary to an array of individual cameras, a contiguous array camera is formed which can be controlled together as one device, for example with regard to focus and/or image stabilization, which is advantageous since all channels are influenced simultaneously and by using the same actuators. Additionally, from the monolithic structure, advantages result with regard to the mechanical stability of the total array in particular during temperature changes. This is advantageous for the assembly of the total image from the partial images of the individual channels as well as for obtaining three-dimensional object data during the usage in stereo, triple, quadruple, etc., systems with multiple scanning of the total field of view by different pluralities of channels 16.

The following discussion deals with the optics 64a-d whose lens planes are also parallel to the common plane of the image sensor areas 58a-d. As described below, lenses of the optics 64a-d of the optical channels 16a-d are mounted on a main side 66a of the substrate 66 via one or several lens holders and are mechanically connected to one another via the substrate 66. In particular, the optical paths 17a-d of the plurality of optical channels 16a-d run through the substrate 66. Thus, the substrate 66 is formed at least partly of transparent material and is plate-shaped or has, for example, the shape of a parallelepiped or another convex body having a planar main side 66a and an opposing main side 66b that is also planar. The main sides are positioned perpendicular to the optical paths 17a-d. As described below, according to embodiments, deviations from the pure parallelepiped shape can occur, which are based on an integral formation of lenses of the optics with the substrate.

The flat carrier substrate 66 in the embodiment of FIG. 19a-c is, for example, a substrate of glass or polymer. For example, the carrier substrate 66 can include a glass plate. The material of the substrate 66 can be selected according to aspects of high optical transparence and low temperature coefficient or further mechanical characteristics such as hardness, elasticity or torsion module.

The substrate 66 can be formed as simple planar part of the optical path without any additional lenses being mounted directly on the same. Additionally, diaphragms, such as aperture or stray light diaphragms or/and filter layers such as IR block filters, can be mounted on the substrate surfaces or can consist of several layers of different substrates on the surfaces of which diaphragms and filter layers can be mounted, which can differ again from channel to channel, for example as regards to their spectral absorption.

The substrate 66 can consist of a material having different characteristics in different areas of the electromagnetic spectrum that can be captured by the image sensor, in particular non-constant absorption.

In the embodiment of FIG. 19a-c, each optics 64a-d comprises three lenses. However, the number of lenses is freely selectable. The number could be 1, 2 or any other arbitrary number. The lenses could be convex, could comprise merely one optically projecting functional area, such as a spherical, aspherical or freeform area, or two opposing ones, for example, to result in a convex or concave lens shape. Also, several optically effective lens areas are possible, such as by structuring a lens of several materials.

In the embodiment of FIGS. 19a-c, a first lens 78a-d of each optical channel 16a-d or optics is formed on the main side 66a. The lenses 78a-d have been produced, for example, by molding on the main side 66a of the substrate 66 and consist, for example, of polymer, such as UV curable polymer. The molding takes place, for example by a molding tool and the annealing can, for example, take place via temperature and/or via UV radiation.

In the embodiment of FIG. 19a-c, each optics 64a-d has a further second and third lens 82a-d and 84a-d, respectively. Exemplarily, these lenses are mutually fixed via axially running tube-shaped lens holders 86a-d inside the respective lens holder and are fixed to the main side 66b via the latter, such as by means of adhering or another joining technology. Openings 88a-d of the lens holders 86a-d are provided, for example with a circular cross-section in the cylindrical inside of which the lenses 88a-d and 84a-d, respectively, are mounted. Thus, for each optics 64a-d, the lenses are co-axial on the respective optical axis of the optical paths 17a-d. The lens holders 86a-d can also have a cross-section varying across their length and along the respective optical axis, respectively. Here, the cross-section can have an increasingly rectangular or square character with decreasing distance to the image sensor 12. The outer shape of the lens holders can thus also differ from the shape of the openings. The material of the lens holders can be light-absorbing. Corresponding to the squinting optics described above in the context of FIGS. 19d and 19e, the lens holders can also be configured in a manner that is not rotationally symmetrical and/or not coaxial.

Mounting via the above-mentioned lens holders takes, for example, place such that lens vertices of the lenses held by the same are spaced apart from the substrate 66.

As already mentioned above, it is possible that the substrate 66 is planar on both sides and hence has no refractive power effect. However, it would also be possible that the substrate 66 comprises mechanical substrates, such as recesses or projections allowing an easy form-fit and/or force-fit alignment of members to be connected, e.g. connecting individual lenses or housing parts. In the embodiment of FIG. 19a-c, for example, the substrate 66 could have structures easing the mounting or easing the orientation on the main side 6b at positions where the respective end of the tube of the lens holder 86a-d of the respective optics 64a-d is mounted. These structures can, for example be a circular recess or a recess having a different shape corresponding to the shape of the side of the respective lens holder facing the substrate which the side of the respective lens holder 84a-d can engage. It should again be emphasized that other opening cross-sections and hence correspondingly possibly other lens apertures than circular ones are possible.

Thus, the embodiment of FIG. 19a-c does not have a conventional structure of camera modules comprising individual lenses, and for holding the individual lenses, a non-transparent housing carrier completely enclosing the same. Rather, the above embodiment uses a transparent body 66 as substrate carrier. The same extends across several adjacent optical channels 16a-d in order to be penetrated by their projecting optical path. The same does not interfere with the projection but does also not increase the installation height.

Figure 19F:
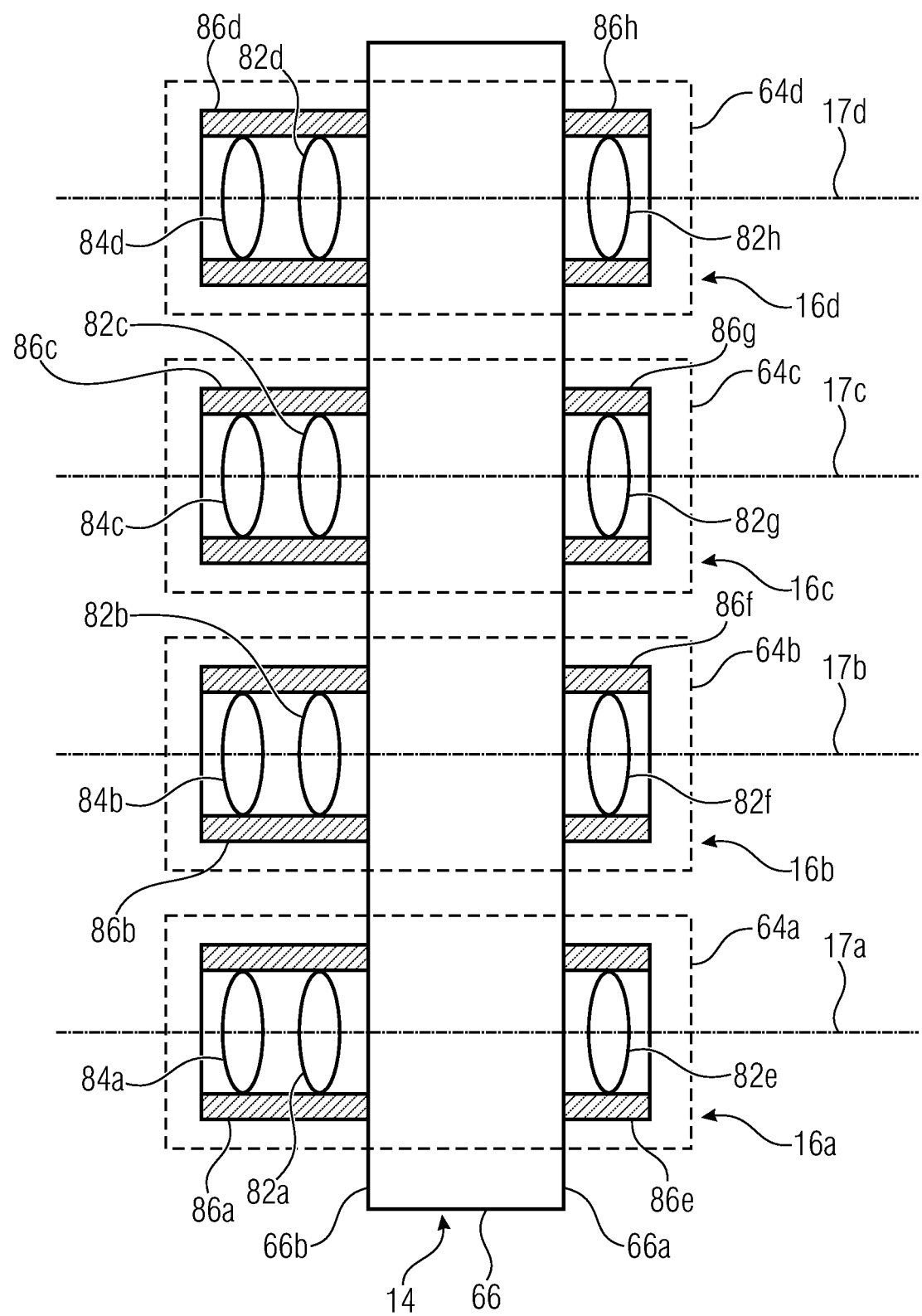

However, different options for varying the embodiment of FIG. 19a-c should be noted. For example, the substrate 66 does not necessarily extend across all channels 16a-d of the multi-aperture imaging device 11. Contrary to what is described above, it would be possible that each optics 64a-d comprises lenses held by lens holders on both sides 66a and 66b, as illustrated in FIG. 19f.

The existence of merely the lenses 82e-h on the main side 66a, i.e. without the lenses 82a-d and/or 84a-d on the other side 66b would be possible, as well as providing the lenses 82a-d and/or 84a-d on the other side 66a, i.e. the side of the substrate 66 facing away from the image sensor 12 and not the side facing the same, i.e. 66a. Also, the number of lenses in a lens carrier 86a-h is freely selectable. Thus, merely one lens or more than two could be provided in such a carrier 86a-h. As shown in FIG. 19f, it could be the case that lenses are mounted on both sides 66a and 66b via respective lens carriers 86a-d and 86e-h, respectively, on the respective side 66a and 66b, respectively.

FIG. 12 shows exemplarily that the multi-aperture imaging device 11 of FIG. 19a-c. 25b could be supplemented by one or several of the additional means described below.

Figure 20:
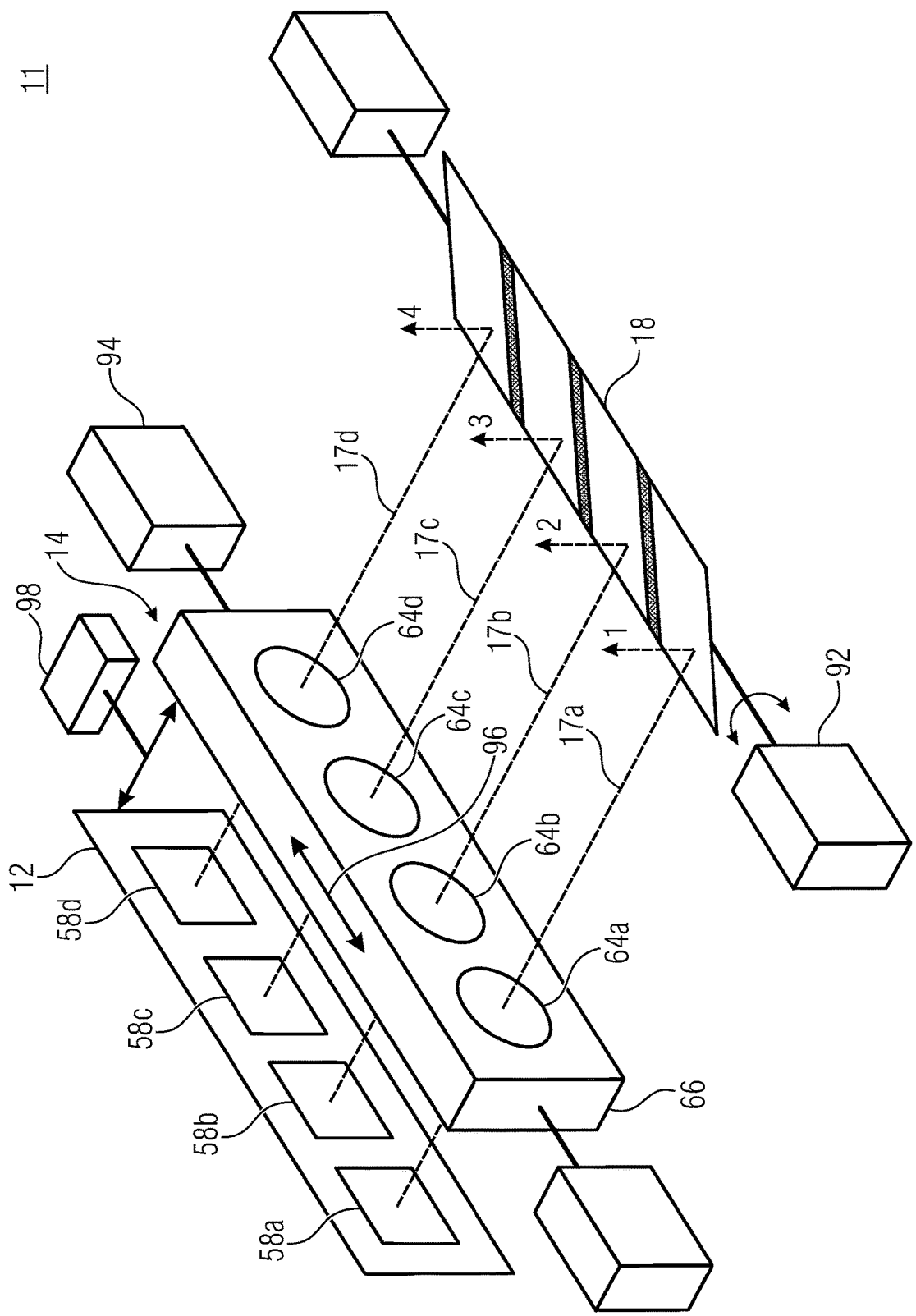
FIG. 20 shows the multi-aperture imaging device according to FIG. 19a-c which is supplemented, according to an embodiment, by additional means for realizing relative movements for optical image stabilization and for adapting the focusing.

For example, FIG. 20 shows that means 92 could exist for rotating the beam-deflecting means 18 around the axis of rotation 44 which is parallel to the line-extension direction of the array 14. The axis of rotation 44 is, for example, within the plane of the optical paths 17a-d or remote from the same by less than a quarter of the diameter of the optics 64a-d. Alternatively, it would also be possible that the axis of rotation is further apart, such as less than one optics diameter or less than four optics diameters. The means 92 can, for example, be provided to rotate the beam-deflecting means 18 with short response time in a merely small angular range, such as within a range of less than 1° or less than 10° or less than 20° in order to compensate shaking of the multi-aperture imaging device 11, for example by a user. In this case, the means 92 would be controlled by an image stabilization control.

Alternatively or additionally, means 92 could be configured to change the direction of the total field of view defined by the total coverage of the partial field of view 74a-d (FIG. 19a) with greater angular adjustments. Here, it would further be possible to obtain deflections by rotation of the beam-deflecting means 18 where the total field of view is arranged in the opposite direction relative to the device 11, for example by forming the beam-deflecting means 18 as mirror array reflective on both sides.

Again, alternatively or additionally, a device 11 can comprise means 94 for translationally moving the optics 64a-d by means of the substrate 66 and the substrate 66 itself, and hence the optics 64a-d, respectively, along the line-extension direction. The means 94 could, for example, also be controlled by the above-mentioned image stabilization control in order to obtain, by a movement 96 along the line-extension direction, image stabilization transversal to the image stabilization effected by the rotation of the mirror deflecting device 18.

Further, additionally or alternatively, the device 11 can comprise means 98 for changing the image-side distance between image sensor 12 and optics 64a-d and between image sensor 12 and carrier 66, respectively, for obtaining adjustment of depth of field. The means 98 can be controlled by manual user control or by autofocus control and focusing means of the device 11, respectively.

Thus, the means 94 serves as a suspension of the substrate 66 and is, as indicated in FIG. 20, arranged laterally beside the substrate 66 along the line-extension direction in order to not increase the installation height. It also applies to means 92 and 98 that the same are arranged in the plane of the optical paths for not increasing the installation height. The means 98 can also be connected to the beam-deflecting means 18 and can move the same simultaneously or almost simultaneously such that when changing the image-side distance between image sensor 12 and optics 64a-d, a distance between optics 64a-d and beam-deflecting means 18 remains essentially constant or constant. The means 92, 94 and/or 98 can be implemented based on pneumatic, hydraulic, piezoelectric actuators, DC motors, step motors, thermal actuators, electrostatic actuators, electrostrictive and/or magnetostrictive actuators or drives.

It should be noted that the optics 64a-d cannot only be held mutually in constant relative position, such as via the already mentioned transparent substrate, but also relative to the beam-deflecting means, such as via a suitable frame not increasing the installation height and thus running in the plane of the components 12, 14 and 18 and in the plane of the optical paths, respectively. The consistency of the relative position could be limited to the distance between optics and beam-deflecting means along the optical axes, such that the means 98 moves, for example, the optics 64a-d together with the beam-deflecting means translationally along the optical axes. The optics/beam-deflecting distance could be set to a minimum distance, such that the optical path of the channels is not laterally limited by the segments of the beam-deflecting means 18, which reduces the installation height, since otherwise the segments 68a-d would have to be dimensioned for the greatest optics/beam-deflecting means distance as regards to the lateral extension in order to not restrict the optical path. Additionally, the consistency of the relative position of the above-mentioned frames could hold the optics and beam-deflecting means in a rigid manner to one another along the x axis, such that the means 94 would move the optics 64*a-d* together with the beam-deflecting means translationally along the line-extension direction.

The above-described beam-deflecting means 18 for deflecting the optical path of the optical channels allows, together with the actuator 92 for generating the rotational movement of the beam-deflecting means 18 of an optical image stabilization control of the multi-aperture imaging device 11, image and total field of view stabilization, respectively, in two dimensions, namely by the translational movement of the substrate 66, image stabilization along a first image axis running essentially parallel to the line-extension direction, and by generating the rotational movement of the beam-deflecting means 18, image stabilization along a second image axis running essentially parallel to the optical axes prior to and without beam-deflecting, respectively, or, when the deflected optical axes are considered, perpendicular to the optical axes and the line-extension direction. Additionally, the described arrangements can effect translation movement of the beam-deflecting means and array 14 fixed in the stated frame perpendicular to the line-extension direction, such as by the described actuator 98, which can be used for realizing focus adjustment and hence autofocus function.

As an alternative to or in addition to the rotational movement for obtaining image stabilization along the second image axis, also, a translational relative movement between the image sensor 12 and the array 14 can be implemented. This relative movement can be provided, for example, by the means 94 and/or the means 98.

For completeness sake, it should be noted with respect to the above statements that the device when capturing via the image sensor areas captures one image of a scene per channel which are projected by the channels on the image sensor areas, and that the device can optionally have a processor that assembles or joins the images to a total image corresponding to the scene in a total field view and/or provides additional data, such as 3D image data and depth information of the object scene for generating depth maps and for software realization, such as refocusing (determining the image sharpness regions after the actual capturing), all-in-focus images, virtual green screen (separation of foreground and background), etc. The latter tasks could also be performed by the processor or externally. The processor, however, could also represent a component external to the multi-aperture imaging device.

Figure 21A:
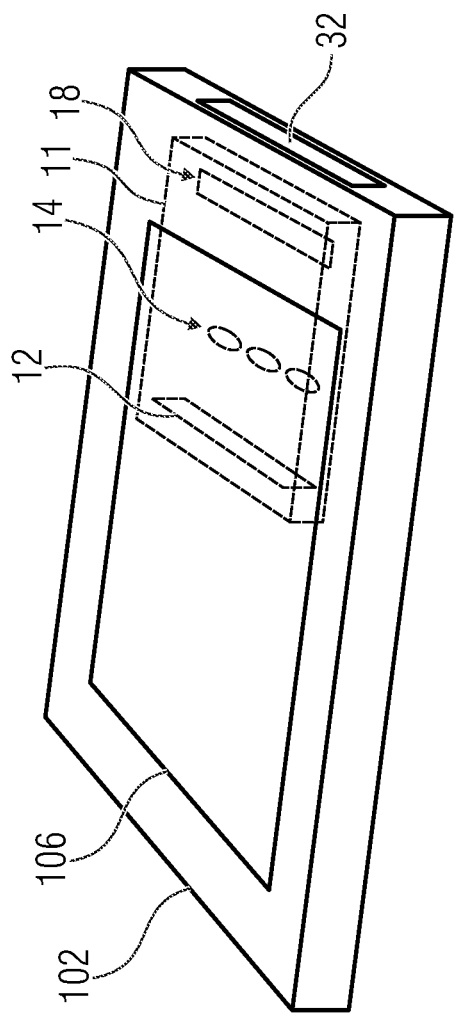
FIG. 21a shows a schematic view of a multi-aperture imaging device arranged in a flat housing according to an embodiment.

FIG. 21*a* illustrates that devices 11 of the above-described alternatives can be installed, for example in a flat housing of a portable device 130, such as a mobile phone, a smartphone or media player or the same, wherein then, for example, the planes of the image sensor 12 and the image sensor areas, respectively and the lens planes of the optics of the optical channels 16 are oriented perpendicular to the flat extension direction of the flat housing and parallel to the thickness direction, respectively. In that way, for example, the beam-deflecting means 18 would have the effect that the total field of view of the multi-aperture imaging device 11 is in front of a front side 102 of the flat housing which also comprises, for example, a monitor. Alternatively, a deflection would also be possible such that the field of view is in front of a rear side of the flat housing opposing the front side 102. The housing 22 of the device 130 and the device itself, respectively, can be flat, since, due to the illustrated position of the device 11 in the housing, the installation height of the device 11, which is parallel to the thickness of the housing, can be kept low. Switchability could also be provided in that a window is provided on the side opposing the side 102 and, for example, the beam-deflecting means is moved between two positions, wherein the latter is implemented, for example, as mirror mirroring on the front and rear and rotated from the one to the other position, or as a facet mirror having a set of facets for the one position and another set of facets for the other position, wherein the sets of facets are beside one another in line-extension direction and switching between the position takes place by translationally moving the beam-deflecting means back and forth along the line-extension direction. Installation of the device 11 into a different, possibly non-portable device, such as a car, would also be possible.

Several modules 11 whose partial field of view of their channels cover the same field of view completely and optionally even congruently can be installed in the device 130 with a base distance BA (cf. FIG. 15) to one another along a line-extension direction which is the same for both modules, such as for the purpose of stereoscopy. More than two modules would also be possible. The line-extension directions of the modules 11 could also be non-collinear and merely parallel to one another. However, it should be noted again that, as mentioned above, also a device 11 and a module, respectively, could be provided with channels such that the same completely cover the same total field of view in groups. The modules can be arranged in one/several line(s)/row(s) or any position of the device. When several modules are arranged, the same can be formed in the same manner or differently. A first module can be configured, for example, to perform stereoscopic capturing of the total field of view. A second module can be configured to perform simple capturing, stereoscopic capturing or higher order capturing.

It should be noted that in alternative embodiments the beam-deflecting means could also be omitted in comparison to the above-described embodiments. When merely partial mutual overlapping of the partial field of use is desired, this could be obtained, for example, via mutual lateral offsets between the center of the image sensor area and the optical center of the optics of the respective channel. Obviously, the actuators according to FIG. 20 could still be used, wherein, as a substitute for the means 92, for example, the actuator 94 is additionally able for translationally moving the optics and the carrier 66, respectively.

Again, in other words, the above embodiments show a multi-aperture imaging device with single-line array of juxtaposed optical channels where somewhere in the optical path of the multi-aperture imaging device a substrate, for example of glass or polymer, extending across the channel extends for improving the stability. Additionally, the substrate can include lenses on the front and/or rear side. The lenses can be made of the material of the substrate (such as produced by hot stamping) or molded thereon. Further lenses, which are not on the substrate and are individually mounted, can be in front of and behind the substrate. Several substrates can exist in one structure, both along as well as perpendicular to the line-extension direction. Here, it would also be possible to connect several substrates with lenses along the optical paths in series, i.e. to keep the same in a predetermined positional relation to one another in a different way, such as via a frame without necessitating any joining action. In that way, twice as many main sides would be available for providing or mounting lenses, as carrier substrates are used, such as a substrate 66 which can be loaded with lenses according to the above examples, here exemplarily according to FIG. 19*b*, and the substrate which can also be loaded with lenses according to the above embodiments, i.e. among others with lenses that are mounted on the main sides 66a and/or 66b via lens holders, but here exemplarily illustrated integrally produced, for example by injection molding or the same, such that lenses are formed on both sides 66a and 66b, although also molded lenses of different materials than the material of the parallelepiped-shaped substrate 66 would be possible as well as lenses on only one of the sides 66a or 66b. Both substrates are transparent and are penetrated by the optical paths, through the main sides 66a and 66b. Thus, the above embodiments can be implemented in the form of a multi-aperture imaging device with single-line channel arrangement, wherein each channel transmits a partial field of view of a total field of view and the partial fields of view partly overlap. A structure having several such multi-aperture imaging devices for stereo, triple, quadruple, etc. structures for 3D image capturing is possible. Here, the plurality of modules can be implemented as one contiguous line. The contiguous line could use identical actuators and a common beam-deflecting element. One or several mechanically enforcing substrates possibly existing within the optical path can extend across the total line which can form a stereo, triple, quadruple structure. Methods of superresolution can be used, wherein several channels project the same partial image areas. The optical axes can also already run in a divergent manner without beam-deflecting means, such that fewer facets are necessitated on the beam-deflecting unit. Then, advantageously, the facets have only one angular component. The image sensor can be integral, can comprise only one contiguous pixel matrix or several interrupted ones. The image sensor can be composed of many partial sensors that are, for example, juxtaposed on a printed circuit board. An autofocus drive of a focusing means can be implemented such that the beam-deflecting element is moved synchronously with the optics or is stationary. When no pre-divergence exists, embodiments provide for the optical paths running essentially or completely parallel between the image sensor 12 and the beam-deflecting means 18.

Figure 21B:
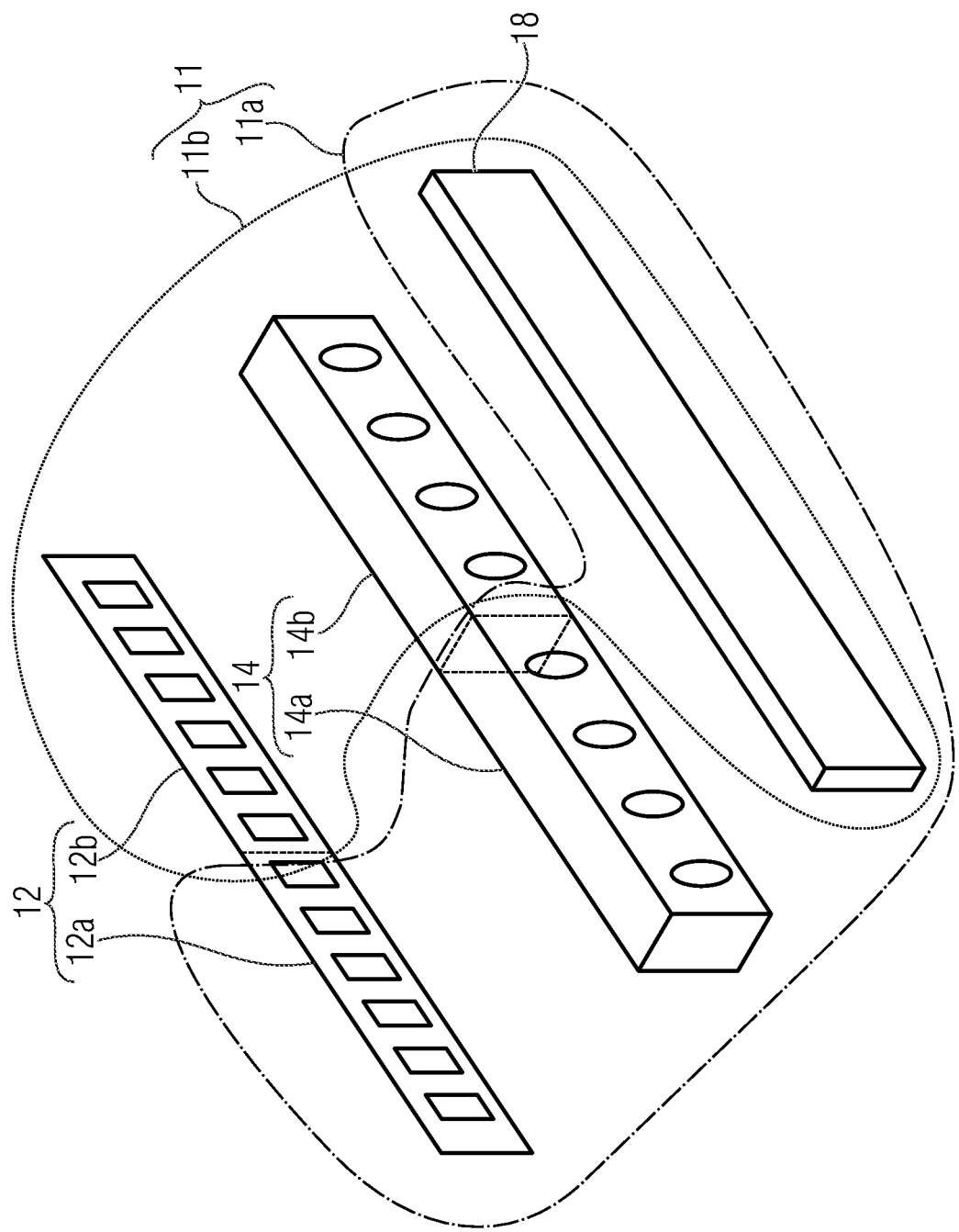
FIG. 21b shows a schematic structure of a multi-aperture imaging device for stereoscopically capturing a total field of view.

FIG. 21b shows a schematic structure including a first multi-aperture imaging device 11a and a second multi-aperture imaging device 11b as it can be arranged, for example in the device 130. The two multi-aperture imaging devices 11a and 11b can form a common multi-aperture imaging device 11 and can comprise a common image sensor 12 and/or a common array 14. The single-line arrays 14a and 14b form, for example, a common line in the common array 14. The image sensors 12a and 12b can form the common image sensor 12 and can be mounted, for example, on a common substrate and on a common circuit carrier, such as a common printed circuit board or a common flexboard. Alternatively, the image sensors 12a and 12b can also include differing substrates. Different combinations of these alternatives are also possible, such as multi-aperture imaging devices including a common image sensor, a common array and/or a common beam-deflecting means 18 as well as further multi-aperture imaging devices comprising separate components. It is an advantage of a common image sensor, a common single-line array and/or a common beam-deflecting means that a movement of a respective component can be obtained with high precision by controlling a small amount of actuators and synchronization between actuators can be reduced or prevented. Further, high thermal stability can be obtained. Alternatively or additionally, further multi-aperture imaging devices can also comprise a common array, a common image sensor and/or a common beam-deflecting means. The structure of the multi-aperture imaging device 11 can be used, for example for stereoscopic capturing of a total or partial field of view when optical channels of different partial multi-aperture imaging devices 11a and 11b are directed on the same partial field of view. Comparably, further partial multi-aperture imaging devices can be integrated in the common multi-aperture imaging devices, such that capturing of a higher order than stereo is possible.

Figure 22:
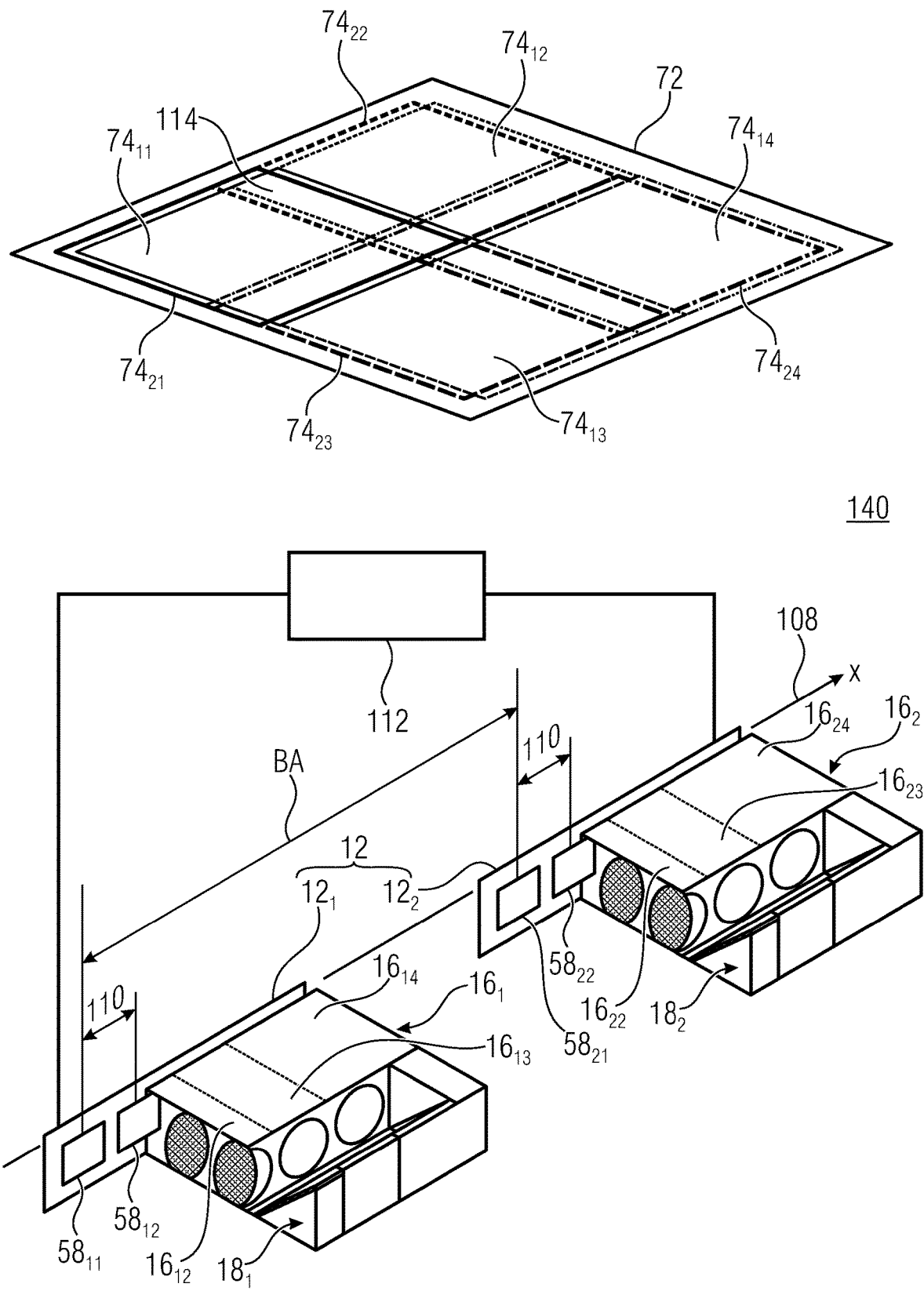
FIG. 22 shows a schematic view of a 3-D multi-aperture imaging device according to an embodiment.

FIG. 22 shows a 3D multi-aperture imaging device 140 as it can be used according to embodiments described herein. The same has an image sensor which can be divided into two components $12_1$ and $12_2$, respectively, as indicated in FIG. 22, a component $12_1$ for the "right" optical channels $16_1$ and the other component $12_2$ for the "left" channels $16_2$. The right and left optical channels $16_1$ and $16_2$ are structured identically in the example of FIG. 22, but arranged laterally offset from one another by the base distance BA in order to obtain as much depth information as possible with regard to the scene within the field of view of the device 140. For example, the 3D multi-aperture imaging device can be formed by two or more multi-aperture imaging devices 11. Thus, the elements provided with a reference number having an index 1 at the first position from the left belong to the first component 1 or a first module for the right channels, module 1, of the device 140 and the elements with a reference number having an index 2 at the first position from the left belong thus to the second component 2 or a second module for the left channels, module 2, of the device 140. Although the number of modules in FIG. 22 is 2, the device could also have more that are arranged with a respective base distance to one another.

Figure 28:
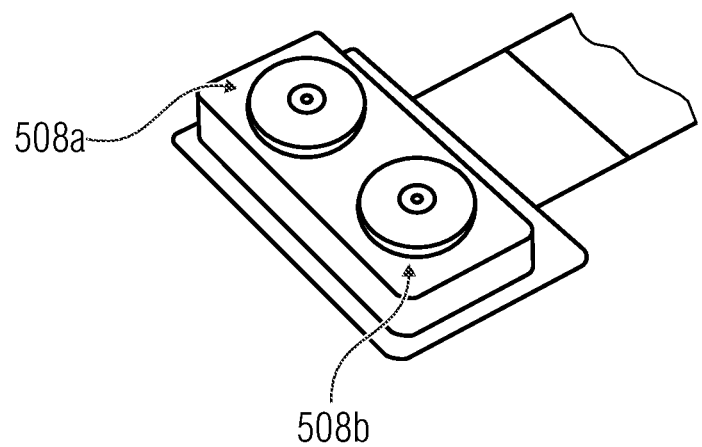
FIG. 28 shows a view of stereo structure of conventional cameras.
Figure 29:
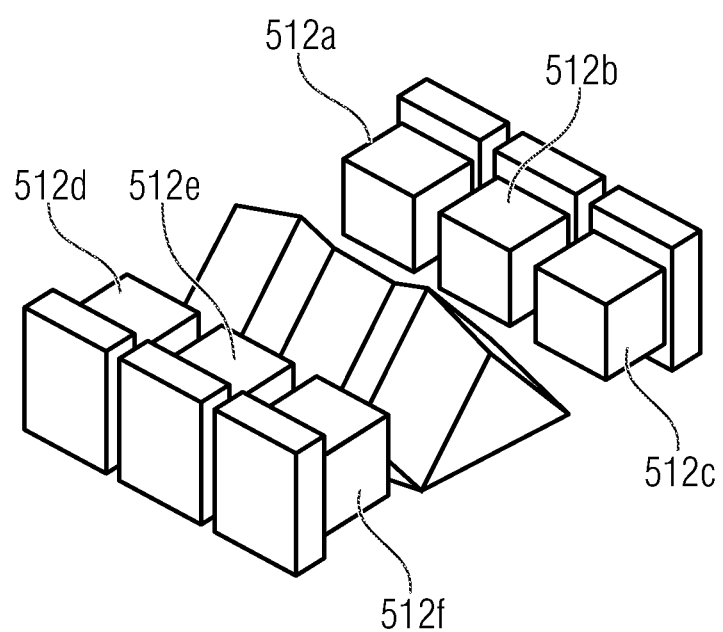
FIG. 29 shows a view of an array camera arrangement based on the usage of several individual cameras.

In the exemplary case of FIG. 22, each plurality $16_1$ and $16_2$ of optical channels comprises four juxtaposed optical channels. The individual "right" channels are differentiated by the second subscript index. The channels are indexed from right to left, i.e. the optical channel $16_{11}$ not illustrated in FIG. 28 due to a partial omission for clarity purposes is arranged, for example, along the base distance direction 108 along which the left and right channels are arranged offset from one another by the base distance BA at the outer right edge, i.e. furthest apart from the plurality $16_2$ of left channels, wherein the other right channels $16_{12}$-$16_{14}$ follow along the base distance direction 108. Thus, the channels $16_{11}$-$16_{14}$ form a single-line array of optical channels whose line-extension direction corresponds to the base distance direction 108. The left channels $16_2$ are structured in the same way. The same are also differentiated by the second subscript index. The left channels $16_{21}$-$16_{24}$ are arranged beside one another and in the same direction subsequent to one another like the right channels $16_{11}$-$16_{14}$, namely such that the channel $16_{21}$ is closest to the right channels and the channels $16_{24}$ furthest apart from the latter.

Each of the right channels $16_{11}$-$16_{14}$ includes respective optics that can consist, as indicated in FIG. 22, of one lens system. Alternatively, each channel could comprise one lens. Each optical channel $16_{11}$-$16_{14}$ captures one of overlapping partial fields of view 74a-f of the total field of view 72 which overlap as described in the context of FIG. 19a. The channel $16_{11}$ projects, for example, the partial field of view $74_{11}$ on one image sensor area $58_{11}$, the optical channel $16_{12}$ the partial field of view $74_{12}$ on one image sensor area $58_{12}$, the optical channel $16_{13}$ one allocated partial field of view $74_{13}$ on a respective image sensor area $58_{13}$ of the image sensor 12 not visible in FIG. 28, and the optical channel $16_{14}$ an allocated partial field of view $74_{14}$ on a respective image sensor area $58_{14}$ which is also not shown in FIG. 22 since the same is covered.

In FIG. 22, the image sensor areas $58_{11}$-$58_{14}$ of the image sensor 12 and the component $12_1$ of the image sensor 12, respectively, are arranged in a plane parallel to the base distance direction BA and parallel to the line-extension direction 108, respectively, and the lens planes of the optics of the optical channels $16_{11}$-$16_{14}$ are also parallel to this plane. Additionally, the image sensor areas $58_{11}$-$58_{14}$ are arranged with a lateral inter-channel distance 110, by which the optics of the optical channels $16_{11}$-$16_{14}$ are also arranged with respect to one another in this direction, such that the optical axes and optical paths of the optical channels $16_{11}$-$16_{14}$ run parallel to one another between the image sensor areas $58_{11}$-$58_{14}$ and the optics $16_{11}$-$16_{14}$. For example, centers of the image sensor areas $58_{11}$-$58_{14}$ and optical centers of the optics of the optical channels $16_{11}$-$16_{14}$ are arranged on the respective optical axis which run perpendicular to the above-mentioned common plane of the image sensor areas $58_{11}$-$58_{14}$.

The optical axes and optical paths, respectively, of the optical channels $16_{11}$-$16_{14}$ are deflected by a beam-deflecting means $18_1$ and hence provided with a divergence, which has the effect that the partial fields of view $74_{11}$-$74_{14}$ of the optical channels $16_{11}$-$16_{14}$ only overlap partly, such that, for example, the partial fields of view $74_{11}$-$74_{14}$ overlap at the most by 50% in the spatial angular sense. As indicated in FIG. 22, the beam-deflecting means $18_1$ can comprise, for example for each optical channel $16_{11}$-$16_{14}$ a reflective facet which are tilted with respect to one another differently among the channels $16_{11}$-$16_{14}$. An average inclination of the reflective facets with respect to the image sensor plane deflects the total field of view of the right channels $16_{11}$-$16_{14}$ in a direction that is, for example, perpendicular to the plane in which the optical axes of the optics of the optical channels $16_{11}$-$16_{14}$ run prior to and without beam-deflection, respectively, by the device $18_1$, or deviates from this perpendicular direction by less than 10°. Alternatively, the beam-deflecting means $18_1$ could also use prisms for beam-deflection of the individual optical axes and optical paths, respectively of the optical channels $16_{11}$-$16_{14}$.

The beam-deflecting means $18_1$ provides the optical paths of the optical channels $16_{11}$-$16_{14}$ with a divergence such that the channels $16_{11}$-$16_{14}$, actually disposed beside one another in linear way in the direction 108, cover the total field of view 72 in a two-dimensional manner.

It should be noted that the optical paths and optical axes, respectively, could also deviate from the described parallelism, but that the parallelism of the optical paths of the optical channels could still be so distinct that the partial fields of view covered by the individual channels $16_{11}$-$16_{14}$ and projected on the respective image sensor areas $58_{11}$-$58_{14}$, respectively, would mostly overlap without any further measures, such as beam-deflection, so that in order to cover a greater total field of view by the multi-aperture imaging device 140 the beam-deflecting means 18 provides the optical paths with additional divergence such that the partial fields of view of the channels $16_{11}$-$16_{14}$ overlap less. The beam-deflecting means $18_1$ has, for example, the effect that the total field of view has an aperture angle averaged over all azimuthal angles and over all transversal directions, respectively, which is greater than 1.5 times the respective average aperture angle of the partial fields of view of the optical channels $16_{11}$-$16_{14}$.

The left channels $16_{21}$-$16_{24}$ are structured in the same way as the right channels $16_{11}$-$16_{14}$ and positioned relative to the respective allocated image sensor areas $58_{21}$-$58_{24}$, wherein the optical axes of the optical channels $16_{21}$-$16_{24}$ running parallel to one another in the same plane as the optical axes of the channels $16_{11}$-$16_{14}$ are deflected by a corresponding beam-deflecting means $18_2$, such that the optical channels $16_{21}$-$16_{24}$ capture the same total field of view 72 almost congruently namely in partial fields of view $74_{21}$-$74_{24}$ into which the total field of view 72 is two-dimensionally divided, which overlap, and each of which overlaps almost completely with the respective partial field of view $74_{11}$-$74_{14}$ of a respective channel of the right channels $16_{11}$-$16_{14}$. For example, the partial field of view $74_{11}$ and the partial field of view $74_{21}$ overlap almost completely, the partial fields of view $74_{12}$ and $74_{22}$ etc. The image sensor areas $58_{11}$-$58_{24}$ can, for example, each be formed of one chip as described for the image sensor 12 in FIG. 19.

In addition to the above-mentioned components, the 3D multi-aperture imaging device comprises a processor 112 having the task of merging the images that have been captured when capturing by the 3D multi-aperture imaging device 10 by the right optical channels $16ii$-$16_{14}$ to a first total image. The problem that has to be addressed is the following: due to the inter-channel distances 110 between adjacent channels of the right channels $16_{11}$-$16_{14}$, the images that have been captured during capturing by the channels $16_{11}$-$16_{14}$ in the image areas $58_{11}$-$58_{14}$ cannot be simply and translationally moved with respect to one another and placed on top of one another. In other words, the same cannot easily be joined. The lateral offset along direction B, 108 and 110, respectively, in the images of the image sensor areas $58ii$-$58_{14}$ when capturing the same scene, that correspond to one another but that reside in different images is called disparity. The disparity of corresponding image contents depends again on the distance of this image content within the scene, i.e. the distance of the respective object from the device 140. The processor 112 could try to evaluate disparities among the images of the image sensor areas $58_{11}$-$58_{14}$ itself in order to merge these images with one another to a first total image, namely a "right total image". However, it is a disadvantage that the inter-channel distance 110 does exist and therefore causes the problem, but that the inter-channel distance 110 is also relatively low such that the depth resolution and estimation, respectively, is merely inaccurate. Therefore, the attempt of determining corresponding image content in an overlap area between two images, such as in the overlap area 114 between the images of the image sensor areas $58_{11}$-$58_{12}$, for example, by means of correlation is difficult.

Thus, for merging, the processor of FIG. 22 uses, in the overlap area 114 between the partial fields of view $74_{11}$ and $74_{12}$, disparities in a pair of images, one of which has been captured by one of the left channels $16_{21}$ or $16_{22}$, whose projected second partial field of view, namely $74_{21}$ and $74_{22}$, respectively, overlaps with the overlap area 114. For example, the process 112 for merging the images of the image sensor areas $58_{11}$ and $58_{12}$ evaluates disparities in images, one of which has been captured by one of the image sensor areas $58_{21}$ or $58_{22}$ and another one by a channel involved in the overlap area 140, i.e. an image that has been captured by one of the image sensor areas $58_{11}$ or $58_{12}$. Then, such a pair has a base distance from the base distance BA plus/minus one or no channel based distance 110. The latter base distance is significantly greater than a single channel base distance 110, which is why the disparities are easier to be determined in the overlap area 86 for the processor 112. Thus, for merging the images of the right channels, the processor 112 evaluates disparities that result with an image of the left channels and advantageously, but not exclusively, between images of one of the right channels and one of the left channels.

More specifically, it is possible that the processor 112 takes that part of the partial field of view $74_{11}$ that does not overlap with any of the other partial fields of view of the right channels more or less directly from the image $58_{11}$ and performs the same for the non-overlapping areas of the partial fields of view $74_{12}$ and $74_{14}$ based on the images of the image sensor areas $58_{12}$-$58_{14}$, wherein the images of the image sensor areas $58_{11}$-$58_{14}$ have, for example, been captured simultaneously. Merely in the overlap areas of adjacent partial fields of view, such as the partial fields of view $74_{11}$ and $74_{12}$, the processor 112 uses disparities of image pairs whose overlap in the total field of view 72 does overlap in the overlap area, but wherein the plurality but not merely one of them has been captured by one of the right channels and the other one by one of the left channels, such as again at the same time.

However, according to an alternative procedure, it would also be possible that the processor 112 warps all images of the right channel according to an evaluation of disparities between pairs of images where one of them has been captured by the right channels and the other one by the left channels. In that way, for example, the total image that is calculated by the processor 112 for the images of the right channels could be virtually "warped" not only in the overlap area of the partial fields of view $74_{11}$-$74_{14}$ of the right channels but also in the non-overlap area in a virtual manner on a focal point which is, for example, laterally in the center between the right channels $16_{11}$-$16_{14}$ by evaluating, also for those areas of the partial fields of view $74_{11}$-$74_{14}$ that do not overlap, disparities of image pairs by the processor 85 where one image has been captured by one of the right channels and another image by one of the left channels.

The 3D multi-aperture imaging device 140 of FIG. 22 is not only able to generate a total image from the images of the right channel, but the 3D multi-aperture imaging device 140 of FIG. 22 is also able, in one operating mode, to generate, in addition to the total image of the first channels, also a total image of the images of the left channels and/or to generate, in addition to the total image of the right channels, a depth map.

According to the first alternative, the processor 112 is, for example, configured to merge images captured by the left optical channels $16_{21}$-$16_{24}$ and the image sensor areas $58_{21}$-$58_{24}$ to a second total image, namely a total image of the left channel and to thereby use, in an overlap area of laterally adjacent ones of the partial fields of view $74_{21}$-$74_{24}$ of the left optical channels, disparities in a pair of images, the plurality of which but not only one has been captured by a right optical channel $16_{11}$-$16_{14}$ and overlaps with the respective overlap area of the pair of partial fields of view $74_{21}$-$74_{24}$, and the other one is captured by one of the left optical channels whose partial field of view overlaps with the respective overlap area.

Thus, according to the first alternative, the processor 112 outputs two total images for one capturing, namely one for the right optical channels and the other for the left optical channels. These two total images could be supplied, for example, to the two eyes of a user separately and hence result in a three-dimensional impression of the captured scene.

According to the other above-mentioned alternative, the processor 112 generates, in addition to the total image of the right channels a depth map, by using disparities in pairs of images comprising at least one pair at least for each of the right channels $16_{11}$-$16_{14}$ comprising an image captured by the respective right channel and a further image captured by one of the left channels.

In one embodiment, where the depth map is generated by the processor 112, it is also possible to perform the above-mentioned warping for all the images that have been captured by the right channels based on the depth map. Since the depth map comprises depth information across the total field of view 72, it is possible to warp all the images that have been captured by the right channels, i.e. not only in the overlap areas of the same but also in the non-overlap areas, on a virtual common aperture point and a virtual optical center, respectively.

The two alternatives could also both be processed by the processor 112. The same could first generate, as described above, the two total images, namely one for the right optical channels and the other for the left optical channels by using, when merging the images of the right channels in the overlap areas between the images of the right channels also disparities from pairs of images where one of them belongs to the images of the left channels, and by using, when merging the images of the left channels in the overlap areas between the images of the left channels, also disparities from pairs of images where one of them belongs to the images of the right channels in order to generate then, from the total images obtained in that manner which represent the scene in the total field of view from different perspectives, a total image with an allocated depth map, such as a total image that lies between the optical centers of the optics of the right and left optical channels, but possibly not exclusively in the center between the same, for a virtual view and for a virtual optical center, respectively. For calculating the depth map and for warping one of the two total images or warping and merging both total images in the virtual view, the processor 85 would then use the right and left total image, virtually as intermediate result from the previous merging of the left and right individual images, respectively. Here, the processor evaluated disparities in the two intermediate result total images in order to obtain the depth map and to perform warping or warping/merging of the same.

It should be noted that the processor 112 performs evaluation of disparities in a pair of images, for example, by means of cross-correlation of image areas.

It should be noted that in a different coverage of the total field of view 72 by the partial fields of view of the left channels on the one hand and by the partial fields of view of the right channels on the other hand, possibly more than four channels (irrespective of their allocation to the left or right channels) overlap, as it was the case, for example, also at the mutual overlap between the overlap areas of partial fields of view adjacent in line direction or column direction of the previous examples, where the partial fields of view of the right channels as well as the partial fields of view of the left channels were each arranged in columns and lines.

It applies generally to the number of disparity sources that the same are $$\binom{N}{2},$$

wherein N relates to the number of channels with overlapping partial fields of view.

In addition to the above description, it should be noted that the processor 112 optionally also performs channel-by-channel correction of perspective projection faults of the respective channel.

It should be noted that the embodiment of FIG. 22 has been exemplary in many ways. This concerns, for example, the number of optical channels. The number of right optical channels might not be four but is somehow greater than or equal to 2 or is between 2 and 10, both inclusive, and the overlap area of the partial fields of view of the right optical channels can, as far as for each partial field of view or each channel the pair with the greatest overlap to the respective partial field of view is considered, can be, in terms of surface area for all these pairs, between ½ and 1/1000 of an average image size of the images captured by the image areas $58_{11}$-$58_{14}$, measured, for example, in the image plane, i.e., the plane of the image sensor areas. The same applies, for example, to the left channels. However, the number can differ between the right channels and the left channels. This means that the number of left optical channels, $N_L$, and right optical channels, $N_R$, does not have to be the same and a division of the total field of view 72 into the partial fields of view of the left channels and the partial fields of view of the right channels does not have to be approximately the same as it was the case in FIG. 22. Concerning the partial fields of view and their overlap it can be such that the partial fields of view project into one another but at least 20 pixel, as long as an image distance and object distance, respectively, of 10 m is considered, for all pairs having a greater overlap, wherein this can apply both to the right channels as well as to the left channels.

In contrary to the above statements it is not necessary that the left optical channels and the right optical channels, respectively, are formed in a single line. The left and/or the right channels can also form a two-dimensional array of optical channels. Additionally, it is not necessary that the single-line arrays have a collinear line-extension direction. However, the arrangement of FIG. 22 is advantageous since the same results in a minimum installation height perpendicular to the plane in which the optical axes of the optical channels, i.e., both the right and the left channels run prior to and without beam deflection, respectively. Concerning the image sensor 12 it had already been mentioned that the same can be formed of one, two or several chips. For example, one chip could be provided per image sensor area $58_{11}$-$58_{14}$ and $58_{21}$-$58_{24}$, wherein in the case of several chips the same can be mounted on one or several printed circuit boards, such as one printed circuit board for the left channels and the image sensors of the left channels, respectively, and one printed circuit board for the image sensors of the right channels.

Thus, in the embodiment of FIG. 22 it is possible to place adjacent channels within the channels of the right or left channels as densely as possible, wherein in the optimum case the channel distance 110 corresponds to the lens diameter. This results in a low channel distance and hence low disparity. The right channels on the one hand and the left channels on the other hand can, however, be arranged at any distance BA to one another, such that great disparities can be realized. All in all, there is the option of artefact-reduced or artefact-free image fusion and a production of depth maps with a passive optical imaging system.

Compared to the above examples it would be possible to use more than only two groups of channels $16_1$ and $16_2$. The number of groups could be indicated by N. If in this case the number of channels per group were the same, and the total field of view division into partial fields of view were also the same for all groups, a number of disparity sources of $$\binom{2N}{2},$$

for example, would result per overlap area of partial fields of view of the group $16_1$. A different total field of view division for the groups of channels is also possible as has already been mentioned above.

Finally, it should be noted that in the above description merely the exemplary case that the processor 112 merges the image of the right channels has been used. The same process could be performed by the processor 112, as mentioned above, for both and all channel groups, respectively, or also for the left one or the same.

Figure 23A:
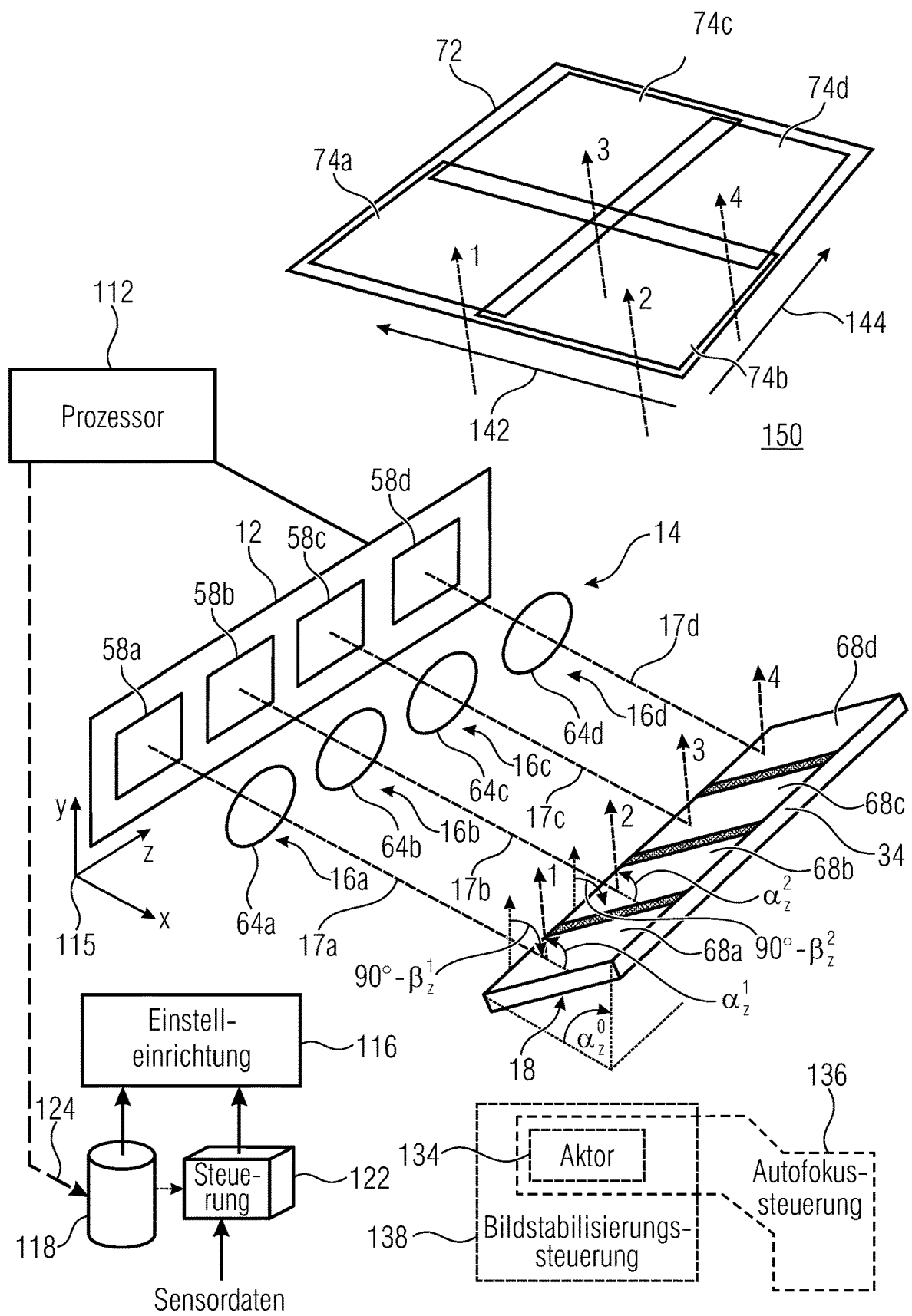
FIG. 23a shows a schematic view of a further multi-aperture imaging device according to an embodiment supplemented, according to an embodiment, by additional means for realizing relative movements for focus control and optical image stabilization.
Figure 23B:
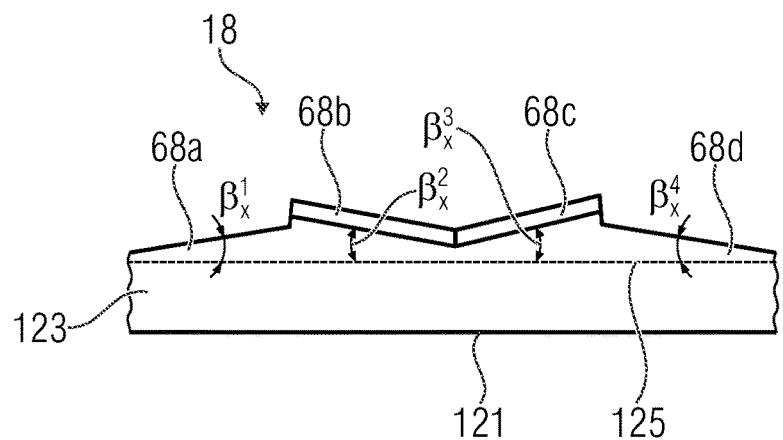
FIG. 23b-23e shows schematic side views of a beam-deflecting device according to an embodiment.
Figure 23E:
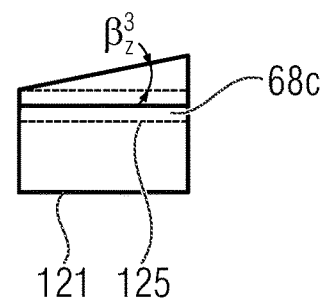
Figure 23C:
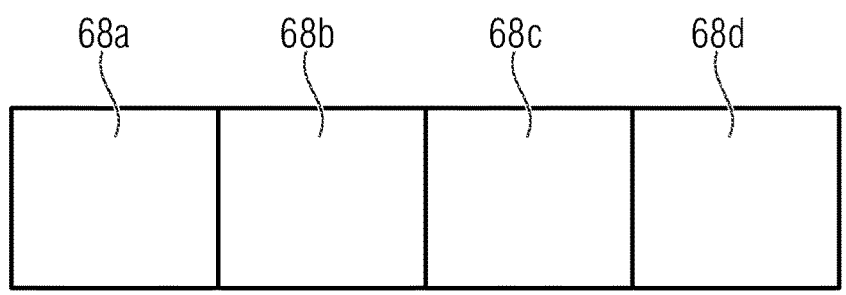
Figure 23D:
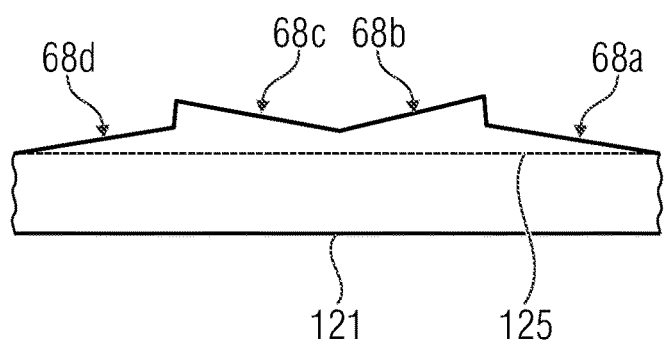

FIG. 23a shows an embodiment of a multi-aperture imaging device 150. The multi-aperture imaging device 150 can, for example, be the multi-aperture imaging device 11, 1000, 2000, 4000 or 8000. The image sensor areas 58a-d may be arranged in a common plane, namely the image plane of the optical channels 16 and their optics, respectively. In FIG. 23a, this plane is exemplarily parallel to the plane spanned by a z and an y axis of a Cartesian coordinate system which is, for simplifying the following description, shown in FIG. 23a and provided with the reference number 115.

In a linear array of optical channels, the extension of the multi-aperture imaging device 150, as it is limited by the image sensor 12 and the optics 64 towards the bottom, is greater along the line-extension direction than the diameter of a lens. The minimum extension of the multi-aperture imaging device 150, as it is determined by the mutual arrangement of image sensor 12 to optics 64 along the z axis, i.e., along the optical axes and optical paths of the optical channels 16a-d, is smaller than the minimum extension along the z axis, but due to the implementation of the optical channels 16a-d as a single-line array, the same is greater than the minimum expansion of the multi-aperture imaging device in the lateral direction y perpendicular to the line-extension direction z. The latter is given by the lateral extension of each individual optical channel 16a-d, such as the extension of the optics 64a-d along the y axis, possibly including the holder 66.

As described above, in the embodiment of FIG. 23a, the optical axes 17a-d are parallel to another prior to and without the deflection by the beam-deflecting means 18, respectively, for example, at the optics 64a-d, respectively, as shown in FIG. 23a, or the same only deviate slightly therefrom. The corresponding centered positioning of optics 64a-d as well as the image sensor areas 58a-d is easy to produce and favorable as regards to minimizing the installation space. The parallelism of the optical paths of the optical channels has also the effect that the partial fields of view covered by the individual channels 16a-d and projected on the respective image sensor areas 58a-d, respectively, would overlap almost completely without any further measures, such as beam deflection. In order to cover a greater total field of view by the multi-aperture imaging device 150, a further function of the beam-deflecting means 18 is to provide the optical paths with divergence such that the partial fields of view of the channels 16a-d overlap less.

It is assumed, for example, that the optical axes 17a-f of the optical paths of the optical channels 16a-d are parallel to one another prior to and without the beam-deflecting means 18, respectively, or deviate, with regard to a parallel alignment along the alignment averaged across all channels, by less than a tenth of a minimum aperture angle of the partial fields of view of the optical channels 16a-d. Without additional measures, the partial fields of view would largely overlap. Thus, the beam-deflecting means 18 of FIG. 23a includes, for each optical channel 16a-d, a reflecting facet 68a-d clearly allocated to this channel, which are each optically planar and tilted with respect to one another, namely such that the partial fields of view of the optical channels overlap less with regards to the solid angle and cover, for example a total field of view having an aperture angle that is, for example, greater than 1.5 times the aperture angle of the individual partial fields of view of the optical channels 16a-d. In the exemplary case of FIG. 23a, the mutual inclination of the reflective facets 68a-d has, for example, the effect that the optical channels 16a-d that are actually arranged linearly juxtaposed along the z axis cover the total field of view 72 according to a two-dimensional arrangement of the partial fields of view 74a-d.

If, in the embodiment of FIG. 23a, the angular deflection of the optical axes 17a-d of the optical channels 16a-d is considered in the plane spanned by the averaged direction of the optical axes prior to beam deflection and the averaged direction of the optical axes after beam deflection, i.e., in the zy plane in the example of FIG. 23a on the one hand and in the plane running perpendicular to the latter plane and parallel to the averaged direction of the optical axes after beam deflection on the other hand, the example of FIG. 23a corresponds to the exemplary case that the averaged direction after beam deflection corresponds to the y axis. Thus, on average, the optical axes of the optical channels are deflected by 90° in the yz plane around the z axis and, on average, the optical axes are not tiled out of the yz plane.

For example, $\beta_x^1$ indicates the inclination angle of the facet 68a with respect to the xz plane measured in the xy plane, i.e., tilting of the facet 68a around the z axis with respect to the xz plane in which the optical axes 17a-d run. $\beta_x^1=0°$ corresponds to an alignment of the facet 68a parallel to the xz plane. Accordingly, $\alpha_z^1=2\cdot\beta_z^1$ applies. Accordingly, $\beta_x^1$ defines the inclination angle of the facet 68a with respect to a plane having the inclination $\beta_z^1$ with respect to the xz plane and running parallel to the z axis measured along the z axis. Therefore, $\alpha_x^1=2\cdot\beta_x^1$ applies accordingly. The same definitions apply for the other channels: $\alpha_x^i=2\cdot\beta_x^i$, $\alpha_z^i=2\cdot\beta_z^i$. For each optical channel, the setting angle can be greater than an inclination angle of the inclination of the reflecting facet allocated to this channel with respect to carrier substrate through which the optical channels run. Here, the carrier substrate can be positioned parallel to a line-extension direction of the array 14 and the setting angle can be in a plane perpendicular to the line-extension direction.

FIGS. 23b-23e show side views of a beam-deflecting device according to an embodiment for exemplarily four optical channels that are arranged linearly or unilaterally, respectively. The beam-deflecting device 18 of FIG. 23b-23e could be used as beam-deflecting device of FIG. 19a, wherein then, however, the partial fields of view would not cover the total field of view clockwise 3, 4, 2, 1 as illustrated in FIG. 19a but clockwise in the order 4, 2, 1, 3. The inclination angles of the facets 68a-d are indicated in FIG. 23b-e. The same are differentiated by superscript indices 1-4 and allocated to the respective channel, respectively. Here, both N and $\beta_x^4$ are 0°. The rear side of the carrier substrate, i.e., the side opposing the surface provided with the facets 68a-d is indicated in FIG. 23b-23e by 121. The material forming the parallelepiped-shaped portion of the carrier substrate 123 is below the dotted line 125. It is obvious that the additional material added to the same has little volume such that molding is eased.

The carrier substrate 123 is placed inclined by a setting angle $\alpha_x^0$ with respect to the image sensor 12, namely around the axis around which the average direction of the optical axes of the optical channels is deflected, i.e., the z axis in FIG. 23a. This setting angle has the effect that the surface of the beam-deflecting device 18 facing the image sensor 12 already effects "coarse deflection" of the optical paths of the optical channels.

For the deflecting angles of the deflection of the optical path of each optical channel by the beam-deflecting means 18, this means that the same are each based on the setting angle $\alpha_x^0$ as well as on the respective inclination of the reflecting facet allocated to the optical channel with respect to the carrier substrate 123 itself. These mentioned facet-individual inclinations of the facets 68a-d can be defined, as described above, by an inclination angle in the xy plane and an inclination angle with respect to the normal of the carrier substrate 123 in the plane perpendicular thereto. It is advantageous when it applies that, for each channel, the setting angle is greater than the inclination, i.e., $\alpha_x^0 > \max(|\beta_x|,|\beta_z|)$ for all channels. It is even more advantageous when said inequality is fulfilled already for $\alpha_x^0/2$ or even for $\alpha_x^0/3$. In other words, it is advantageous when the setting angle is great compared to the inclination angles of the facets 68a-d, such that the additional material compared to a pure parallelepiped-shape of the beam-deflecting device 18 is low. $\alpha_x^0$ can, for example, lie between 30° and 60°, each inclusive.

Production of the beam-deflecting means 18 of FIG. 23b-23e can be performed, for example, in that the additional material is molded on the carrier substrate 123 by a molding tool. Here, the carrier substrate 123 could, for example, be glass while the molded additional material thereon is polymer. A further option is forming the beam-deflecting device 18 of FIG. 23b-23e integrally by injection molding or the same. This has the effect that the surface of the beam-deflecting means facing the image sensor is mirrored at least on the reflecting facets allocated to the optical channels. The carrier substrate can be pivoted as described, for example, in the context of FIG. 12b.

Some aspects of the structure of the multi-aperture imaging device described so far relate, so to speak, to a desired or instantaneous setting prior to or at the time of capturing a total image, for example. The multi-aperture imaging device 150 of FIG. 23a includes, for example, a processor, such as the processor 112 that merges images that have been captured by the image sensor areas 58a-d at, for example, the same time, with the above mentioned settings, to a total image representing the scene in the total field of view 72. The algorithm used by the processor 112 to join or merge the images projected by the optical channels 16a-d on the image sensor areas 58a-d and captured by the latter is, for example, designed such that assumptions on maintaining specific parameters of the above-described components of the multi-aperture imaging device 150 should be complied with such that the quality of the total image fulfils certain specifications or the algorithm can be applied at all. For example, the algorithm assumes compliance with one or several of the following assumptions:

1) The optics to image sensor area distances along the x axis are the same for all optical channels 16a-d;
2) The relative location of the partial fields of view 74a-d and in particular the overlap between the same corresponds to a predetermined specification or deviates from the same by less than a predetermined maximum deviation.

For various reasons, it can be the case that one or several of the above stated assumptions are not complied with or are not complied with sufficiently. Reasons for not complying with the same could, for example, be production tolerances, such as inaccuracies of the relative locations of the optics 64a-d to one another and relative to the image sensor 12. Production inaccuracies can also include an inaccuracy of the installation of the beam-deflecting device 18 and possibly the relative locations of the facets 68a-f to one another when the beam-deflecting means 18 comprises facets 68a-d.

In addition to or as an alternative to the production-induced tolerance deviations, temperature variations can have the effect that one or several of the above stated assumptions does not apply or is not sufficiently complied with.

To some degree, the algorithm for joining and merging, respectively, the images of the image sensor areas 58a-d to the total image executed by the processor 112 can possibly compensate deviations from an optimum alignment and arrangement of the components, such as deviations of the positions of the partial fields of view 74a-d within the total field of view 72 from a set constellation of relative locations of the partial fields of view to one another. When joining and merging, respectively, the images, the processor 112 could compensate, for example, such deviations to a certain degree. However, when specific deviation limits are exceeded (not complying with assumption 2), the processor 112 would, for example, not be able to compensate the deviations.

Producing the multi-aperture imaging device 150 such that the above-mentioned assumptions are complied with, such as across a specific temperature range, has the tendency of increasing production costs of the multi-aperture imaging device 150. In order to prevent this, the multi-aperture imaging device 150 of FIG. 23a includes an adjustment means 116 for channel-individually changing a relative location between the image sensor area 58i of a respective optical channel 16i, the optics 64i of the respective optical channel 16i and the beam-deflecting means 18 and the respective segment 68i of the same, or for channel-individually changing an optical characteristic 16i or an optical characteristic of the segment 68i of the beam-deflecting means 18 relating to the deflection of the optical path of the respective optical channel. The adjustment means 116 is controlled by default values and performs the adjustment tasks according to the default values. The same are provided by a memory 118 and/or a control 122 that will be discussed below.

The apparatus 150 comprises, for example, a memory 118 with stored default values for channel-individual control of the adjustment means 116. The default values can be determined by the manufacturer and can be stored in the memory 118. Additionally, for example, as indicated in FIG. 23a by a dotted line 124, the processor 112 can be able, via evaluations of captured images of the image sensor areas 58a-d, such as images to be joined and merged to a total image, respectively, by the processor 112, to improve and update the stored default values in the memory 118. The processor 112 captures, for example, a scene by adjusting the multi-aperture imaging device 150 with current stored default values via the adjustment means 116, as will be described in more detail below. For this, the default values are read out of the memory 118 and used by the adjustment means 116 for channel-individual adjustment. By analyzing the images of the image sensor areas 58a-d captured in that way, the processor 112 obtains information on how the stored default values just used for capturing are to be modified in the memory 118 in order to result in a more accurate or improved compliance of the above assumptions in the next capturing by using these improved or updated default values.

The stored default values can comprise a complete set of adjustment values, i.e., a set of adjustment values for completely adjusting the device 150. The same are selected as described above and explained in more detail below in order to reduce or eliminate specific channel-individual deviations of the optical characteristics of the channels from a set characteristic.

It can be the case that the default values include several sets of adjustment values, such as one per sequence of successive temperature intervals such that for image capturing that set of adjustment values is used that is actually suitable for a current situation. For this, the control 122 can access or look up the table of allocations between default value sets and different predetermined situations in the memory 118. For this access, the control 122 receives sensor data reflecting the current situation, such as data concerning temperature, pressure, moisture, location of the device 150 in the room and/or a current acceleration or a current turning rate of the device 150 and determines from this data one of the several default value sets in the memory 118, namely the one allocated to the predetermined situation which is closest to the current situation as described by the sensor data. Sensor data can also be obtained from the image sensor data of image sensor areas. For example, the control 122 selects a set in the allocated temperature interval of which the current temperature falls. The default values of the selected set from the memory 118 used for specific image capturing by the adjustment means 116 can then be updated again when the optional feedback 124 is used.

The stored default values can be configured, for example, such that a measure for dispersion of a distribution of one or several characteristics among the optical channels is reduced by controlling the adjustment device by means of the stored default values, namely a transversal deviation of the partial fields of view from a regular distribution of the partial fields of view, focal lengths of the optics or depth-of-field distances of the optical channels.

Alternatively, the default values in the control 122 can be determined without any memory 118, namely when, for example, mapping of the current sensor data on suitable default values is firmly integrated in the control 122. The mapping can be described by a functional context between sensor data and default values. A functional context could be adapted by parameters. The parameters could be adapted via the feedback 124.

The memory 118 can, for example, be a non-volatile memory. Possibly, it is a read-only memory but a rewritable memory is also possible. The control 122 and the processor 112 can be implemented in software, hardware or in programmable hardware. The same can be programs executed on a common microprocessor. The sensors for providing the sensor data for the control 122 can belong to the device 150, such as, for example, the image sensor areas or can also be external components, such as components of the apparatus incorporated into the device as will be discussed with reference to the following figures.

In the following, possible implementations for the adjustment means 116 will be described. Here, the adjustment means 116 of FIG. 23a can apply to one, several or all of the implementation variations described below. Specific combinations will also be discussed below.

In the shown variation, the adjustment means 116 comprises, for example, one actuator 126i for each channel 16i, which moves the optics 64i of the respective channel 16i in axial direction along the optical axis 17i and along the optical path and/or transversal thereto along the z axis and/or the y axis, respectively. Alternatively, the actuator 126i could, for example, also move the image sensor 12 or an individual image sensor area 58i. Generally, the actuator 126i could effect a relative movement of image sensor area 58i, optics 64i and/or the respective segment 64i of the beam-deflecting means 24.

According to a variation that FIG. 24a relates to, the adjustment means 116 comprises a phase-changing optical element and a phase-changing element 128$i$, respectively, for each channel 16$i$, which can, as indicated in FIG. 24$a$, be integrated in the respective optics 64$ai$ (128$i''$), be integrated into the segment 61$i$ (128$i'''$), can be positioned between image sensor area 58$i$ and optics 64$i$ (128$i'$) or between optics 64$i$ and beam-deflecting segment 68$i$ (128$i''''$), wherein combinations of the above-mentioned options are also possible. The phase-changing optical element 128$i$ can, for example effect a location-dependent change of a refractive index, i.e. a local distribution of the same, such as by liquid crystals. Alternatively or additionally, the phase-changing optical element 128$i$ causes a change of the shape of an optically active surface, such as by using piezos having a mechanical effect on flexible, fixed, transparent materials and cause a deformation or by using the electrowetting effect. The phase-changing optical element 128$i''$ could, for example change the refractive index of optics 64$i$. Alternatively, the phase-changing element 128$i''$ could change a shape of an optical lens area of the optics 64$i$ and thereby change the effective refractive power of the optics 64$i$. The phase-changing element 128$i'''$ could, for example generate a sinusoidal phase grating on an optically relevant surface of the segments 68$i$, such as on the reflective facet, in order to effect virtual tilting of the respective surface. Similarly, the phase-changing element 128$i'$ or phase-changing element 128$i''$ could deflect the optical axis.

In other words, the phase change effected by the phase-changing optical element 128$i$ can be mostly rotationally symmetrical, such as rotationally symmetrical around the optical axis 17$i$ and hence effect, in the case of 128$i'$, for example, a change of the focal length of the optics 64$i$. The phase change effected by the element 128$i$ can, however, be almost linear such as linear along the z axis or along the y axis in order to effect a change of the deflection angle or a deflection of the optical axis 17$i$ in the respective direction.

The rotationally symmetrical phase change can be used for focusing and the linear phase change for a location correction of the partial field of view of the respective optical channel 16$i$.

According to a further variation illustrated in FIG. 24$b$, the adjustment means 116 comprises one actuator 132$i$ for each channel 16$i$, which changes the segment 68$i$, such as the reflecting facet of the respective channel 16$i$ in its angular orientation with respect to the optical axis 17$i$, i.e. the setting angle $\beta_x^i$. Here, it should be noted that the segment 68$i$ is not limited to a reflecting facet. Each segment 68$i$ could also be implemented as a prism deflecting the direction of the optical axis 17$i$ in the yz plane while the optical path of the optical channel 16$i$ passes through the prism.

For realizing the relative movements by the actuators 126$i$ and 132$i$, respectively, i.e. for generating the movement of the optics 68$i$ which could be implemented, for example, in a translational manner, as well as for tilting the segment 68$i$ by the actuator 132$i$ and the z axis, for example, a pneumatic, hydraulic, piezoelectric, thermal, electrostatic or electrodynamic drive or DC or step motor or again a voice-coil drive could be used.

When referring back to FIG. 23$a$, dotted lines indicate that the multi-aperture imaging device 150 can optionally include, in addition to the adjustment means 116, one or several actuators 134 for generating a relative movement between image sensor 12, optics array 14 and beam-deflecting means 18 that is global, i.e. the same for all optical channels 16$a$-$d$. The one or the several additional actuators 134 could, as indicated in FIG. 23$a$, be part of an optionally existing autofocus control 136 (focusing means) and/or an optionally existing image stabilization control of the multi-aperture imaging device.

Figure 25:
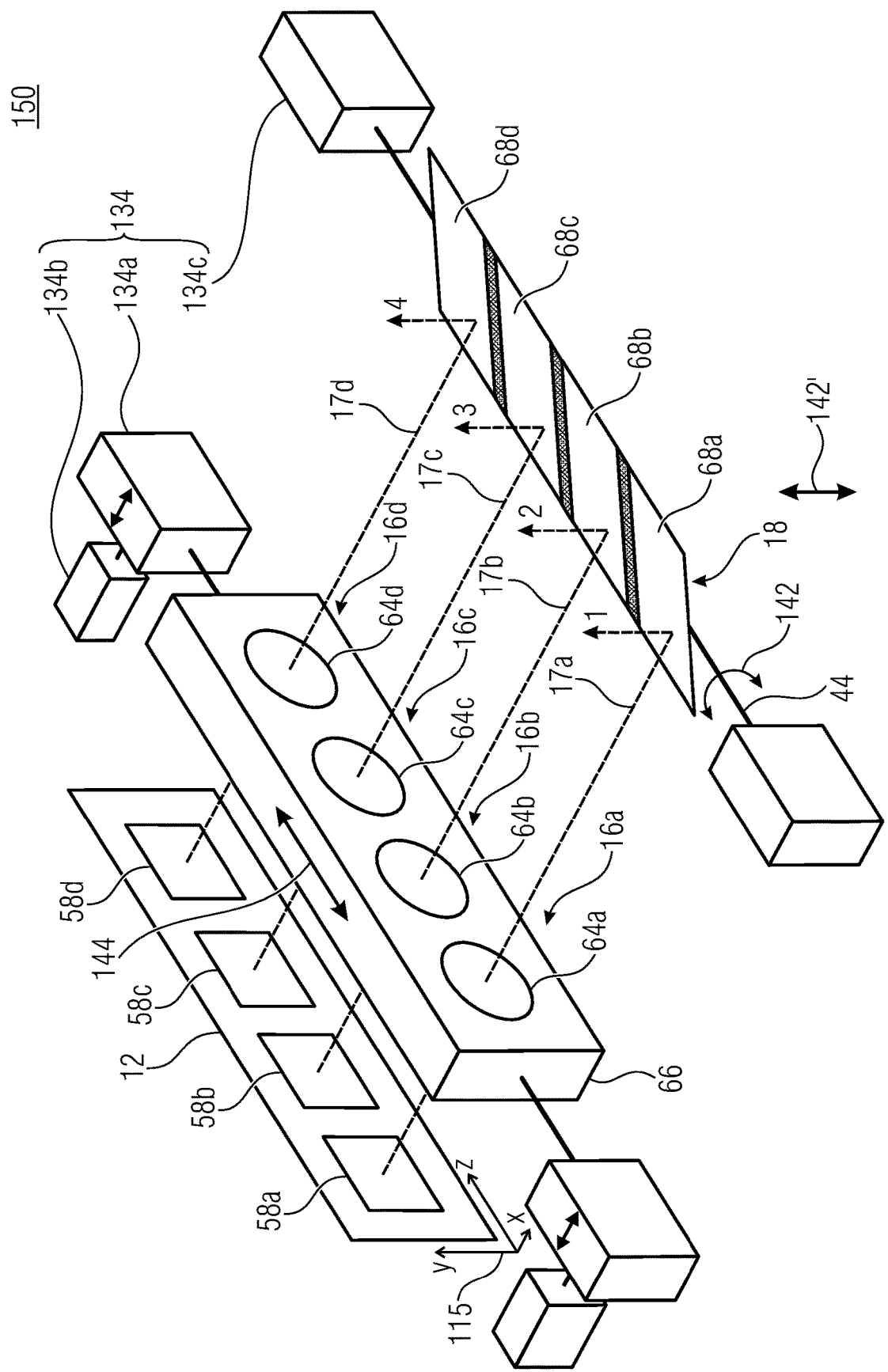
FIG. 25 shows a schematic view of the device of FIG. 23a supplemented by additional actuators according to an embodiment.

A specific example of a device 150 of FIG. 23$a$ supplemented by additional actuators is shown in FIG. 25. FIG. 25 shows the multi-aperture imaging device 150 of FIG. 23$a$, wherein the optics 64$a$-$d$ of the optical channels 16$a$-$d$ are mechanically fixed to one another via the common carrier 66. Via this common holder, it is possible to subject the optics 64$a$-$d$ to a global movement which is the same for all channels, such as by translational movement of the carrier 66 in the z direction, i.e. along the line-extension direction of the array 14. For this, an actuator 134$a$ is provided. Thus, the actuator 134$a$ generates a translational movement of the optics 64$a$-$d$ which is the same for all optical channels 16$a$-$d$, in that the actuator 134$a$ subjects the common carrier 66 to the translational movement along the x axis. Regarding the type of actuator 134$a$, reference is made to the examples that have been stated with reference to FIGS. 24$a$ and 24$b$. Further, the device 150 comprises an actuator 134$b$ for changing the distance of the image sensor 58$i$ to optics 54$i$ along the x axis and along the optical axis 17$i$, respectively, in a manner that is global, i.e. the same for all optical channels 16$a$-$d$. As indicated in FIG. 25, for example, the actuator 134$b$ subjects optics 64$a$-$d$ to the translational movement along the z axis for changing the distance from the allocated image sensor portions 58$a$-$d$ not via the carrier 66 but also via the actuator 134, which is thus also subject to the translational movement along the x axis and actually serves as suspension for the carrier 66.

Figure 26:
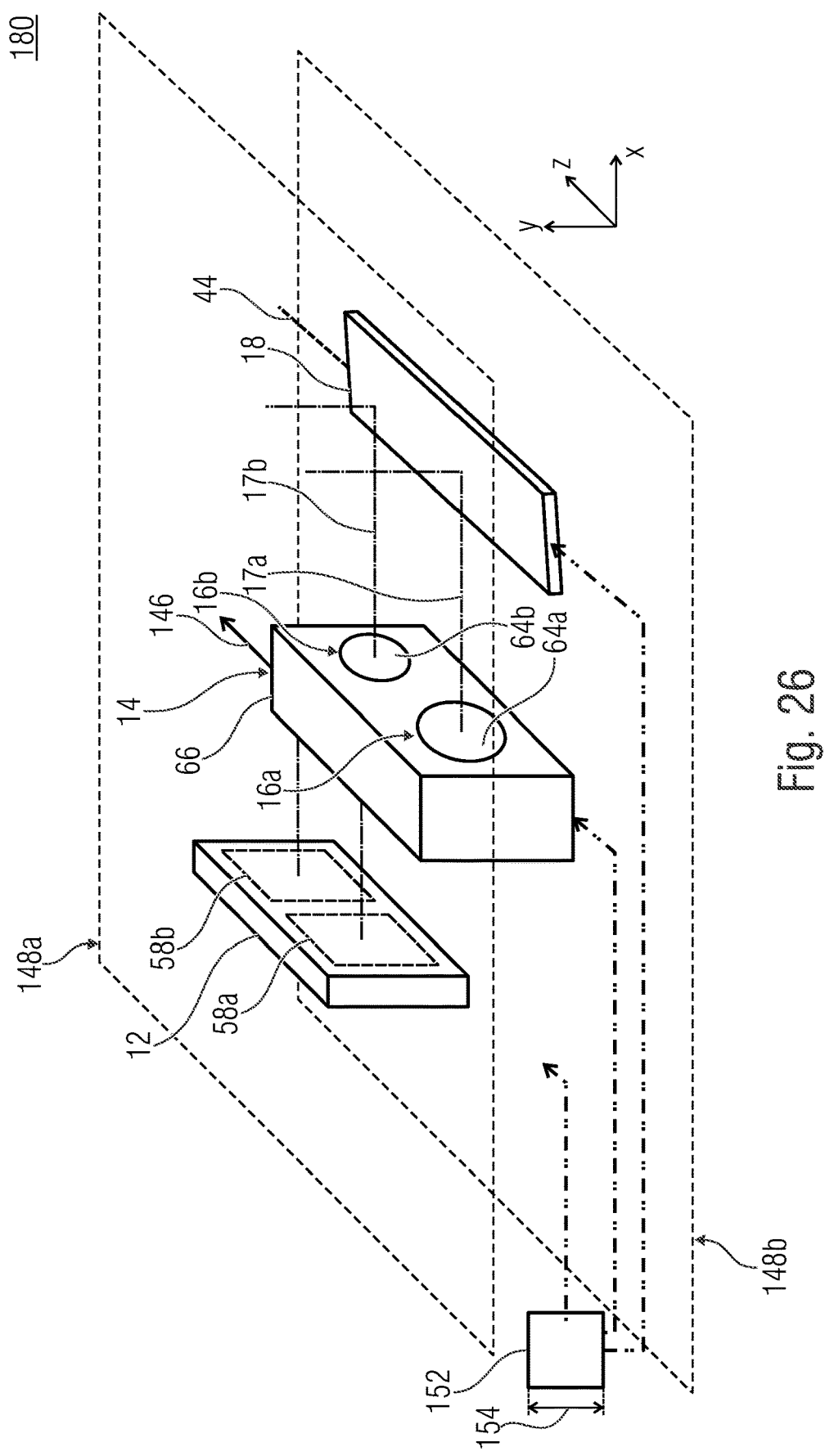
FIG. 26 shows a schematic view of an arrangement of actuators in a multi-aperture imaging device according to an embodiment.
Figure 27:
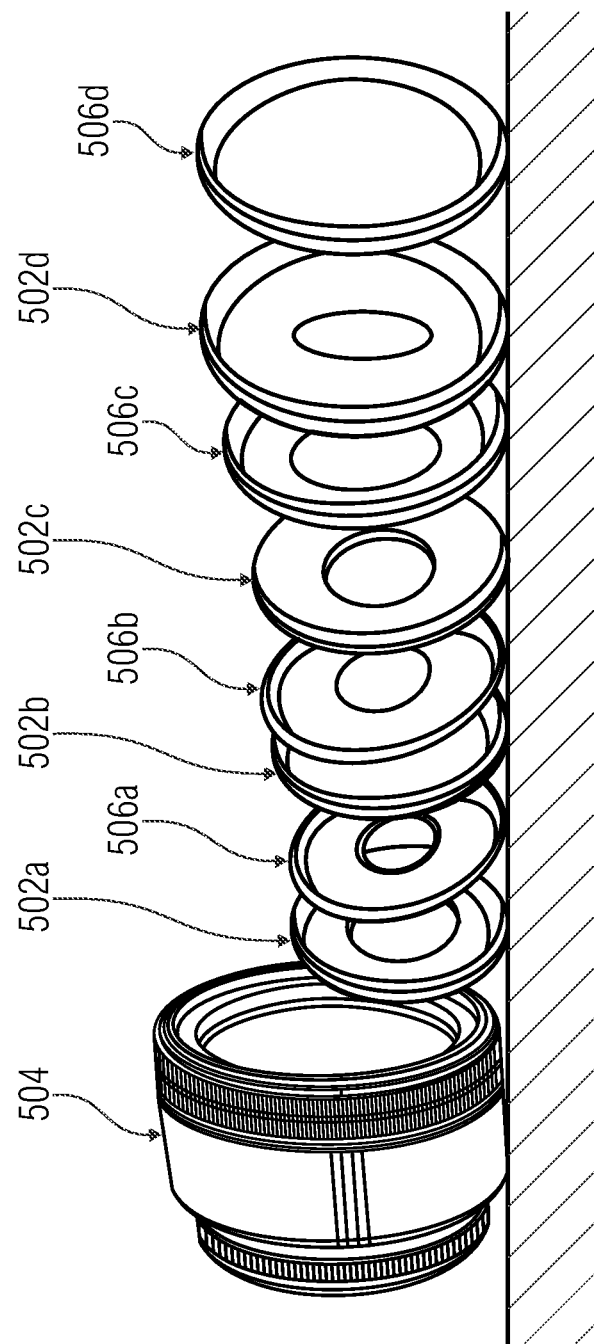
FIG. 27 shows a view of components of a conventional camera with a single imaging channel.

Additionally, the device 150 of FIG. 26 comprises an actuator 134$c$ for rotating the beam-deflecting means 18 around an axis running parallel to the z axis and lying in or not far apart from the plane where the optical axes 17$a$-$d$ run. With regard to actuators 134$b$ and 134$c$, reference is also made to the list of examples provided with reference to FIGS. 24$a$ and 24$b$ above concerning possible implementation examples. The rotational movement exerted by the actuator 134$c$ on the beam-deflecting means 18 has the same or equal effect on the segments 68$a$-$d$ on the beam-deflecting means 18 for all channels 16$a$-$d$, i.e. the same is global or all channels.

Via the actuator 134$b$, the autofocus control 136 is, for example, able to control the focus of an image captured by the device 150 by means of the channels 16$a$-$d$ in a manner global for all channels. The image stabilization control 138 is able to stabilize the total field of view 72 by means of the actuator 134$c$ in a first direction 142 and by means of the actuator 134$a$ in a direction 144 perpendicular thereto, with respect to shaking by a user. The first direction 142 can be obtained by a rotational movement around the axis of rotation 44. As indicated by the first direction 142', alternatively or additionally, translational movement of the beam-deflecting means 18 and/or the array 14 can be generated by the actuator 134. Here, the directions 142, 142' and 144 can be parallel to the image axes, in one plane of the direction or can correspond to the same. Image stabilizers described herein can be configured in order to have a joint effect for two, a plurality or all optical paths of the optical channels. This means that channel individual stabilization can be omitted, which is advantageous.

For example, the device 150 of FIG. 23$a$ comprises one actuator for each channel 16$a$-$d$, such as an actuator 126$i$ for each channel 16$i$, in order to subject the image sensor areas 58$a$-$d$ in a channel individual-manner to a translational movement along the z axis and/or along the y axis in order to compensate, for example, to manufacturing inaccuracies or temperature-induced drifts of the partial fields of view within the total field of view. Alternatively or additionally, the device 150 of FIG. 23a could comprise an actuator 128i'' in order to compensate focal length differences of the optics 64a-d that have undesirably occurred in the production process. Additionally or alternatively, the device 150 of FIG. 23a can comprise an actuator 128i''' in order to compensate deviations of the relative inclinations of segments 68a-d with respect to one another caused by production or temperature such that the relative inclinations result in the desired coverage of the total field of view 72 by the partial fields of view 74a-d. Additionally or alternatively, the device 150 can comprise actuators of the types 128i' and 128i''', respectively.

Summarized again, the device 150 can comprise an actuator 134c that is configured to rotate the beam-deflecting means 18 around an axis that is parallel to the line-extension direction z of the array 14. The axis of rotation is, for example in the plane of the optical axes 17a-d or less than a quarter of a diameter of the optics 64a-d apart from the same. Alternatively, it could also be possible that the axis of rotation is further apart, such as less than one optics diameter or less than four optics diameters. The actuator 134c can, for example, be provided to rotate the beam-deflecting means 18 with a short response time in merely a small angular range, such as within a span of less than 5° or less than 10° in order to compensate shakings of the multi-aperture imaging device 150, for example by a user while capturing images. In this case, the actuator 134c would, for example, be controlled by the image stabilization control 138.

Alternatively or additionally, the actuator 134c could be configured to change the total field of view 72, which is defined by the total coverage of the partial fields of view 74a-d (FIG. 23a), in its direction with greater angular offsets. Here, it would further be possible that by rotating the beam-deflecting means 18 deflections are obtained where the total field of view is arranged in the opposite direction relative to the device 150, for example in that the beam-deflecting means 18 is configured as a mirror array reflective on both sides.

Again, alternatively or additionally, the device 150 can comprise an actuator 134a that is configured to move the optics 64a-d translationally by means of the substrate 66 and the substrate 66 itself and hence the optics 64a-d along the line-extension direction. The actuator 134a could, for example also be controlled by the above-mentioned image stabilization control in order to obtain, by the movement 96 along the line-extension direction, image stabilization transverse to the image stabilization realized by the rotation of the mirror-deflecting means 18.

Further, additionally or alternatively, the device 150 can comprise an actuator 134b for changing the image-side distance between image sensor 12 and optics 64a-d and between image sensor 12 and body 66, respectively, to obtain depth-of-field adjustment, cf. FIG. 20.

The means 98 can be controlled by manual user control or by autofocus control of the device 150.

The actuator 134a serves as a suspension of the substrate 66 and, as indicated in FIG. 23a, the same is arranged laterally beside the substrate 66 along the line-extension direction in order to not increase the installation height. It also applies to the actuators 134b and 134c that the same are arranged in the plane of the optical paths in order to not increase the installation height.

It should be noted that the optics 64a-d could not only be held with respect to one another, such as via the above-mentioned transparent substrate, but also relative to the beam-deflecting means in a constant relative location, such as via a suitable frame which does not increase the installation height and thus runs in the plane of the components 12, 14 and 66 and in the plane of the optical paths, respectively. The consistency of the relative location could be limited to the distance between optics and beam-deflecting means along the optical axes, such that the actuator 134b moves, for example, the optics 64a-d translationally together with the beam-deflecting means 18 along the optical axes. The optics-to-beam-deflecting means distance could be set to a minimum distance, such that the optical path of the channels is not laterally restricted by the segments of the beam-deflecting means 18, which reduces the installation height, since otherwise the segments 68i would have to be dimensioned, as regards to the lateral extension, for the greatest optics-to-beam-deflecting means distance in order to not restrict the optical path. Additionally, the consistency of the relative location could mean that the above-mentioned frame holds the optics and the beam-deflecting means along the z axis in a rigid manner to one another, such that the actuator 134a would move the optics 64a-d together with the beam-deflecting means translationally along the line-extension direction.

The above-described beam-deflecting means 18 for deflecting the optical path of the optical channels allows, together with the actuator 134c for generating the rotational movement of the beam-deflecting means 18 and the actuator 134 of an optical image stabilization control of the multi-aperture imaging device 150, image and total image field stabilization, respectively, in two-dimensions, namely by the translational movement of the substrate 66 image stabilization along a first image axis running essentially parallel to the line-extension direction, and by generating the rotational movement of the beam-deflecting means 18, image stabilization along a second image axis running essentially parallel to the optical axes prior to and without beam deflection, respectively, or, if the deflected optical axes are considered, perpendicular to the optical axes and the line-extension direction. Additionally, the arrangement described herein can effect translational movement of the beam-deflecting means fixed in the stated frame and the array 14 perpendicular to the line-extension direction such as by the described actuator 54, which can be used for realizing focus control and hence autofocus function.

FIG. 26 shows a schematic view of a multi-aperture imaging device 180 for illustrating an advantageous arrangement of actuators, such as for image stabilization and/or for adjusting a focus. The multi-aperture imaging device 180 can be, for example, the multi-aperture imaging device 11, 150, 1000, 2000, 4000 or 8000. The image sensor 12, the array 14 and the beam-deflecting means 18 can span a cuboid in space. The cuboid can also be considered as virtual cuboid and can have, for example, a minimum volume and in particular a minimum perpendicular extension along a direction parallel to the y direction and a thickness direction, respectively, and can include the image sensor 12, the single-line array 14 and the beam-deflecting means 18. The minimum volume can also be considered such that the same describes a cuboid spanned by the arrangement and/or operational movement of the image sensor course, the array 14 and/or the beam-deflecting means 18. The array 14 can have a line-extension direction 146 along which the optical channels 16a and 16b are arranged juxtaposed, possibly parallel to one another. The line-extension direction 146 can be arranged in a stationary manner in space.

The virtual cuboid can comprise two sides that are aligned oppositely parallel to one another, parallel to the line-extension direction 146 of the single-line array 14 as well as parallel to part of the optical path 17a and/or 17b of the optical channels 16a and 16b between the image sensor 12 and the beam-deflecting means 18. Simply put, but without any limiting effect, this can, for example, be a top and a bottom of the virtual cuboid. The two sides can span a first plane 148a and a second plane 148b. This means the two sides of the cuboids can each be part of the plane 148a and 148b, respectively. Further components of the multi-aperture imaging device can be arranged completely but at least partly inside the area between the planes 148a and 148b, such that installation space requirements of the multi-aperture imaging device 180 along a direction parallel to a surface normal of the plane 148a and/or 148b is low, which is advantageous. A volume of the multi-aperture imaging device can have a low or minimum installation space between the planes 148a and 148b. Along the lateral sides or extension directions of the planes 148a and/or 148b, the installation space of the multi-aperture imaging device can be large or of any size. The volume of the virtual cuboid is, for example, influenced by an arrangement of the image sensor 12, the single-line array 14 and the beam-deflecting means 18, wherein the arrangement of these components can be made according to the embodiments described herein such that the installation space of these components along the direction perpendicular to the planes and hence the distance of the planes 148a and 148b to one another becomes low or minimum. Compared to other arrangements of the components, the volume and/or the distance of other sides of the virtual cuboid can be enlarged.

The multi-aperture imaging device 180 includes an actuator means 152 for generating a relative movement between the image sensor 12, the single-line array 14 and the beam-deflecting means 18. The actuator means 152 is arranged at least partly between the planes 148a and 148b. The actuator means 152 can be configured to move at least one of the image sensor 12, the single-line array 14 or the beam-deflecting means 18 rotationally around at least one axis and/or translationally along one or several directions. For this, the actuator means 152 can comprise at least one actuator, such as the actuator 128i, 132i and 134 for channel-individually changing a relative location between the image sensor area 58i of a respective optical channel 16i, the optics 64i of the respective optical channel 16i and the beam-deflecting means 18 and the respective segment 68i of the same, respectively, or for channel individually changing an optical characteristic 16i or an optical characteristic of the segment 68i of the beam-deflecting means 18 relating to the deflection of the optical path of the respective optical channel. Alternatively or additionally, the actuator means can implement autofocus and/or optical image stabilization as described above.

The actuator means 152 can have a dimension or extension 154 parallel to the thickness direction. A proportion of at the most 50%, at the most 30% or at the most 10% of the dimension 154 can project beyond the plane 148a and/or 148b starting from an area between the planes 148a and 148b or can project from the area. This means that the actuator means 152 projects at the most insignificantly beyond the plane 148a and/or 148b. According to embodiments, the actuator means 152 does not project beyond the planes 148a and 148b. It is an advantage that an extension of the multi-aperture imaging device 180 along the thickness direction is not enlarged by the actuator means 152.

The above-described devices 20, 30, 50, 50, 60, 70, 90, 100 and/or 140 can also be referred to as imaging systems.

Although some aspects have been described in the context of an apparatus, it is obvious that these aspects also represent a description of the corresponding method, such that a block or device of an apparatus also corresponds to a respective method step or a feature of a method step. Analogously, aspects described in the context of or as a method step also represent a description of a corresponding block or detail or feature of a corresponding apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A multi-aperture imaging device comprising:
   at least one image sensor; and
   an array of juxtaposed optical channels, wherein each optical channel comprises optics for projecting at least one partial area of an object area on an image sensor area of the image sensor, the array comprising:
   a housing comprising a wall structure facing or facing away from the image sensor, through which the optical channels pass, and a sidewall structure arranged on the wall structure, wherein the wall structure or the sidewall structure is formed comprising glass, ceramic, glass ceramic or a crystalline material, wherein the optics of the optical channels are arranged in the housing, and wherein the wall structure is connected to optics of the optical channels and fixes the optics with respect to one another;
   wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or
   wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

2. The multi-aperture imaging device according to claim 1, wherein the housing is formed of joined plate-shaped structures and comprises at least the wall structure and at least the sidewall structure.

3. A multi-aperture imaging device comprising:
   at least one image sensor; and
   an array of juxtaposed optical channels, wherein each optical channel comprises optics for projecting at least one partial area of an object area on an image sensor area of the image sensor;
   wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure;

wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

4. The multi-aperture imaging device according to claim 3, wherein at least one of the plate-shaped structures is formed comprising glass, ceramic, glass ceramic or a crystalline material.

5. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein the wall structure extends across all optical channels and is formed transparent for a wavelength of radiation to be captured by the multi-aperture imaging device, and wherein the optical channels pass through a material of the wall structure.

6. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein optical diaphragms are arranged on the wall structure that are configured to limit an optical path of the optical channels along a direction perpendicular to a course of the optical path.

7. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein the wall structure is integrally formed.

8. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein the optics of the optical channels are mechanically connected to the wall structure and wherein the wall structure comprises a transparent area of a wall structure material, wherein the optical channels look through the transparent area towards the image sensor or towards the object area.

9. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein the wall structure is a first wall structure and wherein the housing comprises an opposing second wall structure of the housing, wherein the first wall structure forms an entry side of optical paths of the optical channels, wherein the second wall structure forms an exit side of the optical paths of the optical channels and wherein the first wall structure and the second wall structure are connected to one another via the sidewall structure of the housing.

10. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein the wall structure is a first wall structure facing the image sensor and wherein the housing comprises an opposing second wall structure that is connected to the first wall structure via the sidewall structure and wherein the sidewall structure comprises an optically partly scattering or partly absorbing or partly reflecting structure in an area arranged facing the image sensor.

11. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein the array comprises partition wall structures that are arranged between the optical channels and formed of an at least partly opaque material such that stray light suppression between the optical channels is achieved.

12. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein partition wall structures are arranged in the housing between the optical channels, wherein the optics are arranged in a contactless manner with respect to an adjacent partition wall structure.

13. The multi-aperture imaging device according to claim 11, wherein the partition wall structures comprise a different material than the sidewall structures.

14. The multi-aperture imaging device according to claim 11, wherein the sidewall structure comprises mechanical guides that are configured to mechanically support the partition wall structures.

15. The multi-aperture imaging device according to claim 11, wherein the partition wall structures comprise an optically partly scattering or partly absorbing or partly reflecting structure in an area facing the image sensor, which is configured to scatter or reflect light laterally emitted from an optical channel to a first extent impinging on the optically partly scattering or partly absorbing or partly reflecting structure to a second lower extent towards the at least one image sensor.

16. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein the sidewall structure of the housing comprises an optically partly scattering or partly absorbing or partly reflecting structure in an area of adjacent optical channels facing the image sensor, which is configured to scatter or reflect light laterally emitted from an optical channel to first extent impinging on the optically partly scattering or partly absorbing or partly reflecting structure to a second lower extent towards the at least one image sensor.

17. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein an optical channel is configured to project a first partial area of the optics area on a first image sensor area and a second partial area of the object area on a second image sensor area, and wherein an at least partly opaque structure is arranged between the first image sensor area and the second image sensor area for reducing stray light between the first image sensor area and the second image sensor area.

18. The multi-aperture imaging device according to claim 17, wherein the at least partly opaque structure tapers along a direction facing away from the image sensor.

19. The multi-aperture imaging device according to claim 1 or comprising at least one image sensor, and an array of juxtaposed optical channels; wherein each optical channel comprises optics for projecting at least one partial area of an object area on an image sensor area of the image sensor,
wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure,
wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or
wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;
wherein the wall structure is a first wall structure and wherein the distance between the first wall structure and an opposing second wall structure of the housing is defined across two sidewall structures at most.

20. The multi-aperture imaging device according to claim 1 or comprising at least one image sensor, and an array of juxtaposed optical channels; wherein each optical channel comprises optics for projecting at least one partial area of an object area on an image sensor area of the image sensor,
wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure,
wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or
wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;
wherein the optics comprise a first and second optically effective main side and a first, second, third and fourth secondary side that connect the first and second main side, wherein the first, second, third and fourth secondary side are arranged essentially perpendicular to one another.

21. The multi-aperture imaging device according to claim 20, wherein the optics have a rectangular cross-section.

22. The multi-aperture imaging device according to claim 1 or comprising at least one image sensor, and an array of juxtaposed optical channels; wherein each optical channel comprises optics for projecting at least one partial area of an object area on an image sensor area of the image sensor,
wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure,
wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or
wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;
the multi-aperture imaging device comprising a beam-deflecting unit that is arranged between the array and the object area and that is configured to deflect an optical path of the optical channels.

23. The multi-aperture imaging device according to claim 22, wherein the beam-deflecting unit comprises a first position and a second position between which the beam-deflecting unit can be moved rotationally or translationally, wherein the beam-deflecting unit is configured to deflect the optical path of each optical channel in a differing direction in the first position and in the second position.

24. The multi-aperture imaging device according to claim 23, wherein the beam-deflecting unit comprises a first reflecting main side and a second reflecting main side, wherein in the first position the first reflecting side is arranged facing an image sensor and in the second position the second reflecting side is arranged facing the image sensor.

25. The multi-aperture imaging device according to claim 22, wherein the beam-deflecting unit is formed as an array of facets that are arranged along a line-extension direction of the array of optical channels and wherein one facet is allocated to each optical channel.

26. The multi-aperture imaging device according to claim 22, wherein the beam-deflecting unit is formed as an array of facets that are arranged along a line-extension direction of the array of optical channels and wherein a first optical path of a first optical channel and at least one second optical path of a second optical channel are allocated to a facet.

27. The multi-aperture imaging device according to claim 25, wherein an optical path of a first optical channel is deflected towards a first partial area and an optical path of the first optical channel towards a second partial area by the same facet.

28. The multi-aperture imaging device according to claim 1 or comprising at least one image sensor, and an array of juxtaposed optical channels; wherein each optical channel comprises optics for projecting at least one partial area of an object area on an image sensor area of the image sensor,
wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure,
wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or
wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;
the multi-aperture imaging device further comprising an optical image stabilizer having a joint effect for two, a plurality or all optical paths of the optical channels for image stabilization along a first image axis and a second image axis by generating a translational relative movement between an image sensor and the array, or a beam-deflecting unit for deflecting the optical paths of the optical channels, wherein the translational movement runs parallel to a first image axis and a second image axis of an image captured by the multi-aperture imaging device.

29. The multi-aperture imaging device according to claim 28, wherein the relative movement is provided by actuators that are configured to move the image sensor with respect to the housing or to move the housing with respect to the image sensor.

30. The multi-aperture imaging device according to claim 1 or comprising at least one image sensor, and an array of juxtaposed optical channels; wherein each optical channel comprises optics for projecting at least one partial area of an object area on an image sensor area of the image sensor,
wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure,
wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or
wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;
the multi-aperture imaging device further comprising an optical image stabilizer having a joint effect for two, a plurality or all optical paths of the optical channels for image stabilization along a first image axis by generating a translational relative movement between an image sensor and the array and for image stabilization along a second image axis by generating a rotational movement of the beam-deflecting unit.

31. The multi-aperture imaging device according to claim 28, wherein the optical image stabilizer comprises at least one actuator and is arranged such that the same is arranged at least partly between two planes that are spanned by sides of a cuboid, wherein the sides of the cuboid are aligned parallel to one another as well as to a line-extension direction of the array and a part of the optical path of the optical channels between the image sensor and the optics and whose volume is minimum and still comprises the image sensor and the array.

32. The multi-aperture imaging device according to claim 31, wherein the image stabilizer projects out of an area between the planes by 50% at most.

33. The multi-aperture imaging device according to claim 1 or comprising at least one image sensor, and an array of juxtaposed optical channels; wherein each optical channel comprises optics for projecting at least one partial area of an object area on an image sensor area of the image sensor,
wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure,
wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or
wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

the multi-aperture imaging device further comprising a focusing unit that comprises at least one actuator for adjusting a focus of the multi-aperture imaging device that is configured to provide a relative movement between at least one optics of one of the optical channels and the image sensor.

34. The multi-aperture imaging device according to claim 33, wherein the relative movement is provided by actuators that are configured to move the image sensor with respect to the housing or to move the housing with respect to the image sensor.

35. The multi-aperture imaging device according to claim 33, wherein the focusing unit is arranged such that the same is arranged at least partly between two planes that are spanned by sides of a cuboid, wherein the sides of the cuboid are aligned parallel to one another as well as to a line-extension direction of the array and a part of the optical path of the optical channels between an image sensor and the optics and whose volume is minimum and still comprises the image sensor and the array.

36. The multi-aperture imaging device according to claim 33, wherein the focusing unit is configured to jointly adjust the focus for all optical channels.

37. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein each partial area of the object area is projected on at least two image sensor areas by at least two optical channels.

38. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein a total amount of the optical channels of the array completely projects a total amount of image areas of the object area on a total amount of image sensor areas of the at least one image sensor and wherein the total amount of the partial areas completely projects the object area to be captured.

39. The multi-aperture imaging device according to claim 1 or comprising at least one image sensor, and an array of juxtaposed optical channels; wherein each optical channel comprises optics for projecting at least one partial area of an object area on an image sensor area of the image sensor, wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure, wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

wherein the image sensor and the optical channels form a first partial module in the housing that is configured to capture the object area, wherein the multi-aperture imaging device comprises at least a second partial module that is configured to capture the object area, and wherein the first partial module and the at least second partial module are arranged in the housing and the wall structure extends across the optical channels of the first partial module and the second partial module.

40. The multi-aperture imaging device according to claim 39, further comprising an optical image stabilizer having a joint effect for two, a plurality or all optical paths of the optical channels of the first partial module and the second partial module and/or a focusing unit comprising at least one actuator for jointly adjusting a focus of the first partial module and the second partial module and/or a beam-deflecting unit for jointly deflecting an optical path of optical channels of the first partial module and the second partial module and/or wherein the image sensor of the first partial module is formed integrally with the image sensor of the second partial module.

41. An imaging system with a multi-aperture imaging device according to claim 1 or with a multi-aperture imaging device comprising at least one image sensor, and an array of juxtaposed optical channels; wherein each optical channel comprises optics for projecting at least one partial area of an object area on an image sensor area of the image sensor,
  wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure,
  wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel, or
  wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

42. The imaging system according to claim 41 comprising at least a first and a second multi-aperture imaging device comprising:
  at least one image sensor; and
  an array of juxtaposed optical channels, wherein each optical channel comprises optics for projecting at least one partial area of an object area on an image sensor area of the image sensor, the array comprising:
    a housing comprising a wall structure facing or facing away from the image sensor, through which the optical channels pass, and a sidewall structure arranged on the wall structure, wherein the wall structure or the sidewall structure is formed comprising glass, ceramic, glass ceramic or a crystalline material, wherein the optics of the optical channels are arranged in the housing, and wherein the wall structure is connected to optics of the optical channels and fixes the optics with respect to one another;
  wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or
  wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;
or a multi-aperture imaging device comprising:
  at least one image sensor; and
  an array of juxtaposed optical channels, wherein each optical channel comprises optics for projecting at least one partial area of an object area on an image sensor area of the image sensor;
    wherein the array comprises a housing in which the optics of the optical channels are arranged and fixed with respect to one another, wherein the housing is formed of juxtaposed plate-shaped structures and comprises at least one wall structure facing or facing away from the image sensor and comprises at least one sidewall structure;
    wherein the optics are arranged in a contact-less manner to an adjacent partition wall structure or laterally supported by a soft material; and wherein the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or
    wherein one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;
wherein the first multi-aperture imaging device and the second multi-aperture imaging device are arranged such that the object is captured at least stereoscopically by the first multi-aperture imaging device and the second multi-aperture imaging device.

43. The imaging system according to claim 41 which is configured as mobile phone, smartphone, tablet or monitor.

44. A method for producing a multi-aperture imaging device, comprising:
  providing at least one image sensor; and
  arranging optics of optical channels, such that the same form an array of juxtaposed optical channels, and such that each optical channel comprises optics for projecting at least one partial area of an object area on an image sensor area of the image sensor, wherein forming the array comprises:

arranging the optics of the optical channels in a housing, such that a wall structure of the housing through which the optical channels pass is facing or facing away from the image sensor and a sidewall structure arranged on the wall structure is arranged on the wall structure, wherein the wall structure or the sidewall structure is formed comprising glass, ceramic, glass ceramic or a crystalline material, wherein the optics are arranged such that the wall structure is connected to the optics of the optical channels and fixes the optics with respect to one another;

wherein arranging the optics is performed such that the optics are arranged in a contactless manner with respect to an adjacent partition wall structure or are supported by a soft material such that the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or such that one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

45. A method for producing a multi-aperture imaging device, comprising:

providing at least one image sensor; and arranging optics of optical channels, such that the same form an array of juxtaposed optical channels, and such that each optical channel comprises optics for projecting at least one partial area of an object area on an image sensor area of the image sensor;

forming a housing of joined plate-shaped structures such that the housing comprises at least one wall structure facing or facing away from the image sensor and comprises at least one sidewall structure; and arranging the optics of the optical channels of the array in the housing, such that the optics are fixed with respect to one another;

wherein arranging the optics is performed such that the optics are arranged in a contactless manner with respect to an adjacent partition wall structure or are supported by a soft material such that the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or such that one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements.

46. The method according to claim 44 or for producing a multi-aperture imaging device, comprising:

providing at least one image sensor; and arranging optics of optical channels, such that the same form an array of juxtaposed optical channels, and such that each optical channel comprises optics for projecting at least one partial area of an object area on an image sensor area of the image sensor;

forming a housing of joined plate-shaped structures such that the housing comprises at least one wall structure facing or facing away from the image sensor and comprises at least one sidewall structure; and arranging the optics of the optical channels of the array in the housing, such that the optics are fixed with respect to one another;

wherein arranging the optics is performed such that the optics are arranged in a contactless manner with respect to an adjacent partition wall structure or are supported by a soft material such that the optics deform during a thermally induced deformation along an optical length of the optical channel and along a direction perpendicular to the optical length of the optical channel, wherein each optical channel is not affected by the deformation in the direction perpendicular to the optical length of an adjacent optical channel; or such that one of the optics comprises a plurality of serially arranged optics elements which are mechanically connected to one another, such that the optics are arranged along a direction perpendicular to an optical path through the optics and along a line-extension direction of the array in an area of at least 50% of a length of the optical channel along an optical axis of the same in a contactless manner with respect to other mechanical elements;

the method comprising: arranging partition wall structures between the optical channels, wherein the partition wall structures are formed of an at least partly opaque material such that stray light suppression between the optical channels is achieved.

* * * * *